United States Patent
Intwala et al.

(10) Patent No.: US 8,693,776 B2
(45) Date of Patent: Apr. 8, 2014

(54) CONTINUOUSLY ADJUSTABLE BLEED FOR SELECTED REGION BLURRING

(75) Inventors: Chintan Intwala, Santa Clara, CA (US); Gregg D. Wilensky, Palisades, CA (US); Baljit S. Vijan, Foster City, CA (US); Mausoom Sarkar, New Delhi (IN)

(73) Assignee: Adobe Systems Incorporated, San Jose, CA (US)

(*) Notice: Subject to any disclaimer, the term of this patent is extended or adjusted under 35 U.S.C. 154(b) by 24 days.

(21) Appl. No.: 13/560,778

(22) Filed: Jul. 27, 2012

(65) Prior Publication Data
US 2013/0230244 A1 Sep. 5, 2013

(51) Int. Cl.
*G06K 9/00* (2006.01)
*G06T 5/20* (2006.01)
*G06T 5/00* (2006.01)

(52) U.S. Cl.
CPC ... *G06T 5/20* (2013.01); *G06T 5/00* (2013.01); *G06T 5/001* (2013.01)
USPC .......................................... 382/167; 382/164

(58) Field of Classification Search
None
See application file for complete search history.

(56) References Cited

U.S. PATENT DOCUMENTS

| | | | | |
|---|---|---|---|---|
| 7,889,242 B2* | 2/2011 | Cazier et al. | | 348/222.1 |
| 8,290,257 B2* | 10/2012 | Demirli et al. | | 382/165 |
| 2002/0071604 A1* | 6/2002 | Orpaz et al. | | 382/162 |
| 2002/0081003 A1* | 6/2002 | Sobol | | 382/118 |
| 2002/0093670 A1* | 7/2002 | Luo et al. | | 358/1.9 |
| 2002/0176113 A1* | 11/2002 | Edgar | | 358/3.27 |
| 2003/0063797 A1* | 4/2003 | Mao | | 382/162 |
| 2004/0170337 A1* | 9/2004 | Simon et al. | | 382/254 |
| 2006/0274936 A1* | 12/2006 | Ohkubo et al. | | 382/167 |
| 2007/0286520 A1* | 12/2007 | Zhang et al. | | 382/264 |
| 2008/0118175 A1* | 5/2008 | Rai | | 382/264 |
| 2010/0007679 A1* | 1/2010 | Sakaigawa | | 345/690 |
| 2010/0128978 A1* | 5/2010 | Ono et al. | | 382/165 |
| 2010/0134492 A1* | 6/2010 | Ford et al. | | 345/426 |
| 2011/0280475 A1* | 11/2011 | Singhal et al. | | 382/162 |
| 2013/0195356 A1* | 8/2013 | Weiss | | 382/167 |
| 2013/0229435 A1* | 9/2013 | Intwala et al. | | 345/647 |
| 2013/0230243 A1* | 9/2013 | Intwala et al. | | 382/167 |
| 2013/0230244 A1* | 9/2013 | Intwala et al. | | 382/167 |
| 2013/0230259 A1* | 9/2013 | Intwala et al. | | 382/255 |

FOREIGN PATENT DOCUMENTS

WO WO 2007042251 A2 * 4/2007 ................ G06T 5/00

OTHER PUBLICATIONS http://www.alienskin.com/bokeh/ [Jul. 23, 2012 4:59:41 PM] pp. 1-2.
http://www.alienskin.com/bokeh/features.aspx [Jul. 23, 2012 5:02:27 PM] pp. 1-2.

(Continued)

*Primary Examiner* — Sean Motsinger
(74) *Attorney, Agent, or Firm* — Wolfe-SBMC

(57) ABSTRACT

Methods and apparatus for controlling bleeding at the edges of a blur region or selection. A technique for aesthetically controlling the bleeding of blur introduced by blurring selections, referred to herein as a selection bleed technique, may enable continuous adjustment of the amount of bleeding of image blurs between a selected image region and its complement (the unselected region, e.g. the background). The selection bleed technique may allow selections to go from no-bleed to full-bleed and in between via a percentage indicated by one or more user interface elements, for example a slider.

17 Claims, 45 Drawing Sheets

(56) References Cited

OTHER PUBLICATIONS http://www.alienskin.com/bokeh/examples.aspx [Jul. 23, 2012 5:11:32 PM] pp. 1-2.

http://www.pixelmator.com/tutorials/zoom-blur-effect/ [Jul. 23, 2012 7:24:44 PM] pp. 1-8.

http://help.adobe.com/en_US/aftereffects/cs/using/WS3878526689cb91655866c1103a9d3c597-7bada.html [Jul. 23, 2012 7:49:50 PM] pp. 1-8.

U.S. Appl. No. 13/560,790, filed Jul. 27 2012, Chintan Intwala.

U.S. Appl. No. 13/560,734, filed Jul. 27 2012, Chintan Intwala.

U.S. Appl. No. 13/560,763, filed Jul. 27 2012, Chintan Intwala.

* cited by examiner

CONTINUOUSLY ADJUSTABLE BLEED FOR SELECTED REGION BLURRING

PRIORITY INFORMATION

This application claims benefit of priority of Indian Patent Application Ser. No. 610/DEL/2012 entitled "Methods and Apparatus for Applying Blur Effects to Images" filed Mar. 2, 2012, the content of which is incorporated by reference herein in its entirety.

BACKGROUND

Description of the Related Art

Conventional blur techniques tend to be limited and restricting, and do not provide the user with the flexibility to easily and interactively create and combine a wide variety of blur effects.

SUMMARY

Various embodiments of methods and apparatus for controlling bleeding at the edges of a blur region or selection for any of various blur patterns or a combination thereof are described. Specifically, embodiments of a technique for aesthetically controlling the bleeding of blur introduced by blurring selections, referred to herein as a selection bleed technique, are described. Embodiments of the selection bleed technique may enable continuous adjustment of the amount of bleeding of image blurs between a selected image region and its complement (the unselected region, e.g. the background). Embodiments of the selection bleed technique may allow selections to go from no-bleed to full-bleed via a percentage indicated by one or more user interface elements, for example a slider. Controlling the bleeding of blur may, for example, be important to users that want to use blurring for automotive photography or similar types of photography, where sharp foreground is desired against a blurred background. More generally, the selection bleed technique can be used to prevent any color effects entering from neighboring regions, while blurring the region of interest.

In at least some embodiments of a selection bleed technique, an indication of a selection region in the input image in which the blur effect is to be applied and a variable bleed amount may be obtained, for example via a user interface. The blur effect may be applied to the input image according to the selection region. An amount of color from outside the selection region that bleeds into color inside the selection region is controlled by the bleed amount. In at least some embodiments, the bleed amount is variable between 0% and 100%; an amount of 0% results in no bleeding of color from outside the selection region into color inside the selection region, an amount of 100% results in full bleeding of color from outside the selection region into color inside the selection region, and an amount between 0% and 100% results in an intermediate amount of bleeding of color from outside the selection region into color inside the selection region. In at least some embodiments, distance from the border of the selection region to which bleeding occurs is determined according to the blur radius at the respective pixels in the input image.

Figure 1:
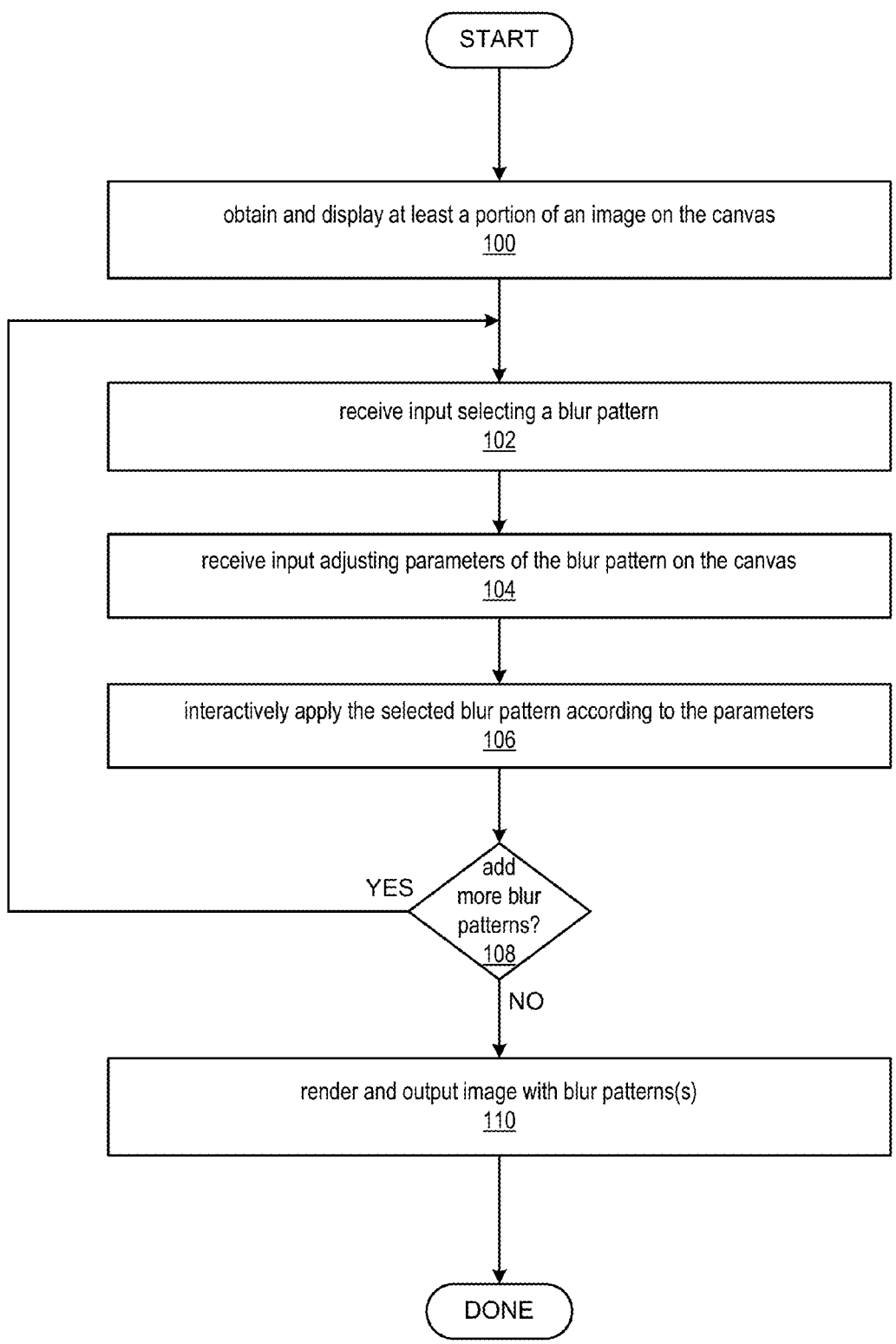
FIG. 1 is a high-level flowchart of operations of a blur module, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for providing simultaneous, non-destructive blur patterns in an interactive environment are described. Embodiments of a blur module are described that render physically-realistic, spatially-varying blurs in digital images while at the same time giving users the flexibility to produce creative blur effects not provided in conventional blurring techniques via an interface to the blur module. Embodiments of the blur module may provide several different types of blur patterns, all of which are available in a given session. Each different type of blur pattern can be combined with one or more of the other blur patterns non-destructively. Each blur pattern has a corresponding on-canvas user interface element or elements (e.g., a widget) that can be manipulated for a live preview. The internal framework of the blur module allows embodiments to handle many if not all possible scenarios user-interactivity.

Embodiments of the blur module may provide non-destructive techniques for performing blurring. In at least some embodiments, parameters such as pin locations and their properties, as well as bokeh and selection bleeding parameters, may be parameterized and stored with relatively little memory. This lightweight representation of the blur patterns can then be easily reapplied to the same image or to other images. The lightweight representation of the blur patterns can be used, for example, to restart a previous blurring operation, which is critical in enabling non-destructive workflows.

Embodiments of the blurring techniques described herein may be applied in a variety of color spaces, including but not limited to RGB, CMYK, LAB, and grayscale color spaces.

At least some embodiments of the blur module may provide different types of blur patterns, referred to herein as field blur, iris blur and tilt-shift. Embodiments may also provide a bokeh effect that may be combined with one or more of the blur patterns. In at least some embodiments, an intuitive on-canvas widget is provided via the user interface for each type of blur pattern. In at least some embodiments, each widget may include or provide one or more control elements that can be used to control various parameters such as position, amount of blur, amount of feather, etc. Using embodiments, a user can generate multiple instances of a given blur pattern (i.e., multiple widgets). In addition, one or more instances of a given blur pattern may be combined with one or more instances of a different blur pattern, and the other blur patterns may be combined with these instances as well. Thus, field blur widgets, iris blur widgets, and/or tilt-shift widgets may be combined and manipulated in a single image as the user desires to achieve a wide variety of combined blur patterns. In addition, in at least some embodiments, a bokeh effect is provided that may be combined with one or more of the blur patterns.

In addition to allowing the coexistence of the various blur patterns by combining blur instances in an image, in at least some embodiments, all of the blur pattern instances in an image share a single radius field. The following describes a method for computing a blur radius field, according to at least some embodiments.

Within each blur pattern (e.g., field blur, iris blur, tilt-shift, etc.), multiple blur pins may combine their effects by multiplying their normalized radius fields. Between patterns, on the other hand, the multiple blur pins combine by addition of the normalized fields. The normalized fields, along with the maximum blur radius amount, determine the per-pixel blur radius which then drives the spatially varying blur. In at least some embodiments, a normalized radius field ranges in value between 0.0 and 1.0, and may be obtained by producing the radius field in units of pixels and then dividing by the maximum radius value. The blur radius field is then given by the product of the maximum radius value and the normalized radius field.

Embodiments of the blur module may provide several types of spatially varying blur patterns—e.g., field blur, iris blur and tilt-shift blur. However, each of these blur patterns, or any combination thereof, may use an underlying spatially varying blurring algorithm which, in at least some embodiments, applies a spatially varying elliptical-kernel blur where the blur radius at pixels is determined according to the values in the radius field (blur mask), which vary between 0.0 (no blur) to 1.0 (maximum blur), with smoothly varying values in between. In at least some embodiments, the blur kernel may be a circular aperture kernel with the blur radius at a given pixel in the radius field used as the kernel radius. However, in at least some embodiments, the blur kernel may be distorted to form an elliptical kernel, with a major axis and minor axis rather than a fixed radius.

In at least some embodiments, the blur module and user interface may also allow the user to select individual blur widgets, switch between blur patterns, and enable or disable a blur pattern, for example using checkboxes or the like.

In at least some embodiments, the blur module may work within an architecture of the digital image processing application environment to support non-destructive workflows, for example using "smart object" technology or the like. In at least some embodiments, the blur module may capture all of the user interactions using the on-canvas elements. In addition, in at least some embodiments, all of the final blur patterns can be parameterized using a lightweight representation of the component blur patterns, including information such as, widget type, widget location, amount of blur, amount of feather, amount of focus, amount of bokeh, etc. This information is stored in a data structure that may be referred to as a "smart object." This, for example, allows the user to restart a previous blur session and to pick up exactly where they left off, or to apply a blur effect generated for one image to another image.

In at least some embodiments, the blur module may provide a level of performance that gives fluidity to interactions. In at least some embodiments, the blur module may achieve frame rates of interactivity on CPU as well as on GPU by implementing a framework that handles all possible user interactions. Types of user interactions supported by the framework may include, but are not limited to, the following:

Render the screen while the user is actively manipulating a widget of slider, i.e., upon MOUSE-DOWN.

Render the result at the given preview level upon MOUSE-UP.

Render the base level of the pyramid, or do FINAL APPLICATION, when the user commits the combined blur patterns.

MOUSE-DOWN: In at least some embodiments, when the user is busy interacting with the on-canvas controls, the blur module may stay interactive by rendering a downsampled (e.g., 512×512) version of the image and scaling that back up to the required screen resolution. This provides the user with a coarse answer to the current blur pattern while they are interactively manipulating the blur pattern.

MOUSE-UP: In at least some embodiments, when the user releases the mouse, the blur module renders the appropriate level of the pyramid that corresponds to the screen resolution. However, since this operation can be slow, this may be performed one area at a time. The entire answer at the screen resolution may be computed in many areas, and each area is updated on the screen once it is processed. In at least some embodiments, a relatively small and non-intrusive progress-update may be displayed to inform the user when the entire screen will finish updating. This screen update is an interruptible operation, which means that the user does not have to wait until it is finished, and thus is free to interact with the user interface whenever and however they please.

FINAL APPLICATION: This operation (final application of the blur pattern(s)) may not need to be interactive; potentially, gigabytes of data may be rendered. However, such large images may be handled gracefully by embodiments. In at least some embodiments, the final application may be accelerated by the use of a GPU or GPUs, which may provide significantly faster final rendering than simply using a CPU to perform the final rendering.

Figure 8:
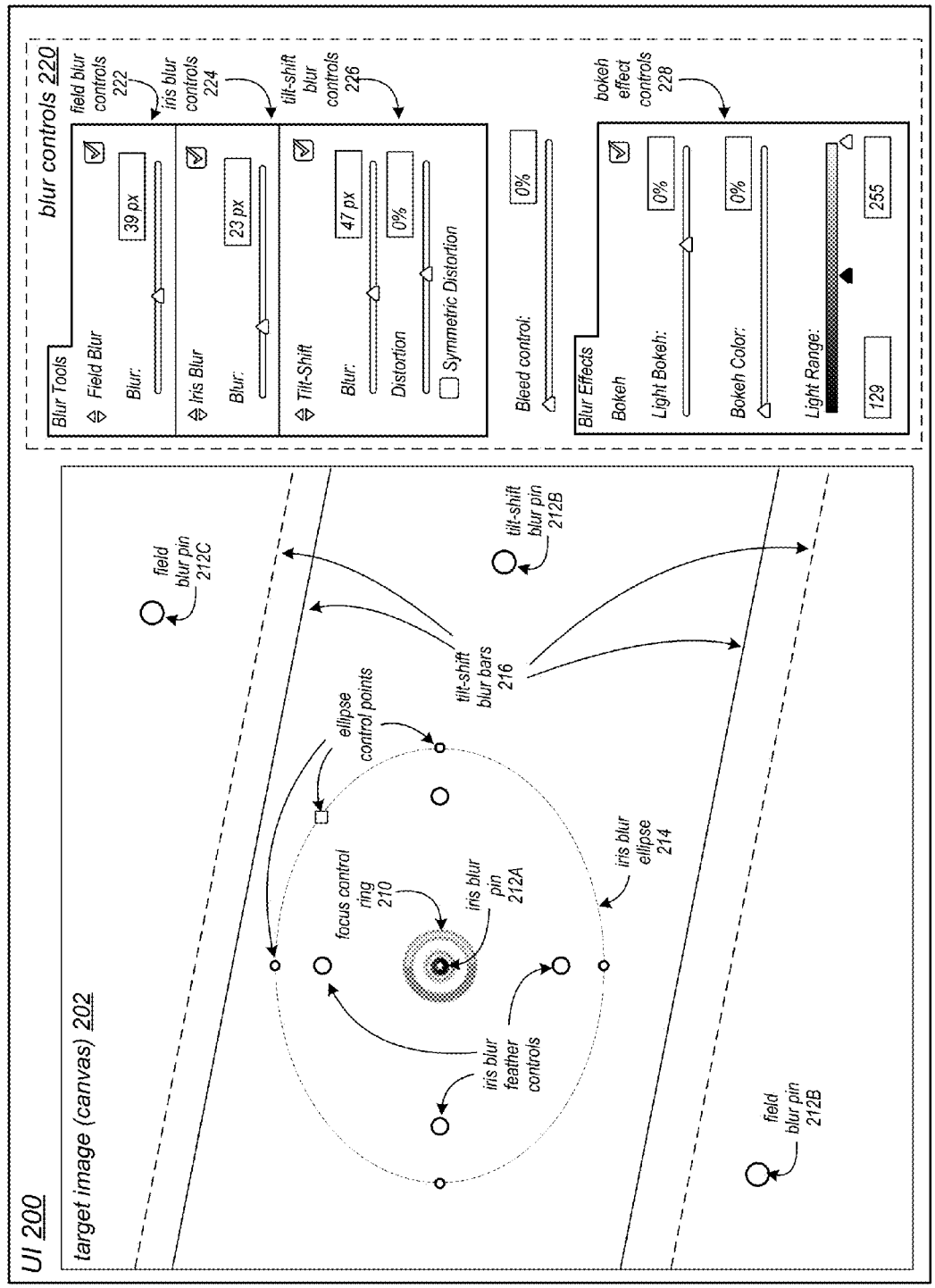
FIG. 8 illustrates an example user interface to a blur module, according to at least some embodiments.

FIG. 1 is a high-level flowchart of operations of a blur module, according to at least some embodiments. As indicated at 100, an image may be obtained, and at least a portion of the image may be displayed on a canvas. As indicated at 102, input may be received selecting a blur pattern (e.g., a field blur, an iris blur, or a tilt-shift blur). For example, the user may select a particular blur tool and/or the bokeh tool as illustrated in FIG. 8. Note that, if there are multiple instances of a blur pattern or patterns (e.g., multiple pins for a field blur, or multiple instances of an iris blur, or multiple instances of a tilt-shift blur) on the canvas, this input may select a particular one of the blur instances, e.g. by selecting a respective pin, or by adding a new pin. This input may also or instead select a blur pattern by selecting the respective control pane in FIG. 8. As indicated at 104, input may be received adjusting parameters of the current blur pattern on the canvas. For example, the input may tweak a respective widget, as shown in FIG. 8. As another example, the input may add or delete pins. As another example, the input may adjust one or more UI elements in the respective control pane for the current blur pattern as shown in FIG. 8. As another example, the input may adjust bokeh settings, or turn bokeh on or off, for the currently selected blur pattern instance, for example using the bokeh controls as shown in FIG. 8.

As indicated at 106, the blur pattern may be interactively applied to the image according to the parameters. While the user is interactively selecting and adjusting blur patterns in elements 102 and 104 via a user interface, in at least some embodiments, the blur module may provide a level of performance that gives fluidity to interactions. In at least some embodiments, the blur module may achieve frame rates of interactivity on CPU as well as on GPU by implementing a framework that handles all possible user interactions, as previously described.

At 108, after the user has finished with the current blur pattern instance, if the user desires to add (or adjust) more blur pattern instances, the method may return to element 102. If the user is done, then the method may proceed to element 110, where the resulting image may be rendered and output. Note that a final rendering may be performed to apply the specified blur patterns according to the radius field (blur map), if necessary. In at least some embodiments, this final rendering (final application) may be performed at least in part on a GPU or GPUs.

The following sections describe blur patterns and related techniques that may be provided by various embodiments of a blur module and/or blur method as described herein. The blur patterns and related techniques that may be provided by a blur module may include one or more of, but are not limited to, a field blur pattern, an iris blur pattern, a tilt-shift pattern, a bokeh technique for creating bokeh effects, and a selection bleed technique that allows the user to control bleeding at the edges of a blur region or selection.

Field Blur

Figure 2A:
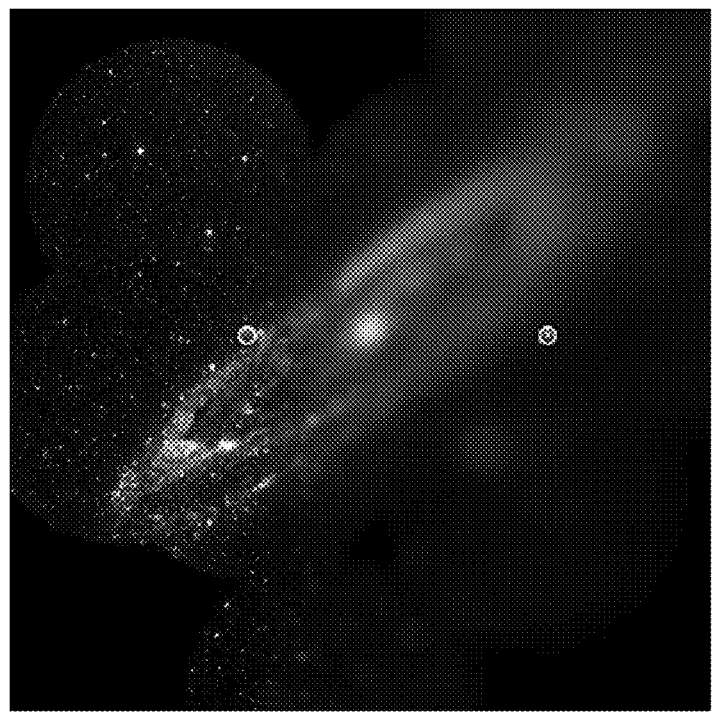
FIG. 2A shows an example image that includes a field blur generated with two pins, according to at least some embodiments.
Figure 12A:
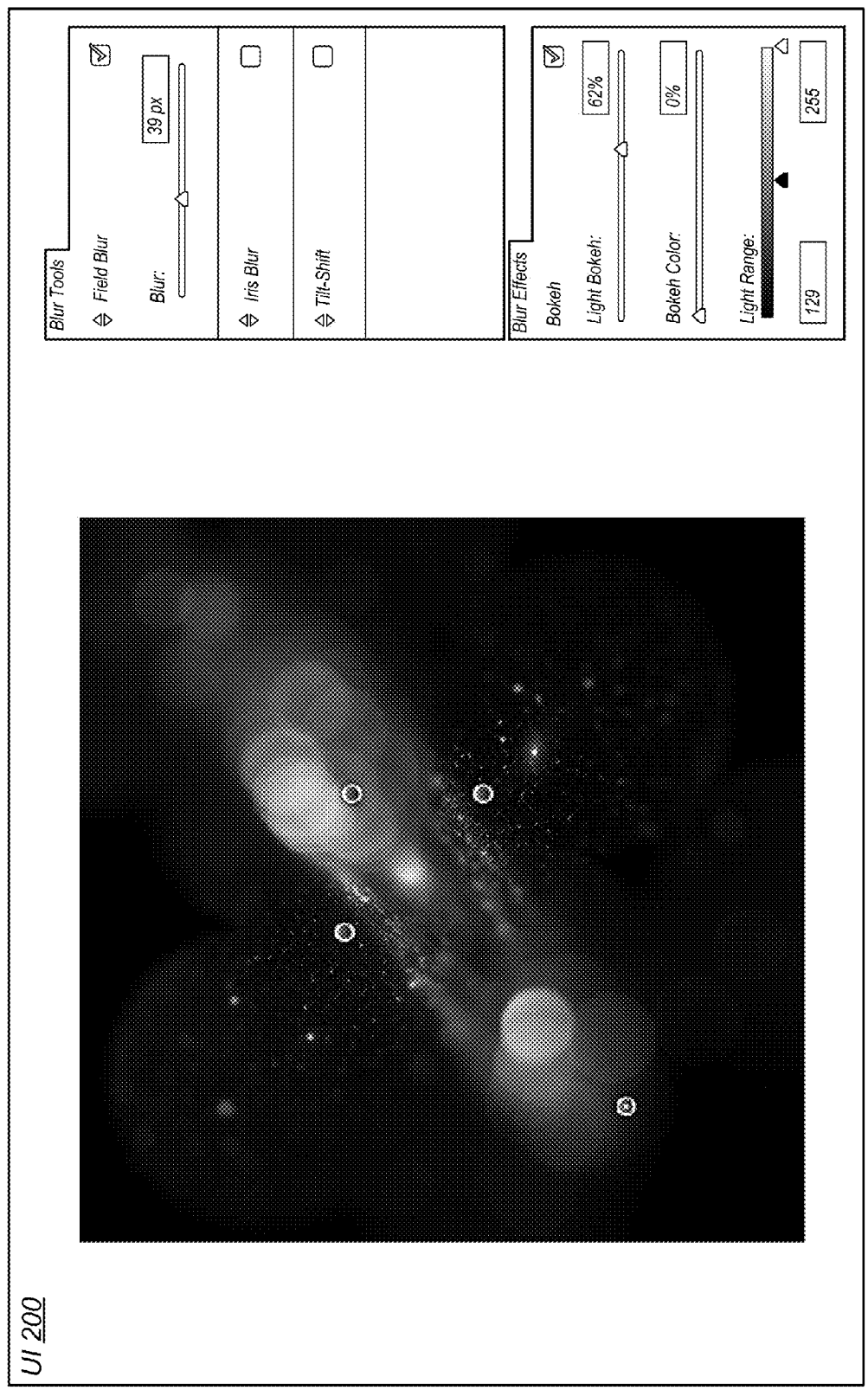
FIGS. 12A and 12B illustrate applying field blur to an example image, according to at least some embodiments.
Figure 12B:
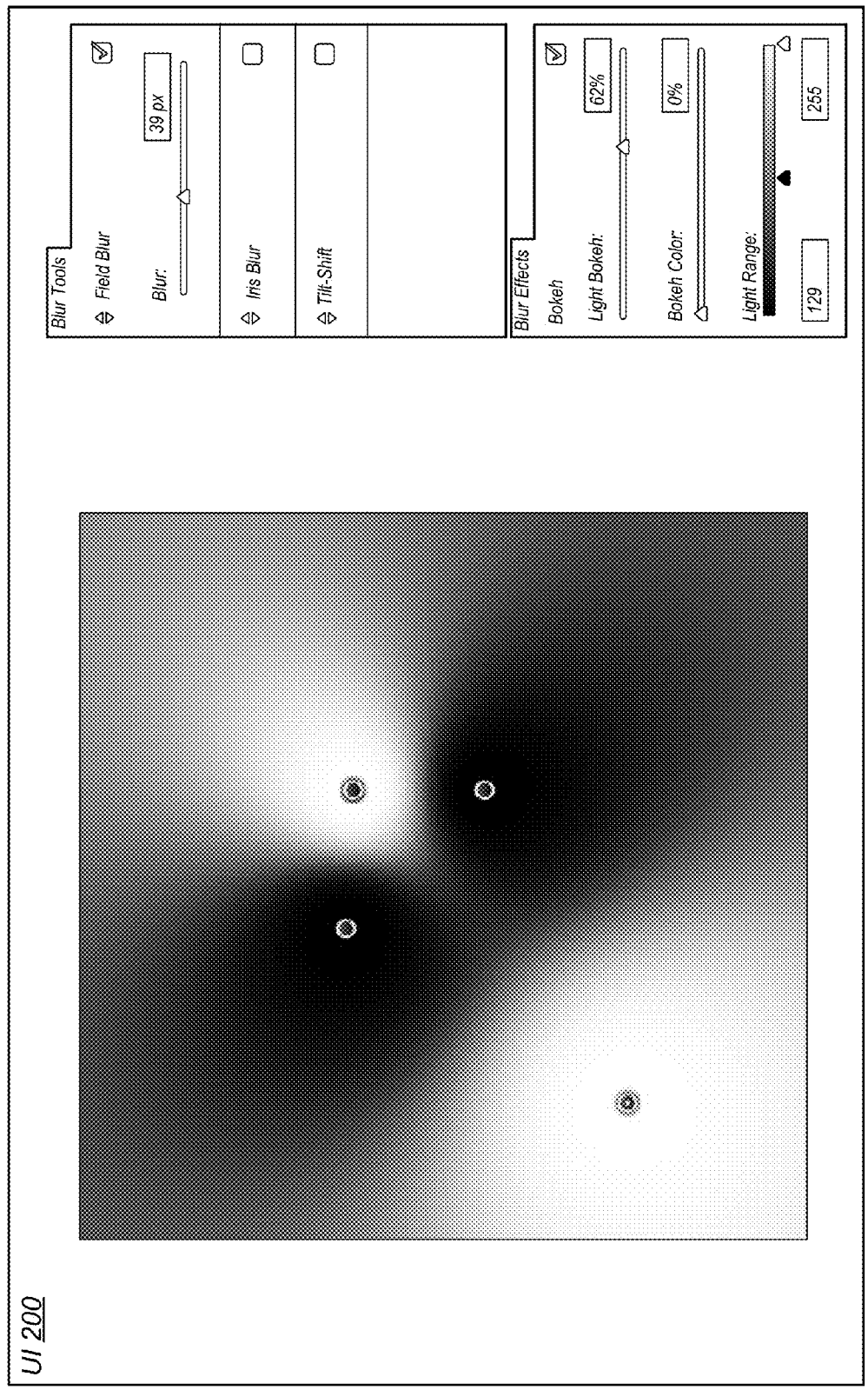
Figure 20:
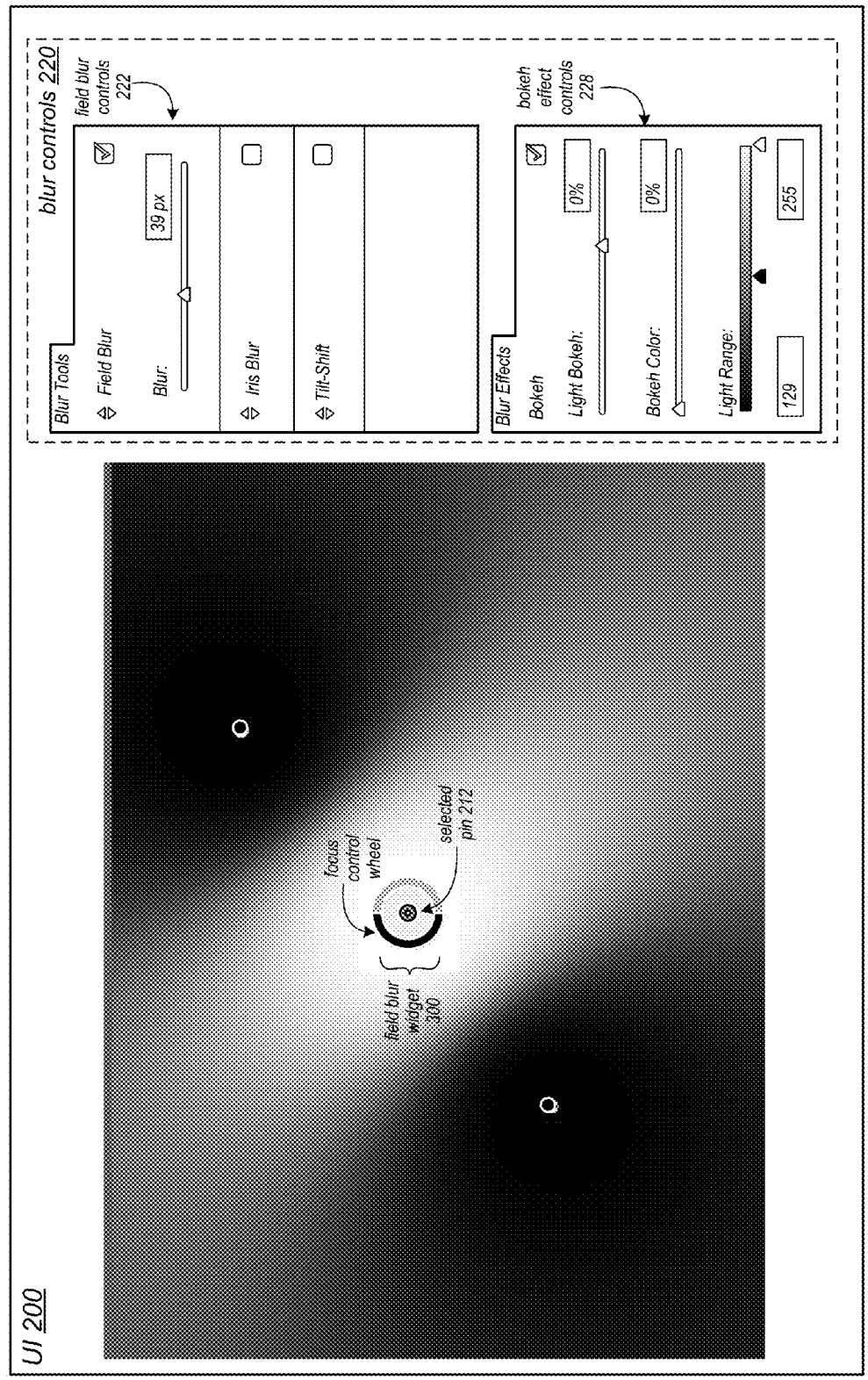
FIG. 20 illustrates an example field blur user interface, according to at least some embodiments.

At least some embodiments of a blur module may provide a non-destructive method for specifying complex continuous gradients, referred to herein as a field blur, or field blur pattern. At least some embodiments of the blur module may provide a field blur tool via the user interface through which users may apply the field blur pattern. In at least some embodiments, the field blur tool allows the user to place one, two, or more pins over the image and to specify the blur amount (blur radius) at each field blur pin. A blur algorithm distributes the blur values over the entire image, applying the blur according to the locations of the pin(s) and blur parameters at the pin(s). FIGS. 2A-2B and 3A-3B are provided as examples of the field blur pattern, and each show two or more pins applied to an image via the field blur user interface (UI) and field blur parameter(s) adjusted via the UI, to produce the field blur pattern. FIGS. 12A-12B shows an additional example of applying the field blur pattern, as well as an example UI for the field blur pattern. The image used in FIGS. 2A, 3A, and 12A is provided courtesy of NASA/JPL/California Institute of Technology. FIG. 20 shows an example UI to the field blur tool, according to at least some embodiments.

Figure 17:
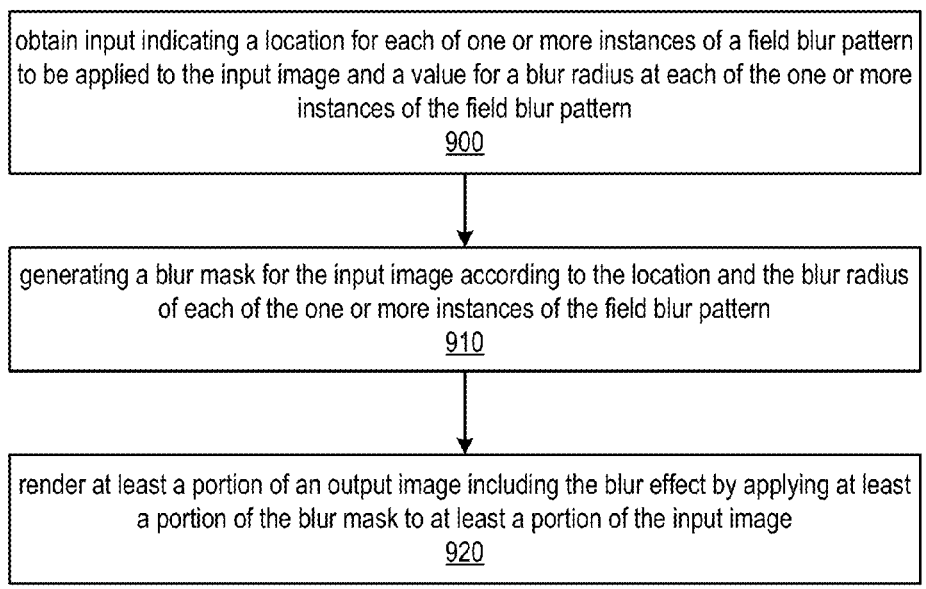
FIG. 17 is a high-level flowchart of a field blur technique, according to at least some embodiments.

FIG. 17 is a high-level flowchart of a field blur technique, according to at least some embodiments. As indicated at 900, input indicating a location for each of one or more instances of a field blur pattern to be applied to an input image and a value for a blur radius at each of the one or more instances of the field blur pattern may be obtained, for example via the example UI as illustrated in FIG. 20. As indicated at 910, a blur mask for the input image may be generated according to the location and the blur radius of each of the one or more instances of the field blur pattern. In at least some embodiments, the blur mask specifies a blur radius at each pixel of the input image. As indicated at 920, at least a portion of an output image including the blur effect may be rendered by applying at least a portion of the blur mask to at least a portion of the input image. If the input indicates the location and the value for the blur radius of each of two or more instances of the field blur pattern, the two or more instances of the field blur pattern are combined in the blur mask by multiplying normalized radius fields of each of the instances. The elements of the flowchart of FIG. 17 are described in more detail below.

The field blur pattern as applied by the field blur tool may simplify the process of creating complex gradient fields. Embodiments of the field blur algorithm applied by the field blur tool may modulate image blurring. Embodiments of the field blur tool may provide a user experience which unites the process of producing 1) a spatially uniform blur; 2) a spatially varying blur controlled by a linear gradient of blur radii; and 3) a spatially varying blur with gradients which are more complex than linear. All of this is done in a manner that is intuitive to the user of the field blur tool. In at least some embodiments, the masks (see, e.g., FIGS. 2B and 3B) generated using the field blur tool may be used to control other image adjustments and filters than blur.

In at least some embodiments, to achieve a spatially uniform blur, a single focus pin may be placed anywhere on the image, and an on-canvas field blur UI (referred to herein as a field blur widget) may be displayed at the pin. FIG. 20 shows an example field blur widget 300, according to at least some embodiments. In at least some embodiments, the field blur widget includes at least a focus control wheel. The focus control wheel allows the user to control the uniform blur amount (i.e., the blur radius), for example by grabbing and rotating (or otherwise manipulating) a handle on the focus control wheel using a cursor control device such as a mouse, or alternatively using a stylus or finger on a touch- or multi-touch-enabled device. In at least some embodiments, fields blur parameter(s) (e.g., the blur amount or blur radius) may be instead or alternatively controlled using other field blur UI controls. FIG. 20 shows an example field blur control 222 that includes a blur slider bar that the user may manipulate to control the blur amount (i.e., the blur radius), in at least some embodiments. Note that the blur radius may be expressed in pixels, in at least some embodiments. In at least some embodiments, the blur amount (blur radius) may be set within a range from 0 (no blur) to a maximum blur radius. The maximum blur radius may be an implementation-dependent threshold amount. In at least some embodiments, the maximum blur amount may be specified by the user via the UI. Alternatively, the maximum blur amount may be a fixed threshold in the blur module implementation. Note that, in at least some embodiments, in generating the radius field (blur mask), the blur radius contributions from the pins at each pixel may be normalized to within the range [0.0 . . . 1.0], where 0.0 is no blur and 1.0 is maximum blur.

Figure 2B:
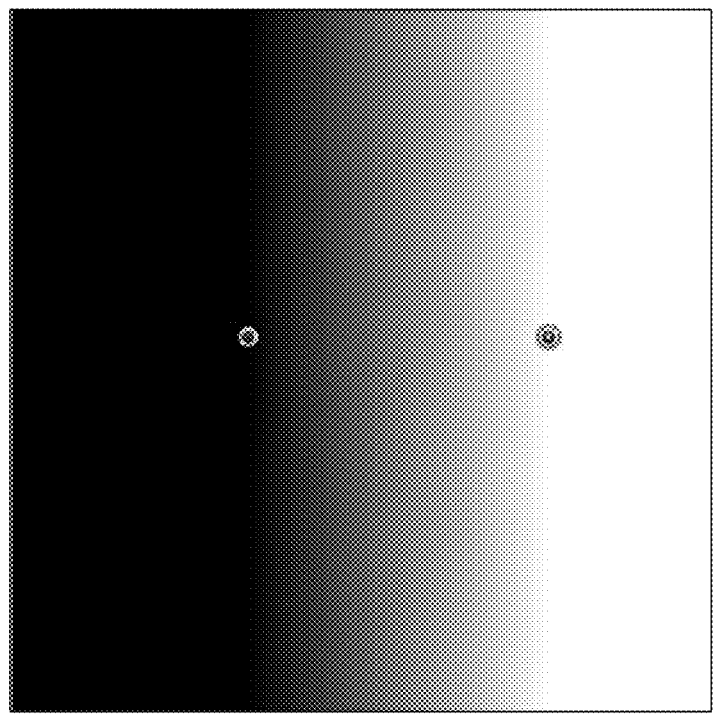
FIG. 2B shows the normalized blur radius field associated with the two pins in FIG. 2A, according to at least some embodiments.
Figure 3A:
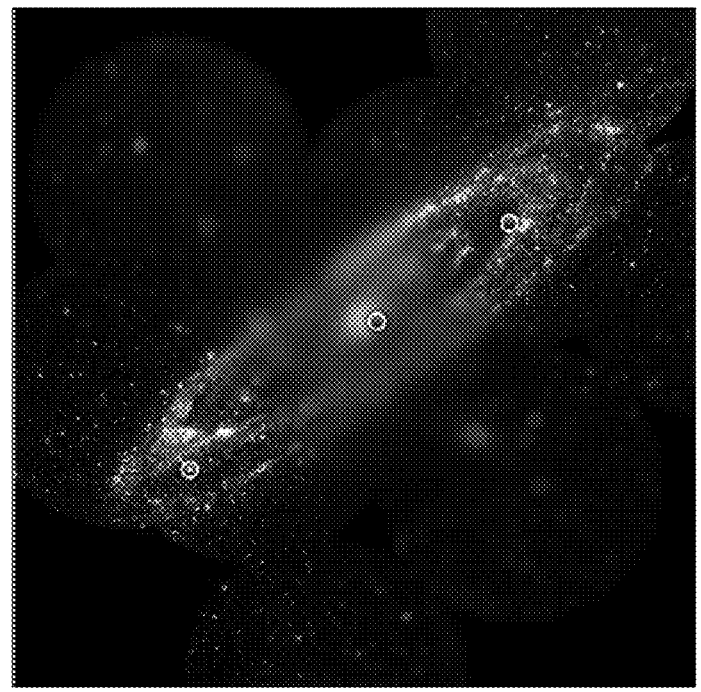
FIG. 3A shows an example image that includes a field blur generated with three pins, according to at least some embodiments.

In at least some embodiments, to achieve a spatially varying blur controlled by a linear gradient of blur radii, the user may place a second focus pin on the image (see, e.g., FIGS. 2A-2B). The blur amount for this pin may be controlled independently of the first pin using an on-canvas field blur widget at the second pin, or alternatively using other field blur UI controls. In this way, the user may create a spatially varying blur that has two specified blur amounts, one at each focus pin. FIG. 2B shows a blur mask generated according to the two pins and the respective blur radius setting at each of the pins. FIG. 2A shows the blur as produced in a sample image by the blur mask of FIG. 2B. In at least some embodiments, the UI to the blur module may provide one or more user interface elements via which the user may toggle between the image view and the mask view on the canvas. Note that, in the blur masks as shown in the accompanying Figures and as discussed in the text, white indicates a maximum blur amount (blur radius=maximum blur radius), black indicates no blur (blur radius=0), and shades of gray indicate blur radii in between the maximum blur radius and blur radius=0. However, white=no blur and black=maximum blur is used by convention, and the reverse (white=maximum blur, black=no blur) could also be used in some implementations.

Figure 3B:
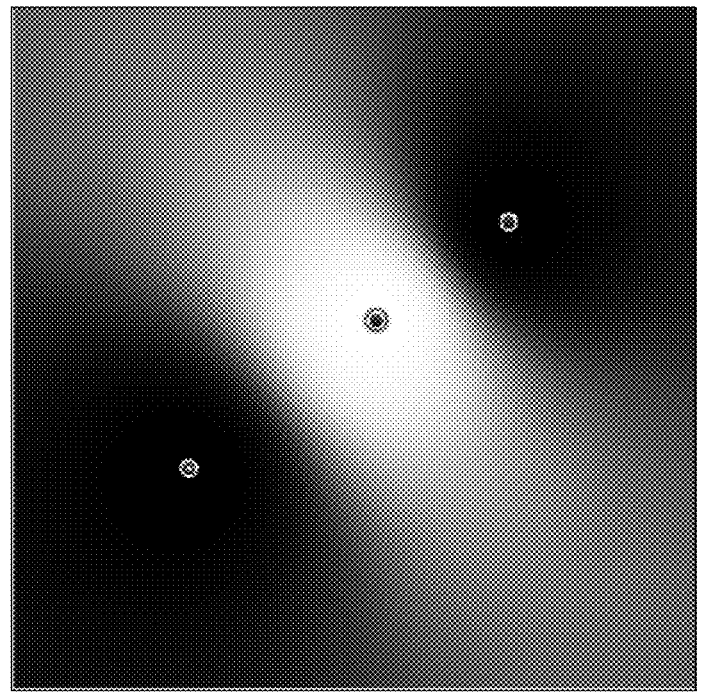
FIG. 3B shows the normalized blur radius field associated with the three pins in FIG. 3A, according to at least some embodiments.

In at least some embodiments, to achieve a spatially varying blur with gradients that are more complex than linear, the user may place one or more additional pins to provide additional points of constraint for the blur amount. FIGS. 3A and 3B show an example in which three pins have been placed on the canvas. Each pin's blur amount is independent of all the others. A field blur widget may be selectively displayed at each pin, e.g., by selecting the respective pin via the UI, to adjust the field blur amount (blur radius) at that pin. FIG. 3B shows a blur mask generated according to the three pins and the respective blur radius setting at each of the pins. FIG. 3A shows the blur as produced in a sample image by the blur mask of FIG. 3B. FIGS. 12A and 12B show an additional example of the field blur in which four pins are used to control the blur radius to achieve a complex spatially varying blur. FIG. 12A also illustrates the application of the bokeh effect to the field blur, according to at least some embodiments.

Field Blur Implementation Details

The following provides implementation details for providing field blurs for scenarios 1 (single pin, spatially uniform blur), 2 (two pins, spatially varying blur controlled by a linear gradient of blur radii), and 3 (three or more pins, spatially varying blur with complex gradients) according to some embodiments, and is not intended to be limiting.

In at least some embodiments, a spatially varying blur function takes as an argument the radius field (illustrated by a blur mask as shown in FIGS. 2B and 3B) that specifies the blur radius at every pixel. That field may be generated as follows.

In scenario 1, the case of one focus pin with blur radius amount $R0$ (in units of pixels), the field has a constant value of $R0$ (the blur radius amount).

In scenario 2, the case of two focus pins with blur radius amounts $R0$ and $R1$ (pixels) placed at pixel locations $(x0, y0)$ and (x1, y1) respectively, the field at image location (x, y) has a value field (x, y), which may be determined as follows. Double-slashes ("//") indicate comments:

$R\text{max} = \text{maximum}(R0, R1);$ $A0 = R0/R\text{max};$ $A1 = R1/R\text{max};$ // the difference vector between the two pin locations $x10 = x1 - x0;$ $y10 = y1 - y0;$ $dr0\_r10 = (x - x0)*x10 + (y - y0)*y10;$ $r10\_sq = x10*x10 + y10*y10;$ // project the current location onto the line between the pins $\text{projection} = (r10\_sq != 0)?dr0\_r10/r10\_sq: 0;$ $\text{projection} = \max(0.0, \text{projection});$ $\text{projection} = \min(\text{projection}, 1.0);$ $\text{field} = A0 + (A1 - A0)*\text{projection};$ The above algorithm produces a field that varies linearly between A0 and A1 (see, e.g., FIG. 2B). Note that the above algorithm is not intended to be limiting; variations on this algorithm, or other algorithms, may be used in some embodiments to produce a linearly varying field between two pins.

FIG. 2A shows an example image that includes a field blur generated with two pins, according to at least some embodiments. The field blur linearly varies between the two pins. FIG. 2B shows the normalized blur radius field (also referred to as a mask) associated with the two pins in FIG. 2A, according to at least some embodiments. The pins are shown by the "bull's-eye" circles on the images.

In scenario 3, the case of three or more pins, the field is a summation of contributions from each pin, which is then normalized. Each field contribution is formed by weighting the pin's dimensionless blur radius amount (R[p]/R_max, in the example algorithm given below) with a spatial factor which varies as the inverse fourth power of the distance of the evaluation point from the pin. Other powers than four can also be used, and thus can allow control over the tightness or looseness of the field—how constrained the field's contribution is from the field's associated pin. An example algorithm to generate the field according to this technique is provided below. The three pins may be labeled with index 'p' with corresponding blur radii R[p] and locations (x[p], y[p]):

```
field = 0;
normalization = 0;
for (p = 0; s < n_pins; ++p)
{
    dx_p = x - x[p];
    dy_p = y - y[p];
    dr_p_sq = dx_p * dx_p + dy_p * dy_p;
    f = 1.0 / (dr_p_sq * dr_p_sq + 0.01);
    A = R[p] / R_max;
    field += f * A;
    normalization += f;
}
if (0 < normalization)
{
    field /= normalization;
    field = max (0, field);
    field = min (field, 1);
```

```
}
else
    field = 1.0;
return field;
```

The above algorithm produces a field that varies between three or more pins. Note that the above algorithm is not intended to be limiting; variations on this algorithm, or other algorithms, may be used in some embodiments to produce a spatially varying field blur between three or more pins.

FIG. 3A shows an example image that includes a field blur generated with three pins, according to at least some embodiments. The field blur varies between the three pins. FIG. 3B shows the normalized blur radius field associated with the three pins in FIG. 3A, according to at least some embodiments. The pins are shown by the "bulls-eye" circles on the images. FIG. 12A shows an example image that includes a field blur generated with four pins, according to at least some embodiments. The field blur varies between the four pins. FIG. 12B shows the normalized blur radius field associated with the four pins, according to at least some embodiments.

FIG. 20 illustrates an example field blur user interface, according to at least some embodiments. In particular, FIG. 20 shows an example on-canvas field blur widget 300 that may be used in some embodiments, displayed at a currently selected one of the field blur pins indicated by the white circles (selected pin 212). The field blur widget may include at least a focus control wheel that the user may manipulate to adjust the blur radius at the selected pin 212. Alternatively, in at least some embodiments, the user may adjust the blur radius using a blur control (e.g., a blur slider bar) in field blur controls 222.

Figure 14A:
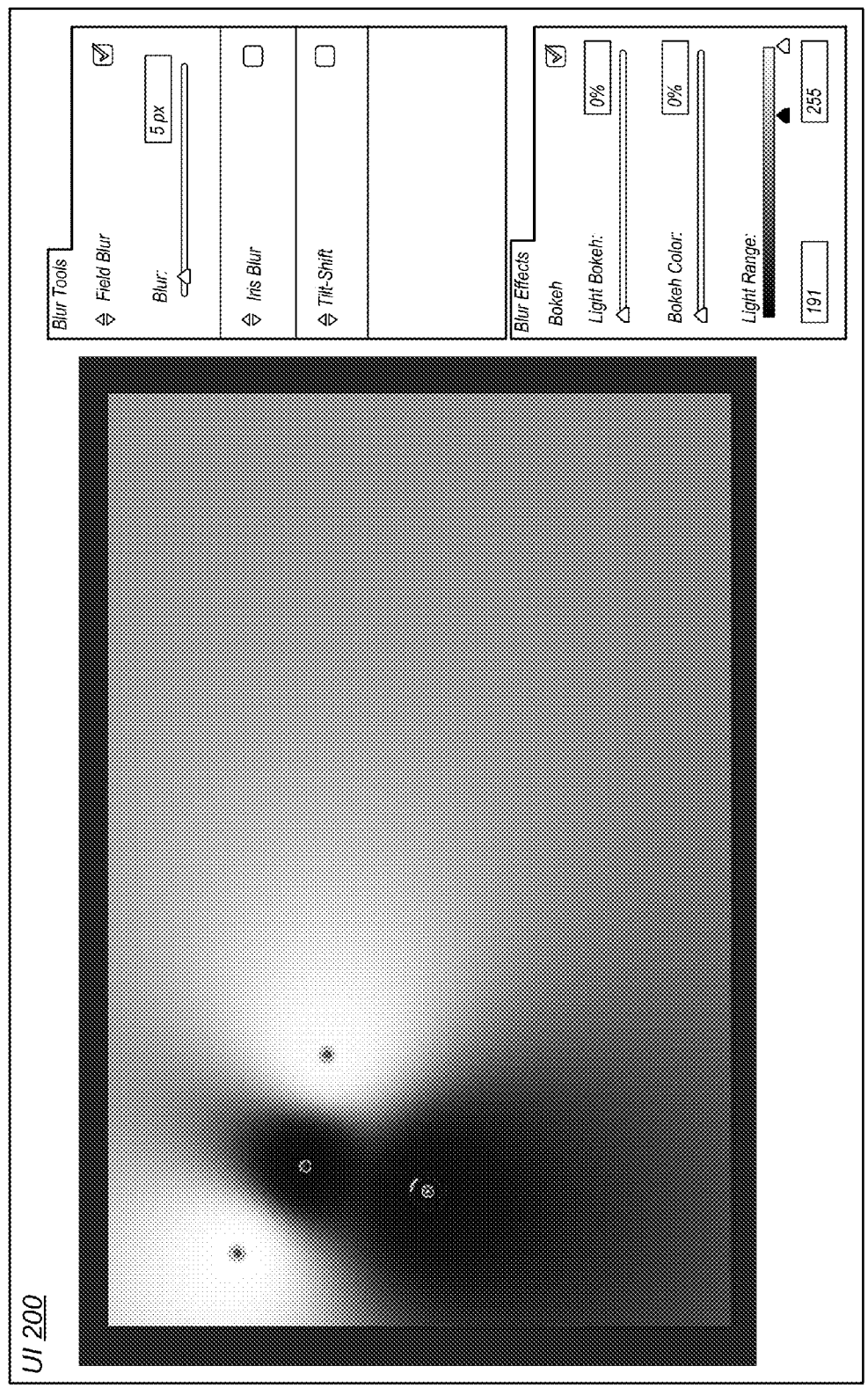
FIGS. 14A through 14C illustrate applying multiple blur patterns to an image, according to at least some embodiments.
Figure 14B:
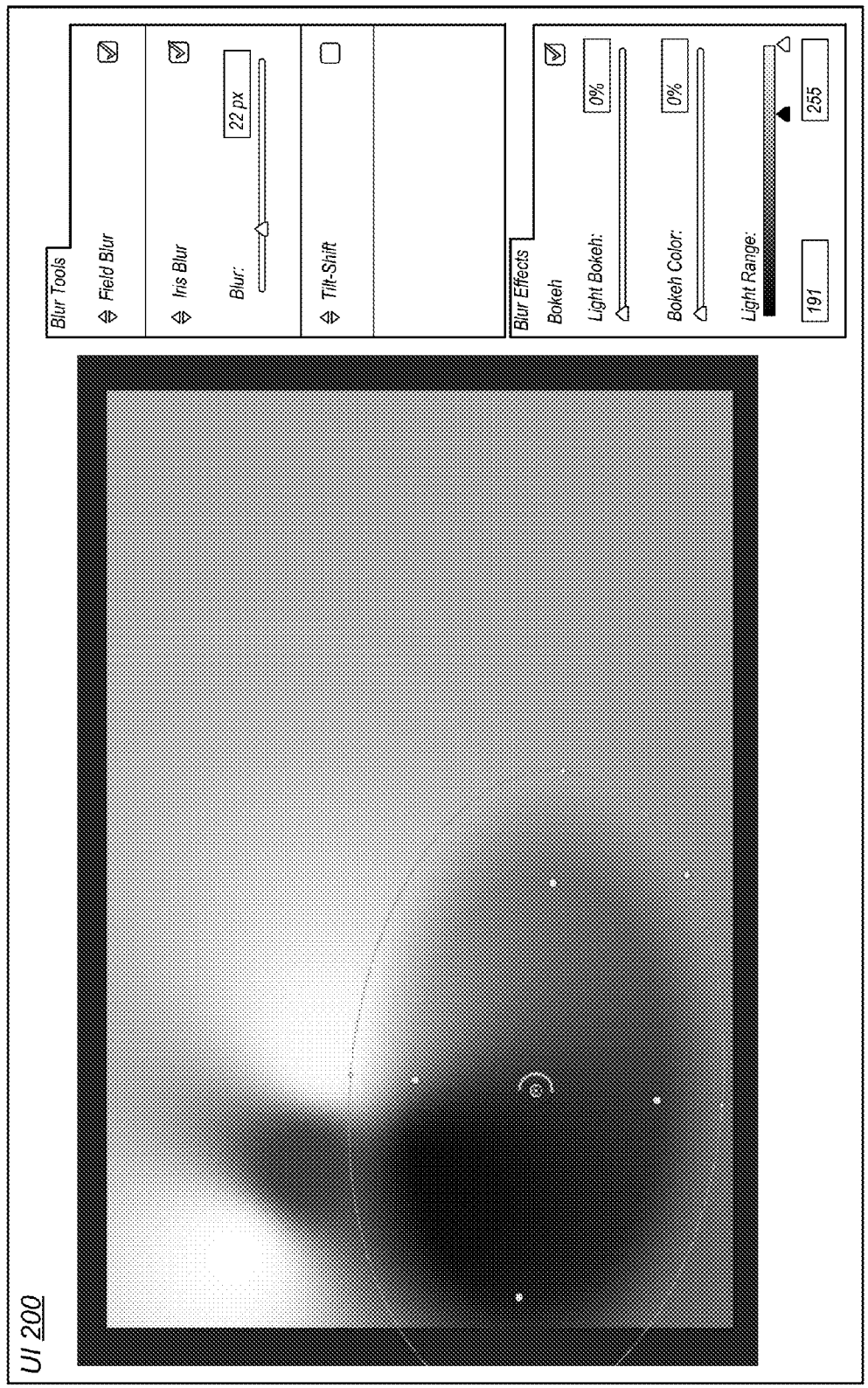
Figure 14C:
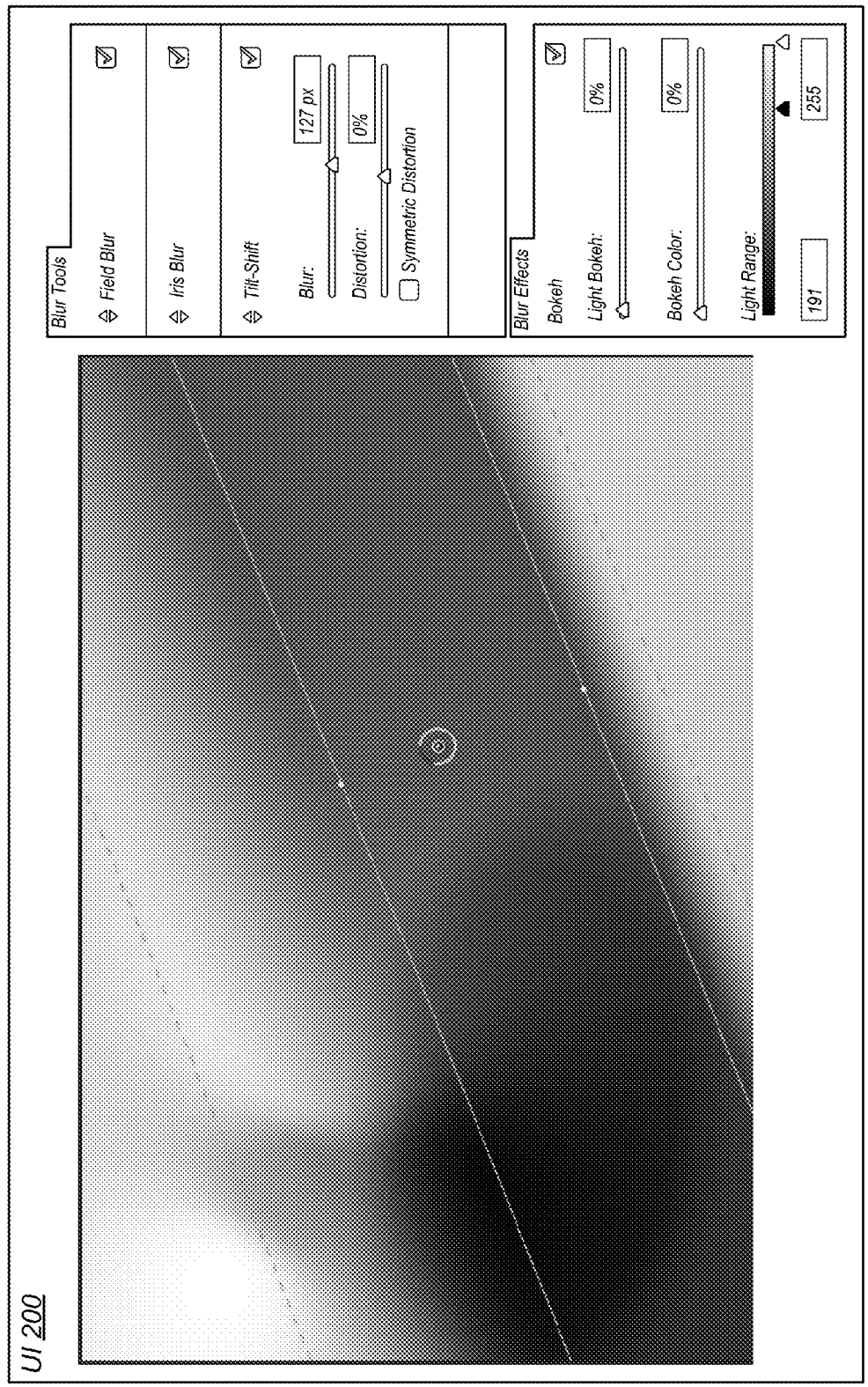

In at least some embodiments, the user may also selectively apply a bokeh effect to the image, for example using the user interface elements in bokeh effect controls 228. Examples of the bokeh effect applied to images with a field blur are shown in FIG. 12A and FIGS. 15A-15D. In addition, the user may also selectively apply iris blur and/or tilt-shift blur to the image (see FIGS. 21 22 21 for UIs for applying iris and tilt-shift blur patterns, respectively). FIGS. 14A-14C illustrate applying multiple blur patterns (field blur, iris blur, and tilt-shift blur) to an image, according to at least some embodiments. Note that the bokeh effect may be applied to blur region(s) in an image in which field, iris, and/or tilt-shift blurs have been combined.

Iris Blur

Figure 9A:
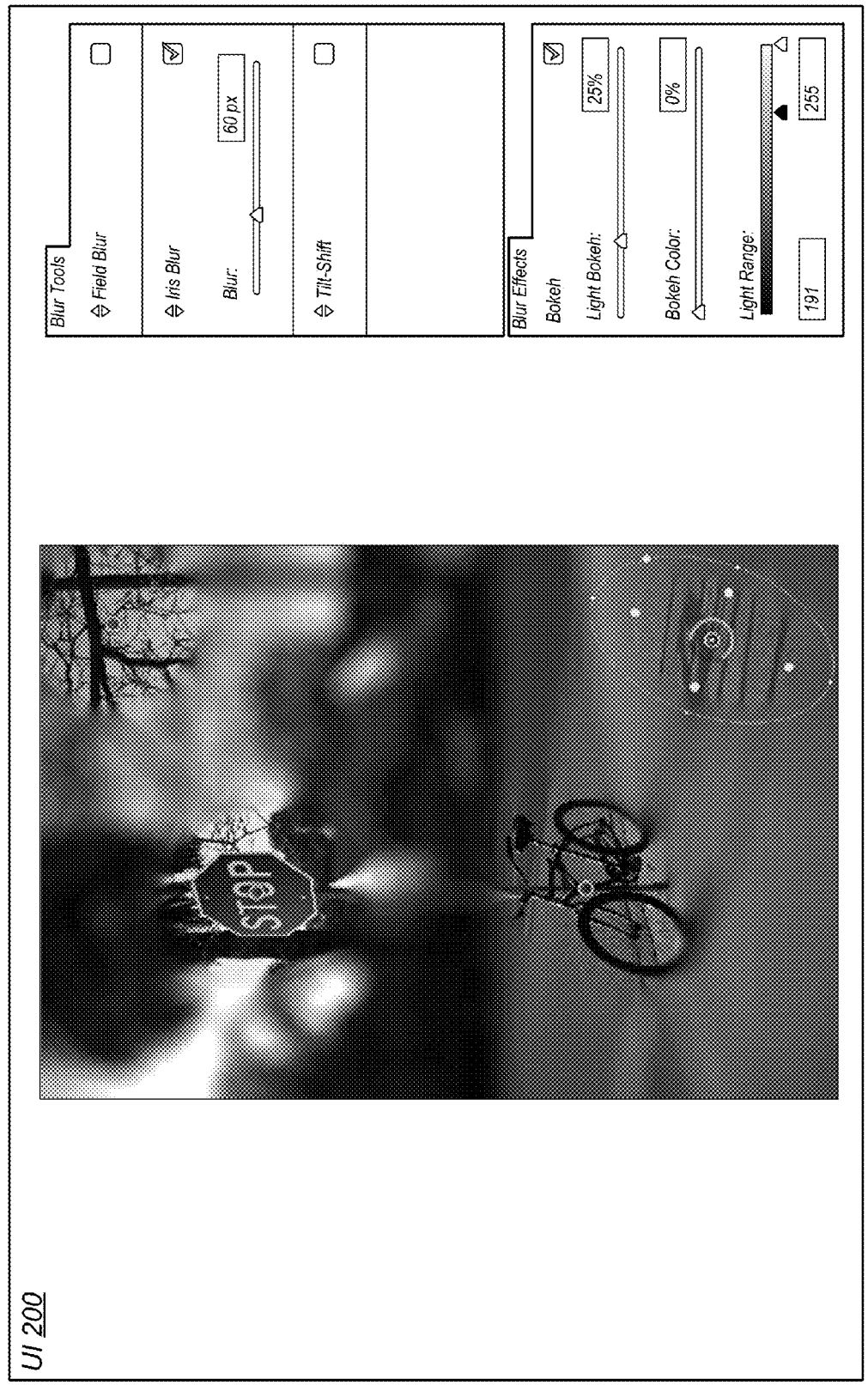
FIGS. 9A through 9C illustrate applying iris blur to an example image, according to at least some embodiments.
Figure 9B:
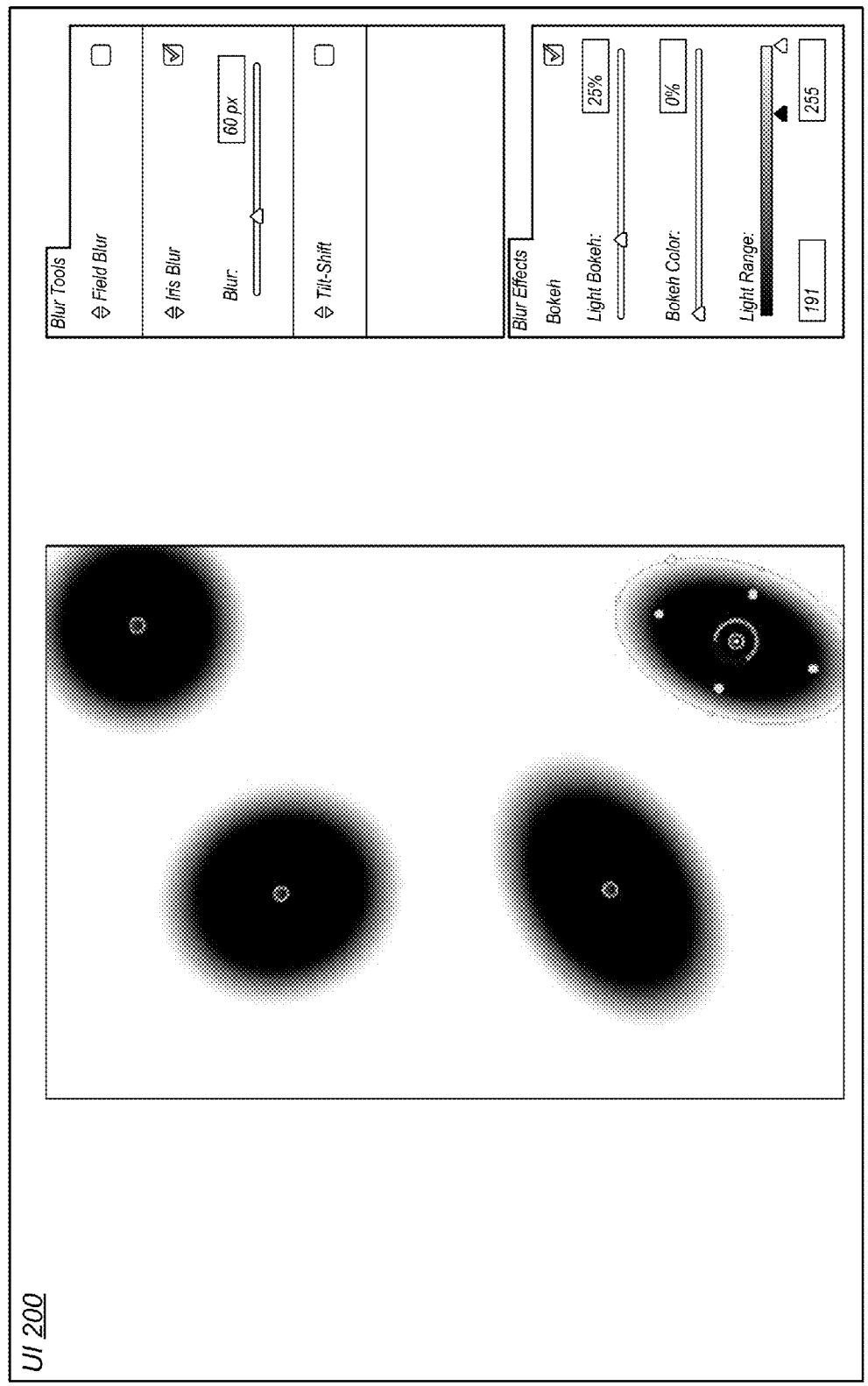
Figure 9C:
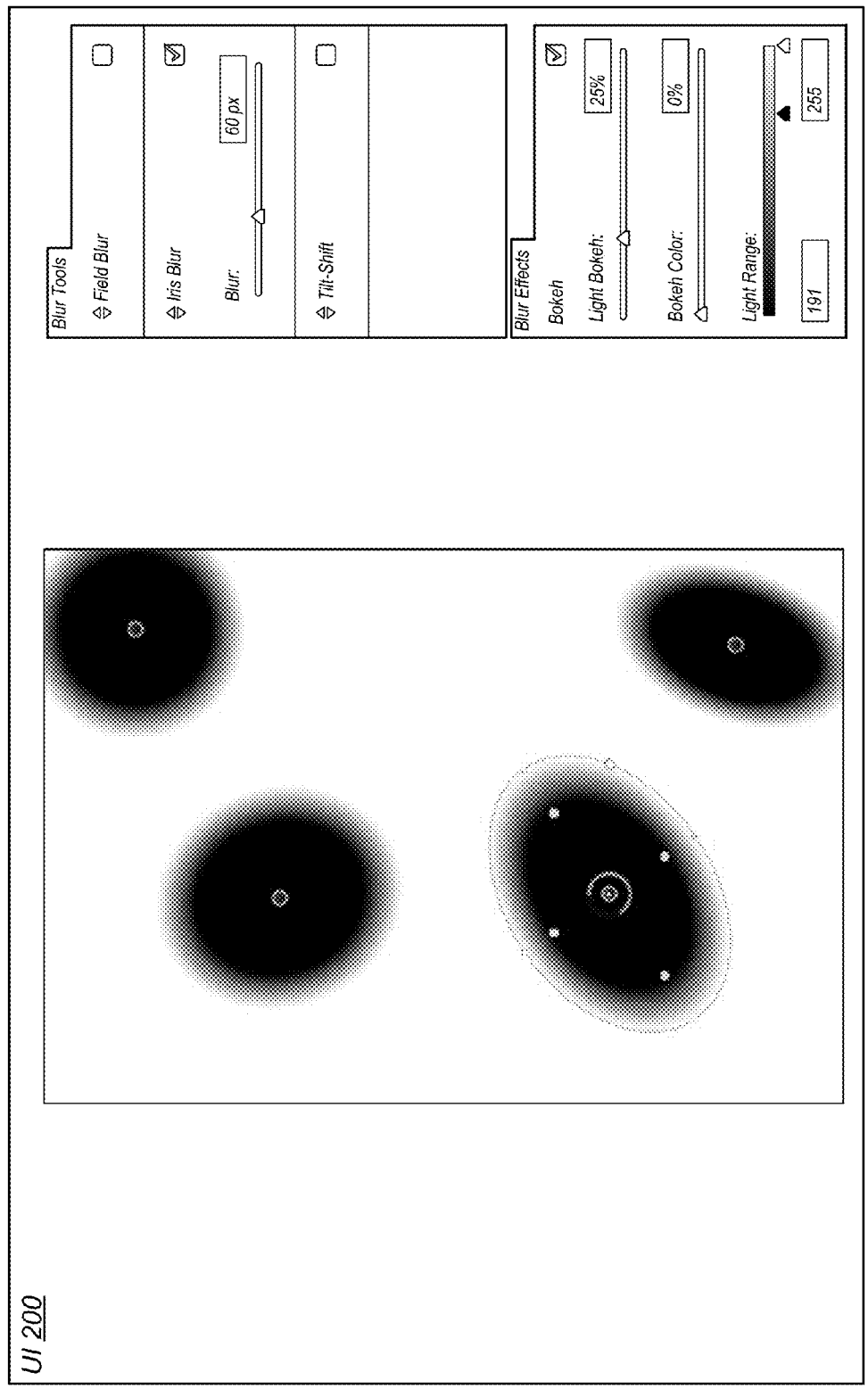

At least some embodiments of a blur module may provide a non-destructive method for specifying elliptical blurs that may be used to model an iris blurring effect seen in real-world cameras, referred to herein as an iris blur, or iris blur pattern. At least some embodiments of the blur module may provide an iris blur tool via the user interface via which users may apply the iris blur pattern. In at least some embodiments, the iris blur tool allows the user to place one, two, or more pins over the image and to specify iris blur parameters (e.g. a blur radius, ellipse dimensions and shape, feathering region, etc.) at each iris blur pin. In at least some embodiments, an on-canvas iris blur widget may be provided via which the user may adjust the various iris blur parameters (see, e.g., FIG. 21). A blur algorithm applies an iris blur pattern according to the iris blur parameters at each iris blur pin. FIGS. 9A through 9C are provided as examples of the iris blur pattern, and show an example in which four iris blur pins are applied to an image via the iris blur user interface (UI), and iris blur parameter(s)

are adjusted via the iris blur UI, to produce a blur pattern that is a combination of the four iris blurs.

Figure 21:
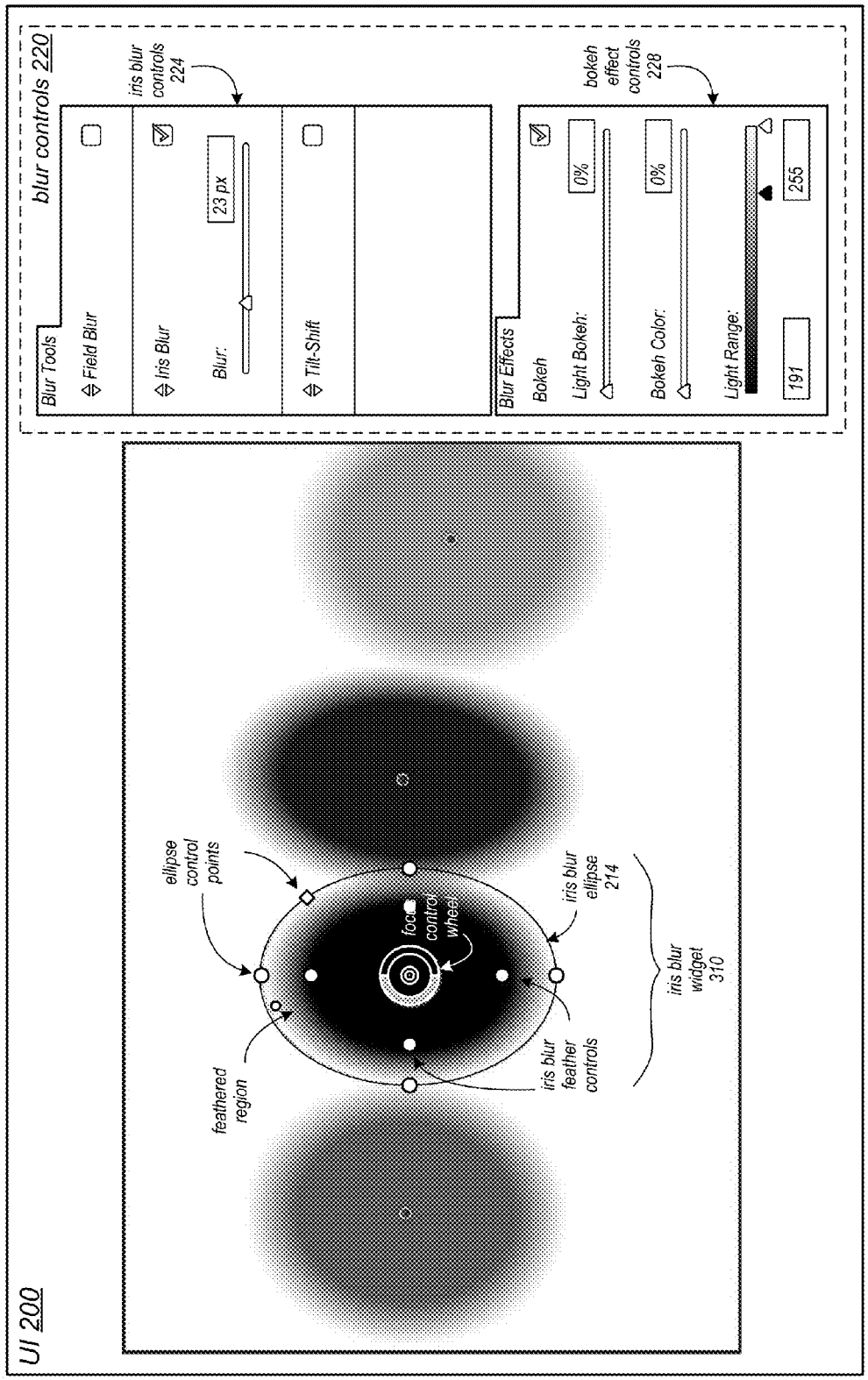
FIG. 21 illustrates an example iris blur user interface, according to at least some embodiments.

FIG. 21 illustrates an example iris blur user interface, according to at least some embodiments. In particular, FIG. 21 shows an example on-canvas iris blur widget 310 that may be used in some embodiments, displayed at a currently selected one of the iris blur pins indicated by the four bullseye circles at the centers of the four shaded regions. The iris blur widget may include at least a focus control wheel that the user may manipulate to adjust the blur radius at the selected iris blur pin. Alternatively, in at least some embodiments, the user may adjust the blur radius using a blur control (e.g., a blur slider bar) in iris blur controls 224. The iris blur widget 310 may also include an iris blur ellipse 214 that indicates the outer boundary of the iris blur pattern. In at least some embodiments, the user may grab and adjust the iris blur ellipse 214 via the cursor control device (for example, at one of the ellipse control points) to expand, shrink, and/or stretch the ellipse 214, to change the shape of the ellipse (e.g., to a more rectangular (non-elliptical) shape), and/or to rotate the ellipse. In at least some embodiments, the ability to manipulate the shape of the ellipse 214 via the user interface allows continuous control of the shape of the ellipse from elliptical (or circular) to rectangular. In at least some embodiments, the iris bur ellipse 214 may extend beyond the borders of the canvas, for example as illustrated in FIG. 14B. Alternatively, other techniques may be provided to cause the ellipse 214 to expand, contract, change shape, rotate, and/or stretch. In addition, an iris blur widget may include one or more feather controls that may be manipulated by the user to control the inner boundary of the iris blur. The iris blur is "feathered" between the inner boundary indicated by these feather controls and the ellipse 214. At least some embodiments may provide independent control over these inner feather control points to thus provide a flexible inner boundary shape. In at least some embodiments, the independent control over the inner feather control points, along with the control of the outer boundary, may enable the modulation of the spatial pattern of the applied lens blur. This feature is further described in the section titled Flexible super-ellipse. In at least some embodiments, the region inside the inner boundary is not blurred, while the region outside the ellipse 214 is blurred according to the blur amount. The region in between (the feathered region) varies smoothly from not blurred at the inner boundary to blurred at the outer boundary. In at least some embodiments, as an alternative or as an option available to the user, blurring may be applied according to the blur amount within the inner boundary, with no blurring outside the outer boundary and feathered blurring between the two boundaries.

In at least some embodiments, the user may also selectively apply a bokeh effect to the image, for example using the user interface elements in bokeh effect controls 228. In addition, the user may also selectively apply field blur and/or tilt-shift blur to the image (see FIGS. 20 and 22 for UIs for applying field and tilt-shift blur patterns, respectively). FIGS. 14A-14C illustrate applying multiple blur patterns (field, iris, and tilt-shift blur) to an image, according to at least some embodiments. Note that the bokeh effect may be applied to blur region(s) in an image in which field, iris, and/or tilt-shift blurs have been combined.

Flexible Super-ellipse

In at least some embodiments, the iris blur pattern may provide a super-ellipse spatial shape that may be used to modulate the spatial pattern of the applied iris blur. In at least some embodiments of the iris blur user interface, for example as illustrated in FIG. 21, there is an outer super-ellipse ring (which is initially elliptical by default) and an inner super-ellipse that is defined by multiple (e.g., four) inner control points. The inner control points control an inner boundary of the iris blur pattern (see the feather control points in FIG. 21); the outer control points control an outer boundary of the iris blur pattern (see the ellipse 214 with control points in FIG. 21). In at least some embodiments, the outer control points may be used to form elliptical shapes for the iris blur pattern that vary from substantially square to circular. In at least some embodiments, the region inside the inner boundary is not blurred, while the region outside the outer boundary is blurred according to the blur amount. The region in between (the feathered region) varies smoothly from not blurred at the inner boundary to blurred at the outer boundary.

Figure 10A:
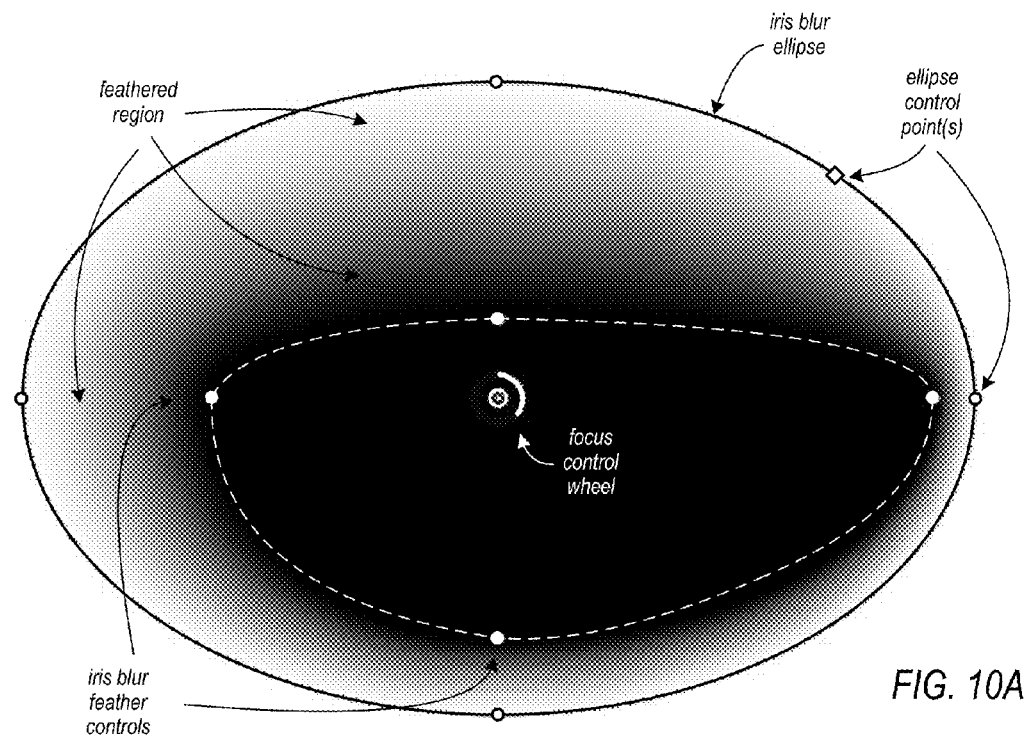
FIGS. 10A and 10B illustrate an example iris blur interface and example iris blur patterns in which the inner and outer controls provided by the user interface may be manipulated to produce a modulated blur mask, according to at least some embodiments.
Figure 10B:
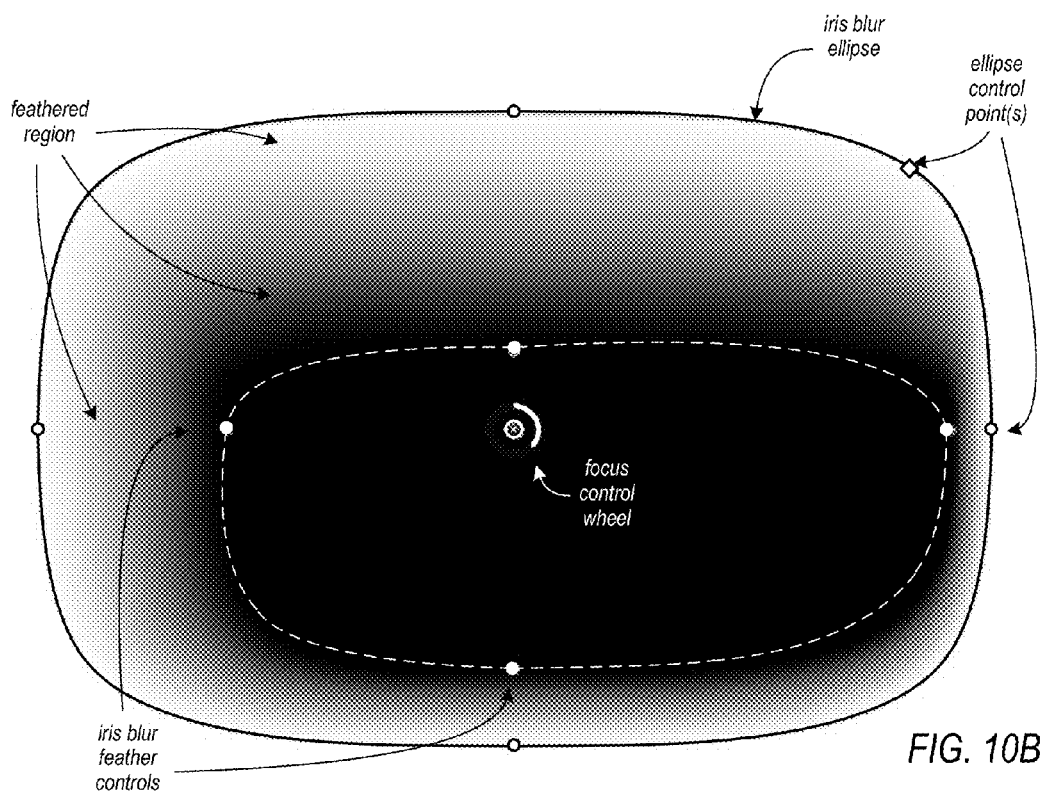

FIGS. 10A and 10B illustrate an example iris blur interface and example iris blur patterns in which the inner and outer controls provided by the user interface may be manipulated to produce a modulated blur mask, according to at least some embodiments. FIG. 10A shows an outer boundary for the iris blur pattern that has been formed into an normal ellipse using the control points on the ellipse. FIG. 10B shows an outer boundary for the iris blur that has been made more square-like using the control points on the ellipse. In at least some embodiments, when the user moves one of the inner control points using a cursor control device while holding down a key (e.g., the Alt key), that point is moved independently of the other control points. The boundary on which the four inner control points (also referred to as iris blur feather controls) lie forms a new shape which is not that of a super-ellipse (i.e., the shape made by the outer boundary), but instead is more flexible or non-regular; this shape may be referred to as a flexible super-ellipse. The result is a flexible or non-regular super-ellipse for the inner boundary of the iris blur pattern and an ordinary or regular super-ellipse for the outer boundary of the iris blur patter, as illustrated in FIGS. 10A and 10B. In both FIGS. 10A and 10B, the shape defined by the white dotted line shows an approximation of the flexible super-ellipse defined in these two examples by independently manipulating the iris blur feather controls. In some embodiments, a flexible super-ellipse may also (or instead) be used for the outer boundary of the iris blur pattern.

The following defines a method for specifying the shape of this flexible super-ellipse as well as a method for using the two shapes (the inner flexible super-ellipse and the outer regular super-ellipse) to define a function to determine the pattern of spatial variation of the desired blur radius field.

Super-ellipse Details

As used herein, a super-ellipse is a function that generalizes an ellipse to enable the shape to have varying degrees of squareness (see, e.g., FIG. 10B). A defining equation for the super-ellipse, which relates the x and y position of a point (x, y) on the super-ellipse shape relative to the origin, is:

$$\left(\frac{x}{a}\right)^s + \left(\frac{y}{b}\right)^s = 1$$

where a and b are the respective horizontal and vertical ellipse radii (major and minor axis radii) and s is a parameter which controls the squareness. When s=2, the equation describes an ellipse. Values for s larger than 2 produce more rectangular shapes with progressively sharper and sharper corners.

In at least some embodiments, at default settings, the iris blur pattern's outer control curve is elliptical in shape. If the squareness control on the shape is moved, the squareness parameter, s, is varied to produce more or less square superellipses. This can be done by letting an angle parameter, A, vary from 0 to 2 pi in small steps and producing the points (x (A), y (A)) on the super-ellipse as:

$$x(A) = a[\cos(A)]^{2/s}$$

$$y(A) = a[\sin(A)]^{2/s}$$

Note that in general the super-ellipse may be rotated so that it is oriented along an arbitrary angle. This is achieved by a standard rotation by angle, T, of x and y about the origin of the super-ellipse (taken as (0, 0) here, though not limited to this value):

$$x' = x \cos(T) - y \sin(T)$$

$$y' = y \cos(T) - x \sin(T)$$

For the purpose of simplicity this description will ignore rotations.

Flexible Super-ellipse Details

In at least some embodiments, the inner control points (i.e., the feather control points in FIG. 21) in the iris blur user interface lie by default on a super-ellipse that lies inside the outer ring's super-ellipse. No blurring occurs inside the inner shape. Between the inner and the outer shapes the blur radius increases from 0 at the inner boundary to its maximum value, $R_{max}$. In the default case, it suffices to determine a function, $f(x, y)$, which takes on values of 0 at the inner boundary and values of 1 at the outer boundary. Having found this function, the blur radius, R (x, y), can be found at any location (x, y) by multiplying this function by the maximum blur radius $R_{max}$ (the blur radius at the outer boundary):

$$R(x,y) = f(x,y)R_{max}.$$

To achieve the flexible super-ellipse for the inner boundary of the iris blur pattern, the inner boundary is generalized to be more flexible than a super-ellipse shape. In at least some embodiments, this may be implemented by providing separate super-ellipse "radii" for each angular quadrant. The following definitions may be used:

$$a_{in}(x) = (0 <= x) ? a_1 : a_2,$$

$$b_{in}(y) = (0 <= y) ? b_1 : b_2,$$

where $a_1$ and $a_2$ define the distance from the origin of the left and right control points along the (horizontal) x axis, and $b_1$ and $b_2$ define the distance from the origin of the top and bottom control points along the (vertical) y axis.

The inner flexible super-ellipse shape is then specified by generalizing the super-ellipse shape to:

$$\left(\frac{x}{a_{in(x)}}\right)^s + \left(\frac{y}{b_{in(y)}}\right)^s = 1.$$

The outer super-ellipse can be specified as $$\left(\frac{x}{a_{out}}\right)^s + \left(\frac{y}{b_{out}}\right)^s = 1.$$

At this point, there are definitions for the inner flexible super-ellipse boundary and for the outer super-ellipse boundary. In order to determine the blur radius needed at each x, y location, a function, $f(x, y)$ needs to be found which takes on values of 0 at the inner shape and values of unity (1) at the outer shape and which goes smoothly between values of 0 and 1 in-between the two shapes. In at least some embodiments, this may be accomplished by interpolating between the inner and outer parameters and determining the associated interpolation parameter. In at least some embodiments, the interpolated radii may be defined by $$a(f,x) = (1-f)a_{in(x)} + f a_{out},$$

$$b(f,y) = (1-f)b_{in(y)} + f b_{out}.$$

For any specified pixel location (x, y) the value of the interpolating function, $f$, is found, which makes the corresponding super-ellipse-like shape pass through the specified point. This is accomplished by ensuring that the following equation holds:

$$\left(\frac{x}{a(f,x)}\right)^s + \left(\frac{y}{b(f,y)}\right)^s = 1.$$

In other words, for each desired value of x and y, the value of $f$ is found such that the left side of this equation takes on a value of unity. The equation is nonlinear and there are many techniques for solving such equations. In at least some embodiments, a combination of first order and second order approximation methods may be used. In at least some embodiments, specifically, Newton's first order method may be used in combination with Halley's second order method.

In at least some embodiments, $f$ may be initialized to have a value of 0.3, and two second order iterations followed by six first order iterations may be used. In at least some embodiments, the number of first order iterations may be reduced by checking an error measure at each iteration and ending the calculation if the error measure is less than some prescribed threshold value.

At least some embodiments solve for the value of $f$ that makes the function:

$$G = \left[\left(\frac{x}{a(f,x)}\right)^s + \left(\frac{y}{b(f,y)}\right)^s\right]^{1/s} - 1$$

as close to zero as possible. In other words, G($f$) is the function for which Newton or Halley's method is used to find the solution for $f$ which makes G close to zero. The following describes an algorithm that may be used to accomplish this, in at least some embodiments, and is not intended to be limiting.

The algorithm begins with an initial value of $f=0.3$. The second order method is then repeated two times:

repeat twice:
    calculate G, and calculate G' and G", its first and second derivatives with respect to $f$.
    update:

$$f = f + (G/G')/[1 + \text{sqrt}\{1 - 2(G/G')(G''/G')\}]$$

The first order method is then repeated six times:
calculate G and G', its derivative with respect to $f$.
update:

$$f = f - G/G'$$

In at least some embodiments, as a final step, the resultant value of $f$ may be modified to produce a softer gradation near values of zero. This may be performed with a fifth order modulation:

$$c_0 = 5.0;$$

$$c_1 = 10.0 - 4.0 * c_0;$$

$c_2 = 5.0*(c_0 - 3.0);$ $c_3 = 6.0 - 2.0*c_0;$ $f_{modulated} = f*f*(c_0 + f*(c_1 + f*(c_2 + f*c_3)));$ Note that the value is set to zero whenever the point (x, y) lies within the inner flexible super-ellipse and is set to unity when it lies outside the outer super-ellipse. The resultant values for $f_{modulated}$ may be displayed as the mask values, for example when the user presses the M key in iris blur mode. See the example blur field masks generated according to this method in FIGS. 10A and 10B. $f_{modulated}$ may also be used to produce the spatially varying blur radius field by multiplication with the maximum blur radius.

Tilt-shift Blur

Figure 11A:
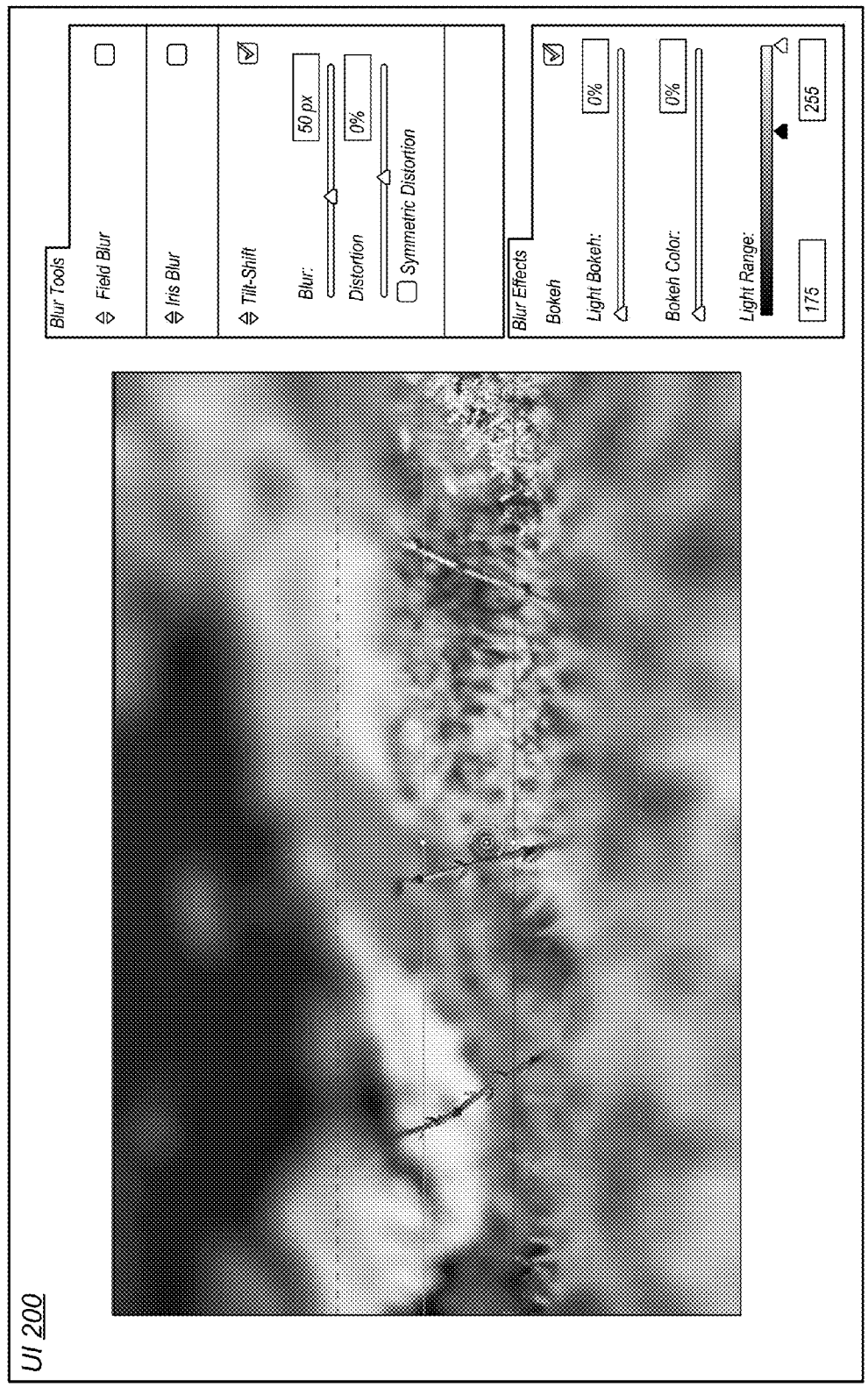
FIGS. 11A through 11H illustrate applying tilt-shift blur to an example image, according to at least some embodiments.
Figure 11B:
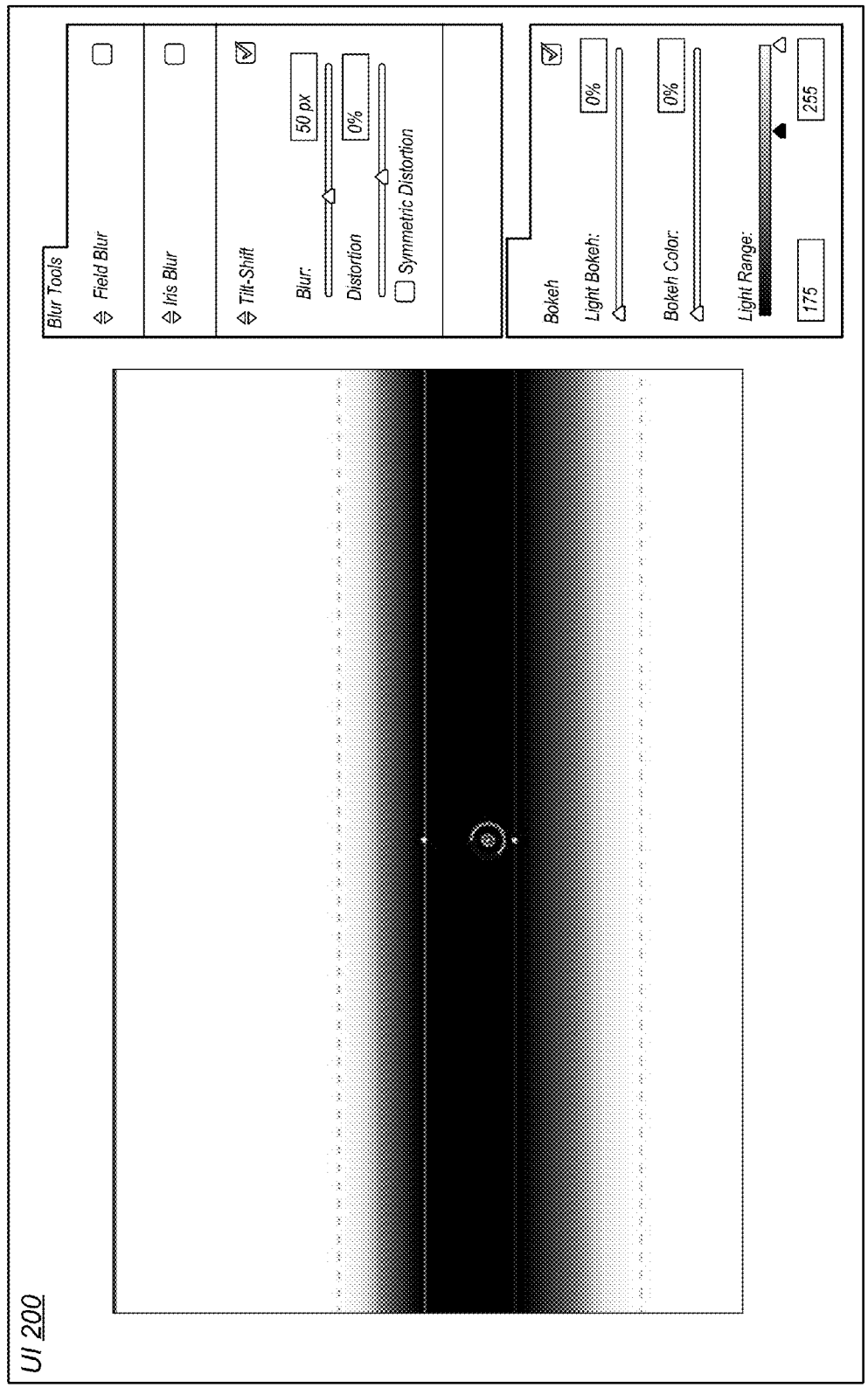
Figure 11C:
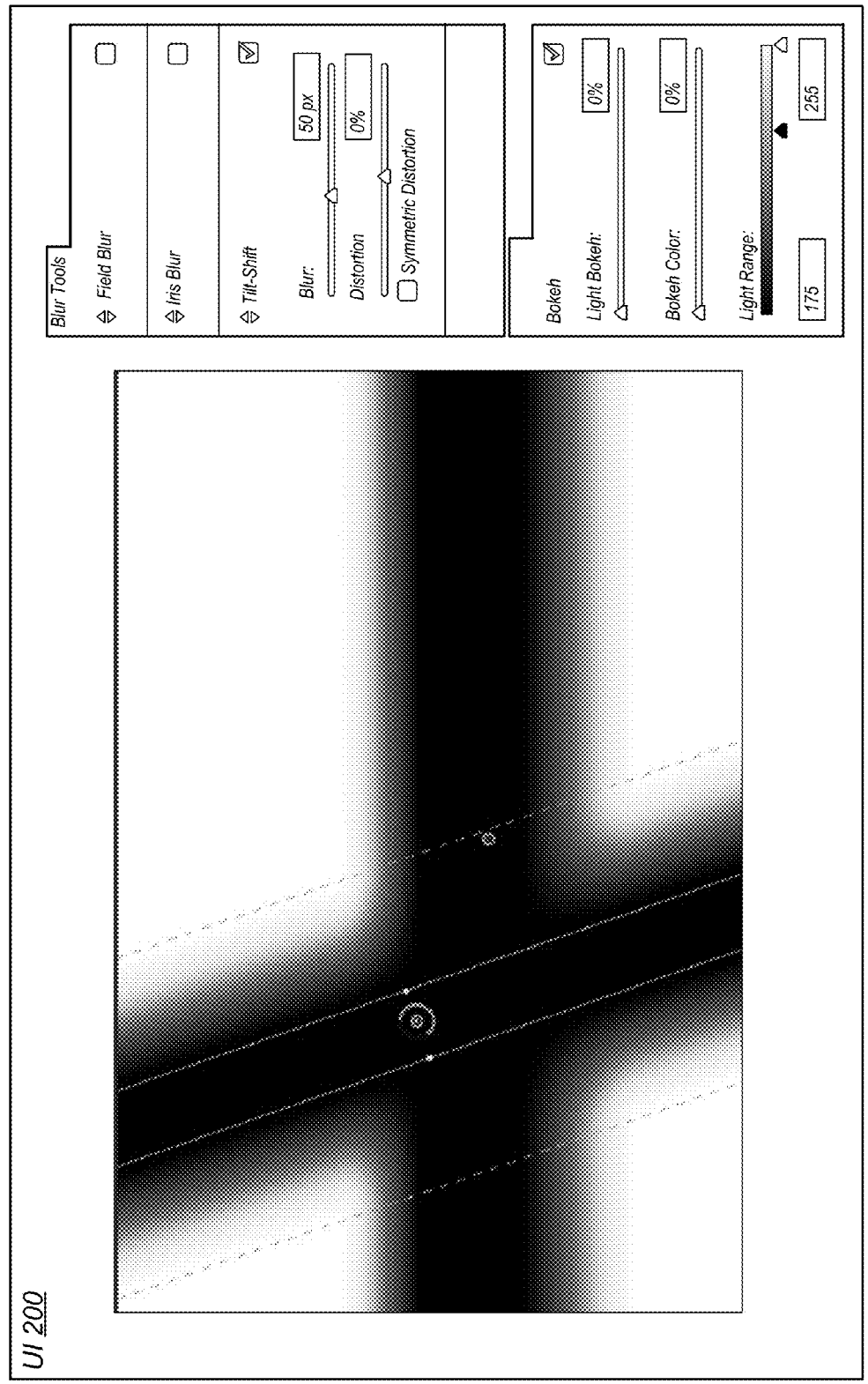
Figure 16A:
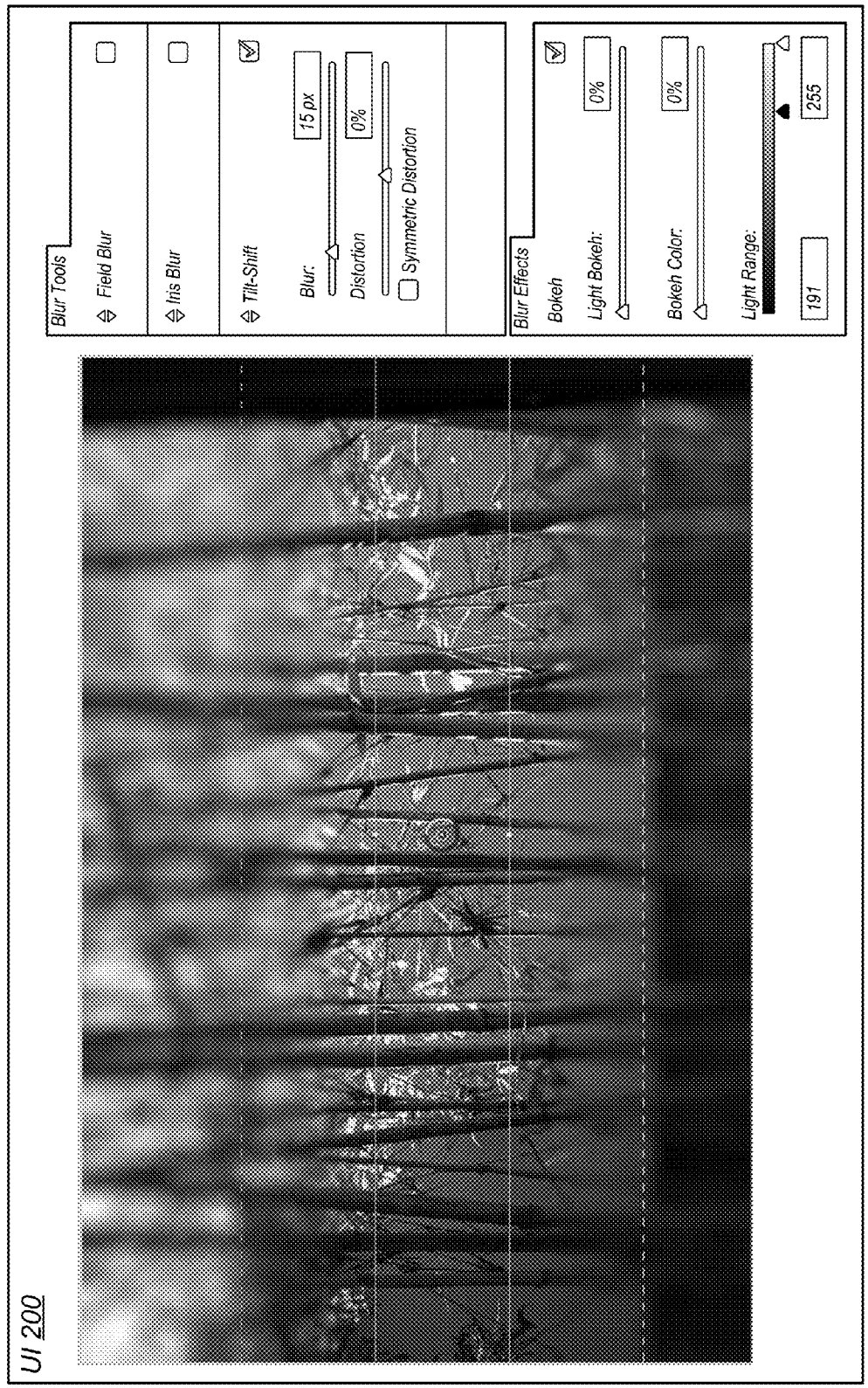
FIGS. 16A through 16D illustrate applying tilt-shift blur to an example image, according to at least some embodiments.
Figure 16B:
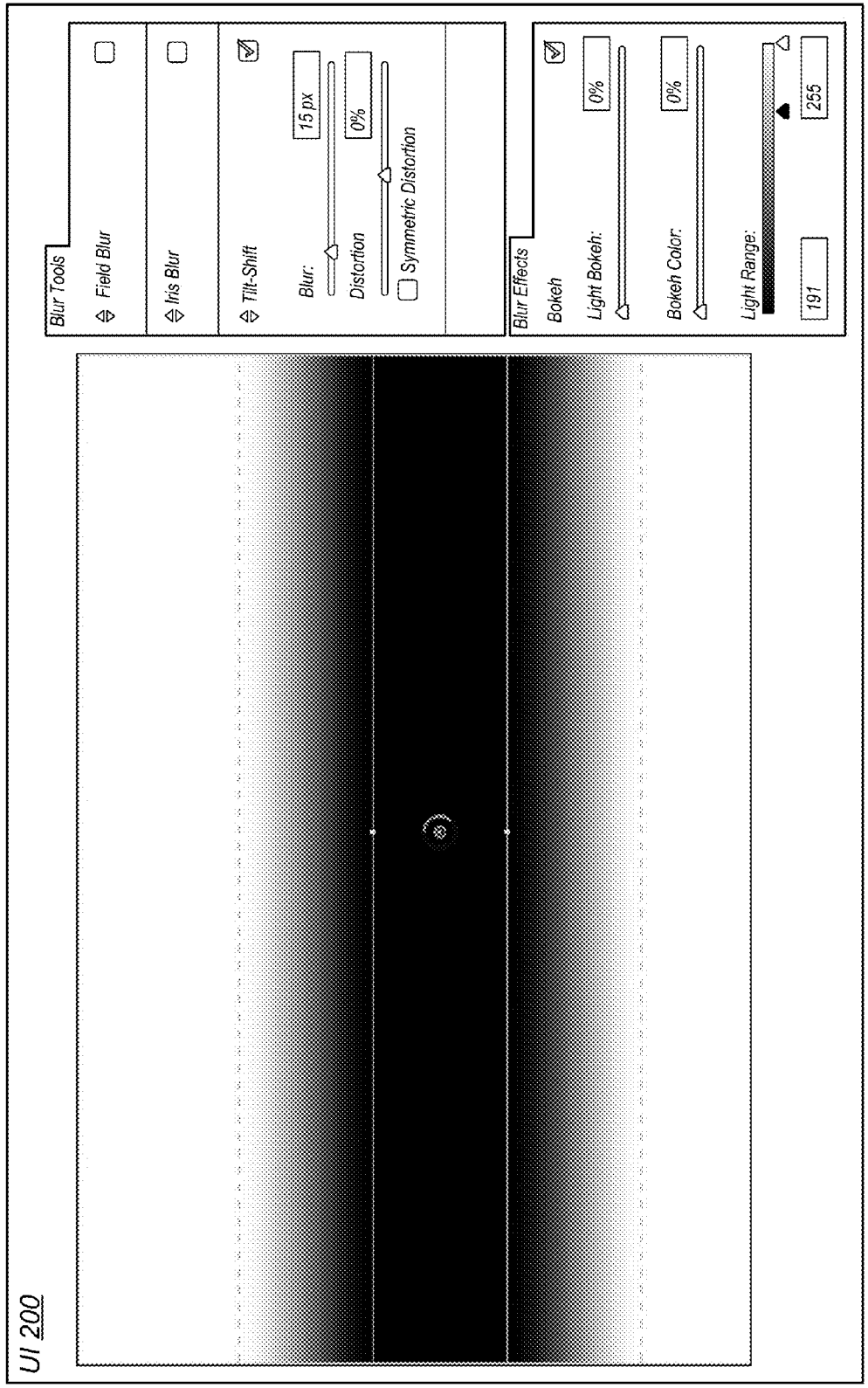
Figure 16C:
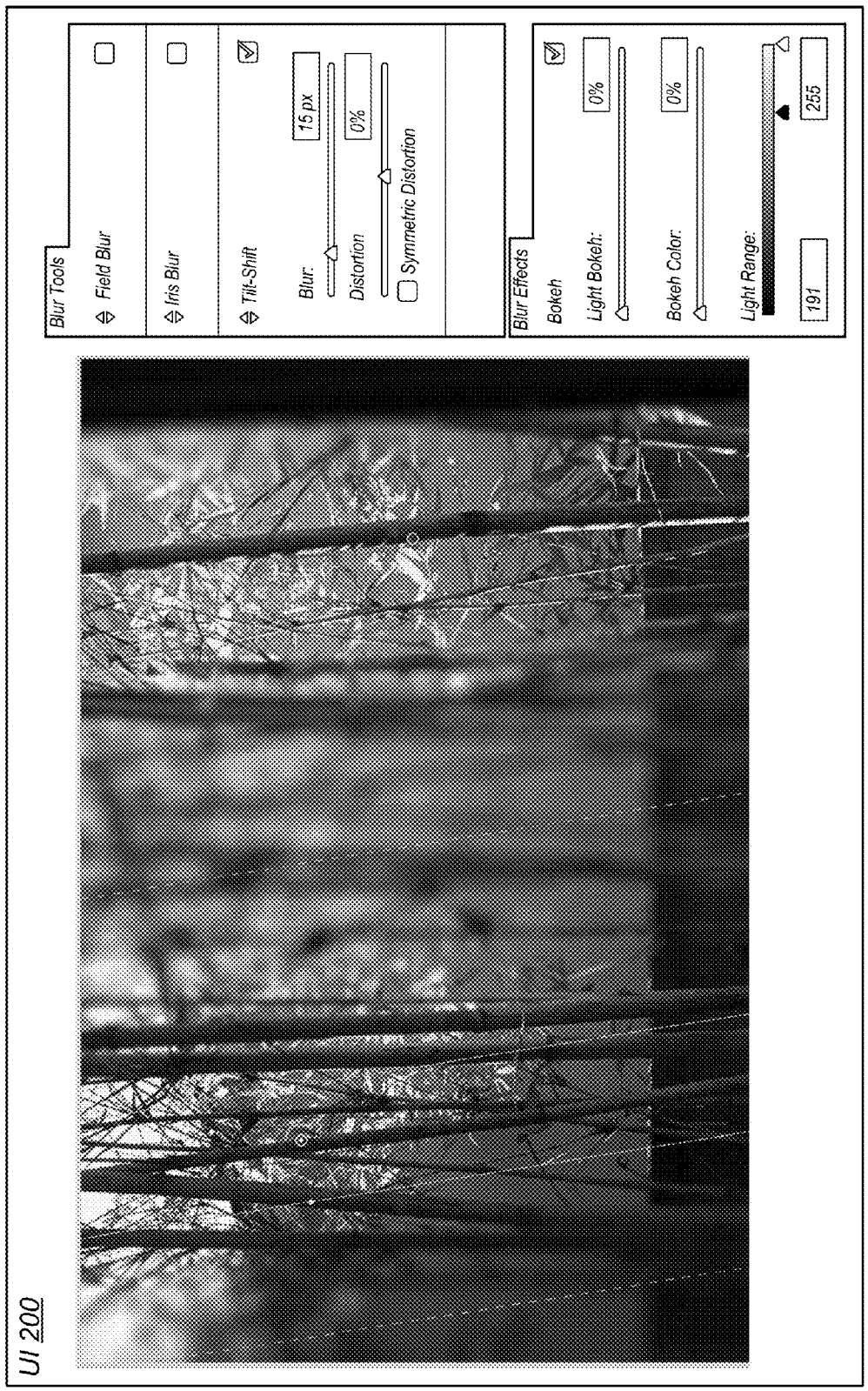
Figure 16D:
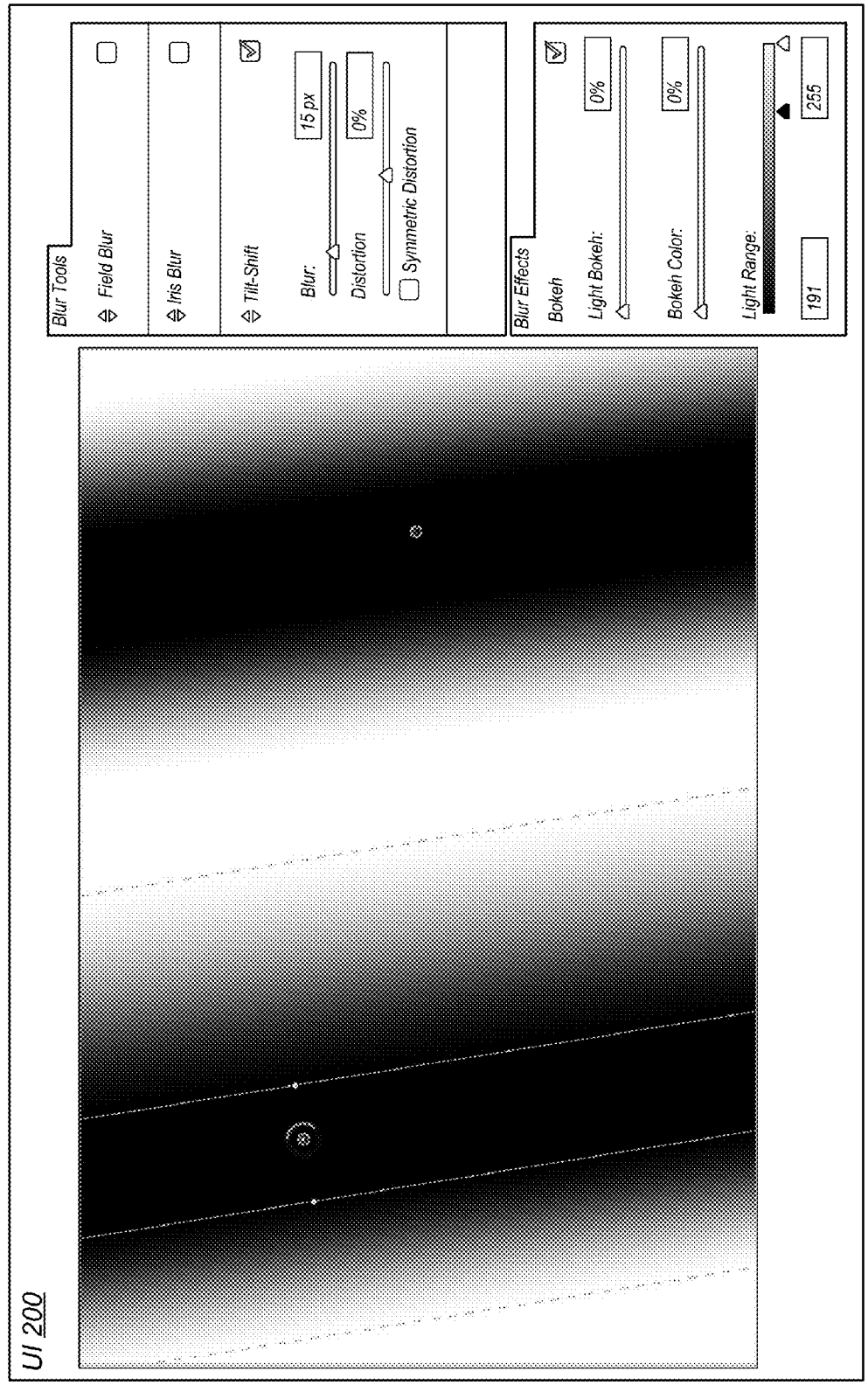

At least some embodiments of a blur module may provide a non-destructive method for specifying tilt-shift blurs that may be used to model a tilt-shift blurring effect seen in real-world cameras, referred to herein as a tilt-shift blur, or tilt-shift blur pattern. At least some embodiments of the blur module may provide a tilt-shift blur tool via the user interface via which users may apply the tilt-shift blur pattern. In at least some embodiments, the tilt-shift blur tool allows the user to place one, two, or more pins over the image and to specify tilt-shift blur parameters (e.g. a blur radius, tilt-shift dimensions, feathering region, etc.) at each tilt-shift blur pin. In at least some embodiments, an on-canvas tilt-shift blur widget may be provided via which the user may adjust the various tilt-shift blur parameters (see, e.g., FIG. 22). A blur algorithm applies the tilt-shift blur pattern according to the tilt-shift blur parameters at each tilt-shift blur pin. FIGS. 11A through 11H are provided as examples of the tilt-shift blur pattern. FIGS. 11A and 11B show a single tilt-shift blur. FIG. 11B shows the radius field (blur mask) for the single pin, and FIG. 11A shows an image blurred according to the mask in FIG. 11B. FIG. 11C shows an example radius field (blur mask) generated according to two tilt-shift blur pins and the tilt-shift settings at the two tilt-shift blurs. The two tilt-shift blurs are applied to the image via the tilt-shift blur user interface (UI), and tilt-shift blur parameter(s) may be adjusted independently at each tilt-shift pin, via the tilt-shift blur UI to produce a radius field (blur mask) that is a combination of the two tilt-shift blurs, as shown in FIG. 11C. FIGS. 16A-16D provide another example of applying the tilt-shift blur to an example image, with FIGS. 16A-16B showing the image and radius field as generated according to a single tilt-shift blur, and FIGS. 16C-16D showing the image and radius field as generated according to two tilt-shift blurs. Note that, as shown in the example Figures, the tilt-shift blurs may be rotated from horizontal to vertical, and to all angles in between.

Figure 22:
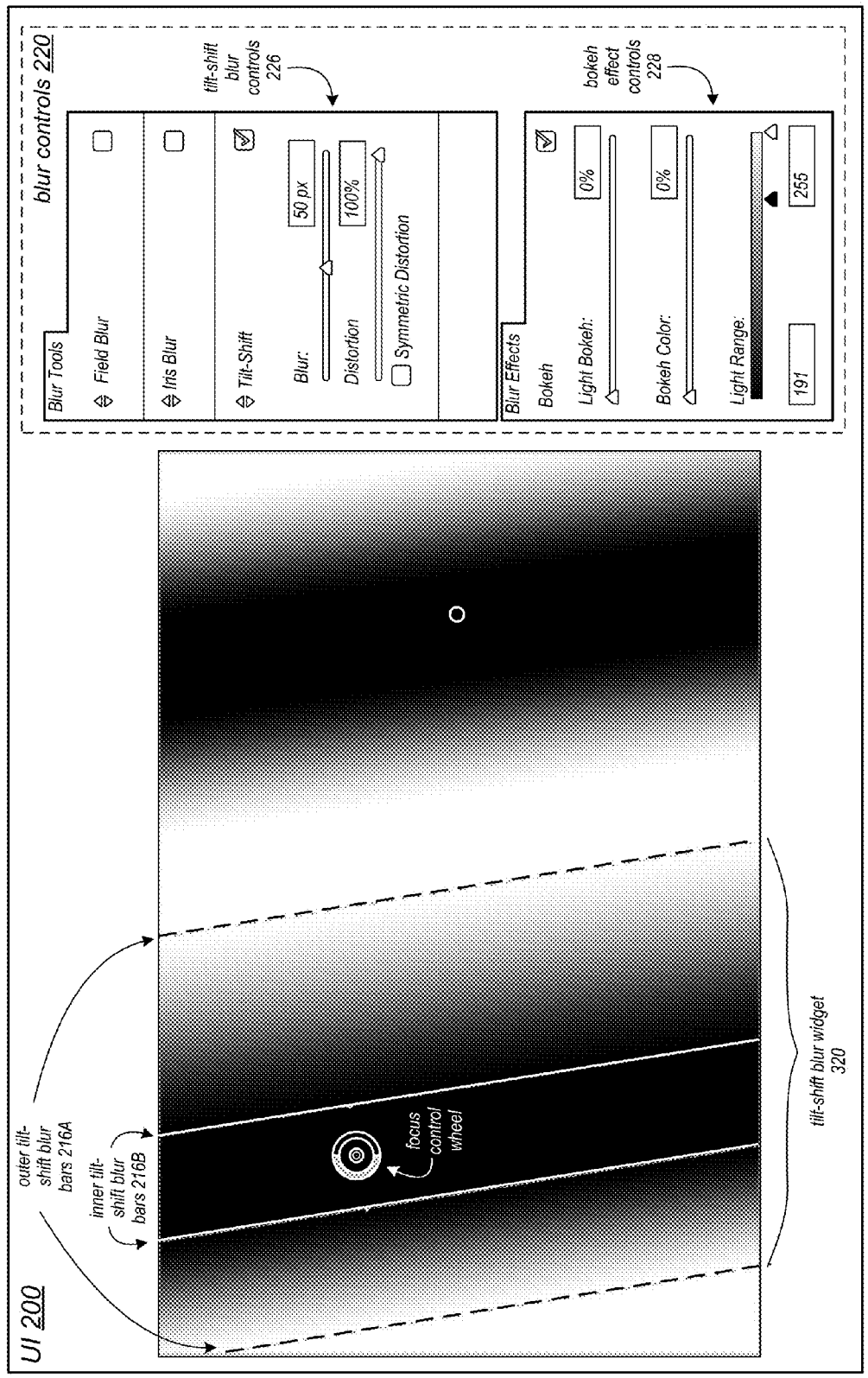
FIG. 22 illustrates an example tilt-shift blur user interface, according to at least some embodiments.

FIG. 22 illustrates an example tilt-shift blur user interface, according to at least some embodiments. In particular, FIG. 22 shows an example on-canvas tilt-shift blur widget 330 that may be used in some embodiments, displayed at a currently selected one of the tilt-shift blur pins indicated small white circles (there are two tilt-shift blur pins in this example). The tilt-shift blur widget may include at least a focus control wheel that the user may manipulate to adjust the blur radius at the currently selected tilt-shift blur pin. Alternatively, in at least some embodiments, the user may adjust the blur radius using a blur control (e.g., a blur slider bar) in tilt-shift blur controls 226. The tilt-shift blur widget 320 may also include two or more bars 216 that may be displayed as part of the tilt-shift blur widget to indicate ranges of the tilt-shift blur pattern. The bars 216 may be moved relative to each other and/or relative to the respective pin for the tilt-shift blur instance, may be rotated, and so on via the mouse or other control device. In at least some embodiments, the bars 216 may include two outer bars 216A and two inner bars 216B, as illustrated in FIG. 22. In at least some embodiments, no (zero) blur may be applied within the inner bars 216B, a maximum blur may be applied outside the outer bars 216A, and the blur pattern may be feathered between the inner bars 216B and outer bars 216A, from zero at the inner bars 216B to maximum at the outer bars 216A. The two inner bars 216B enable the widening of the central region of sharpness (and the narrowing of the feathered region between the inner and outer bars) beyond what is achievable in conventional blur tools, and beyond what is normally achieved with the physical tilting of a camera lens. In at least some embodiments, as an alternative or as an option available to the user, blurring may be applied according to the blur amount within the inner bars 216B, with no blurring outside the outer bars 216A and feathered blurring between the inner and outer bars.

In at least some embodiments, the user may also selectively apply a bokeh effect to the image, for example using the user interface elements in bokeh effect controls 228. In addition, the user may also selectively apply field blur and/or iris blur to the image (see FIGS. 20 and 21 for UIs for applying field and iris blur patterns, respectively). FIGS. 14A-14C illustrate applying multiple blur patterns (field, iris, and tilt-shift blur) to an image, according to at least some embodiments. Note that the bokeh effect may be applied to blur region(s) in an image in which field, iris, and/or tilt-shift blurs have been combined.

Figure 11D:
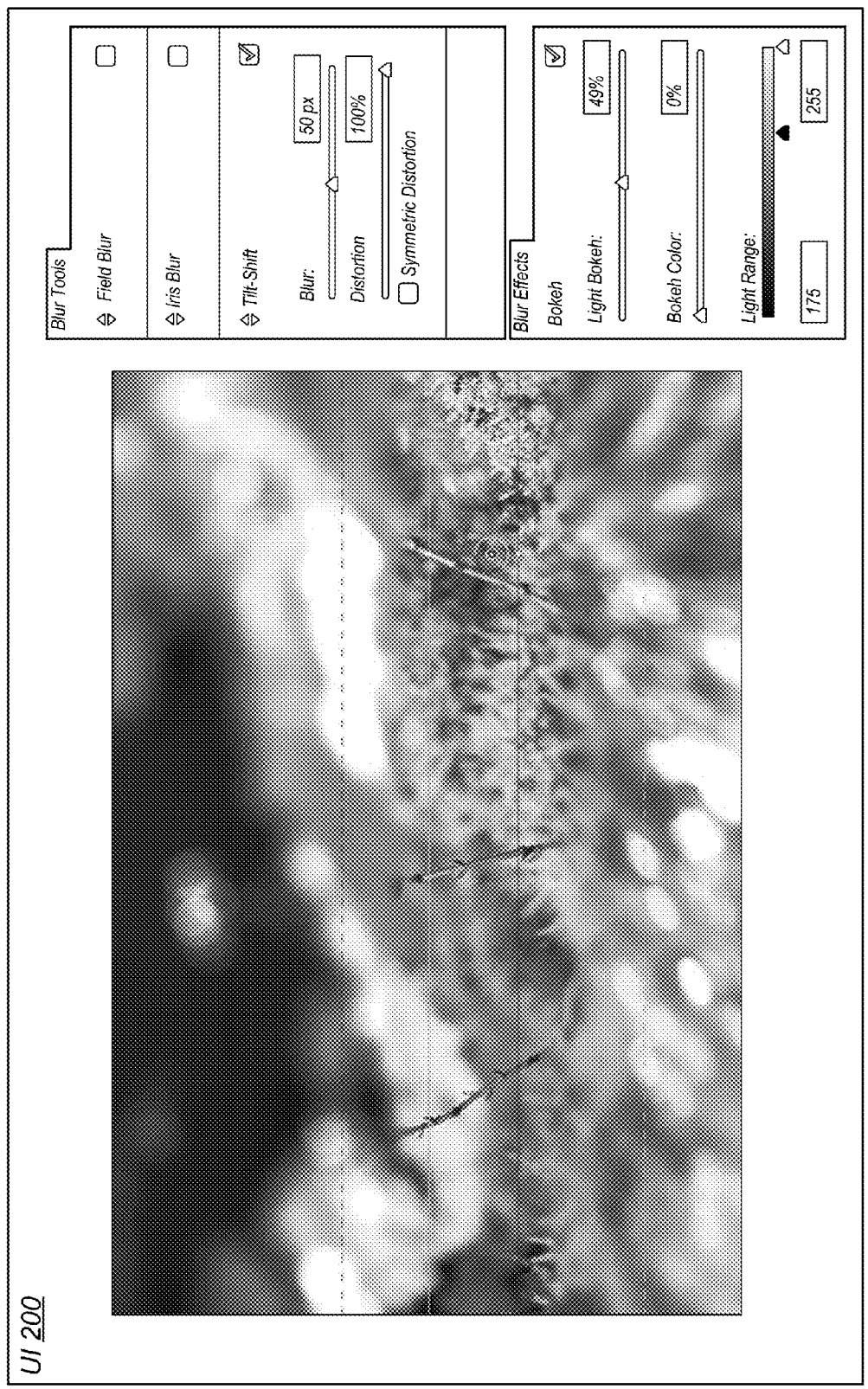
Figure 11E:
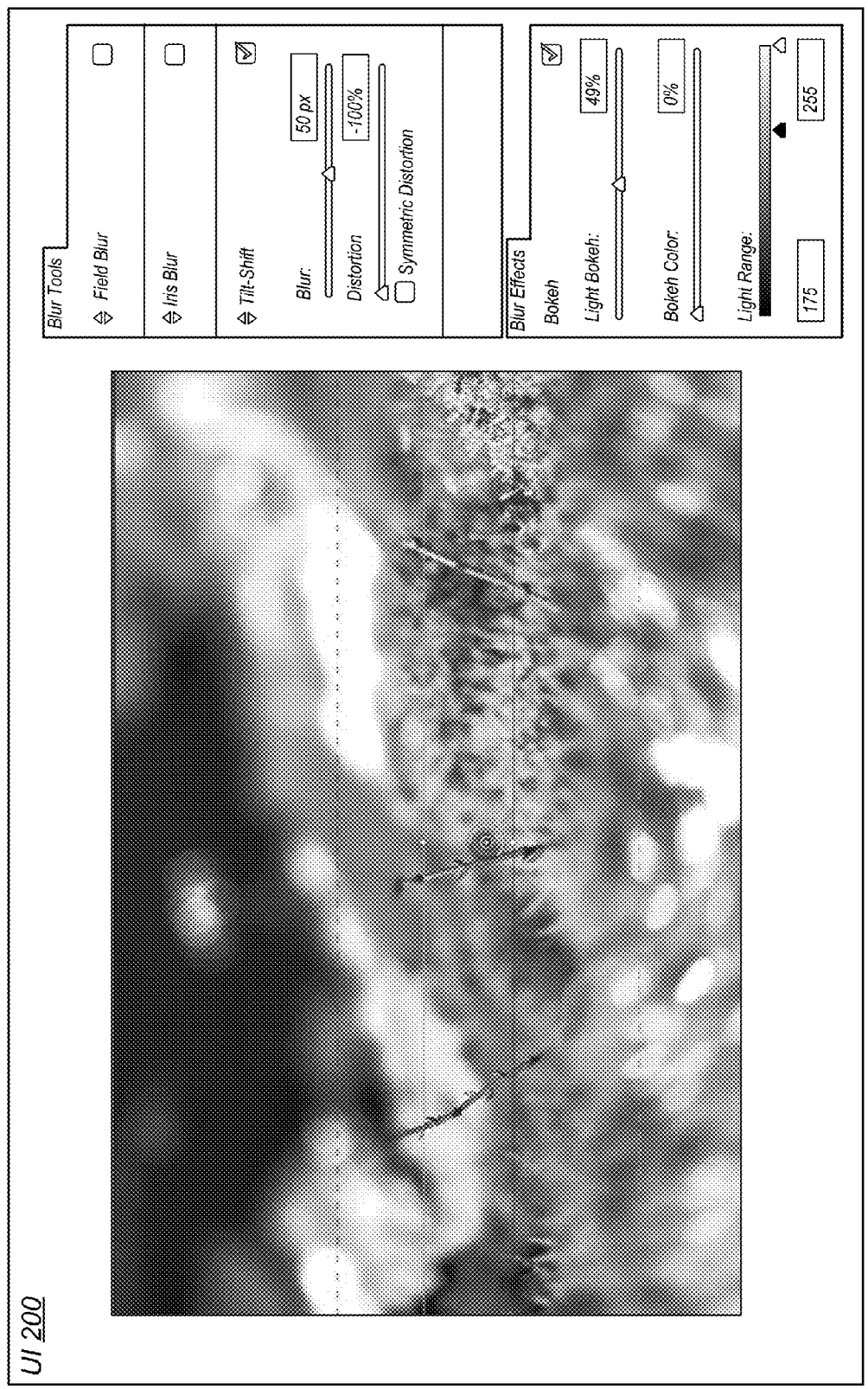
Figure 11F:
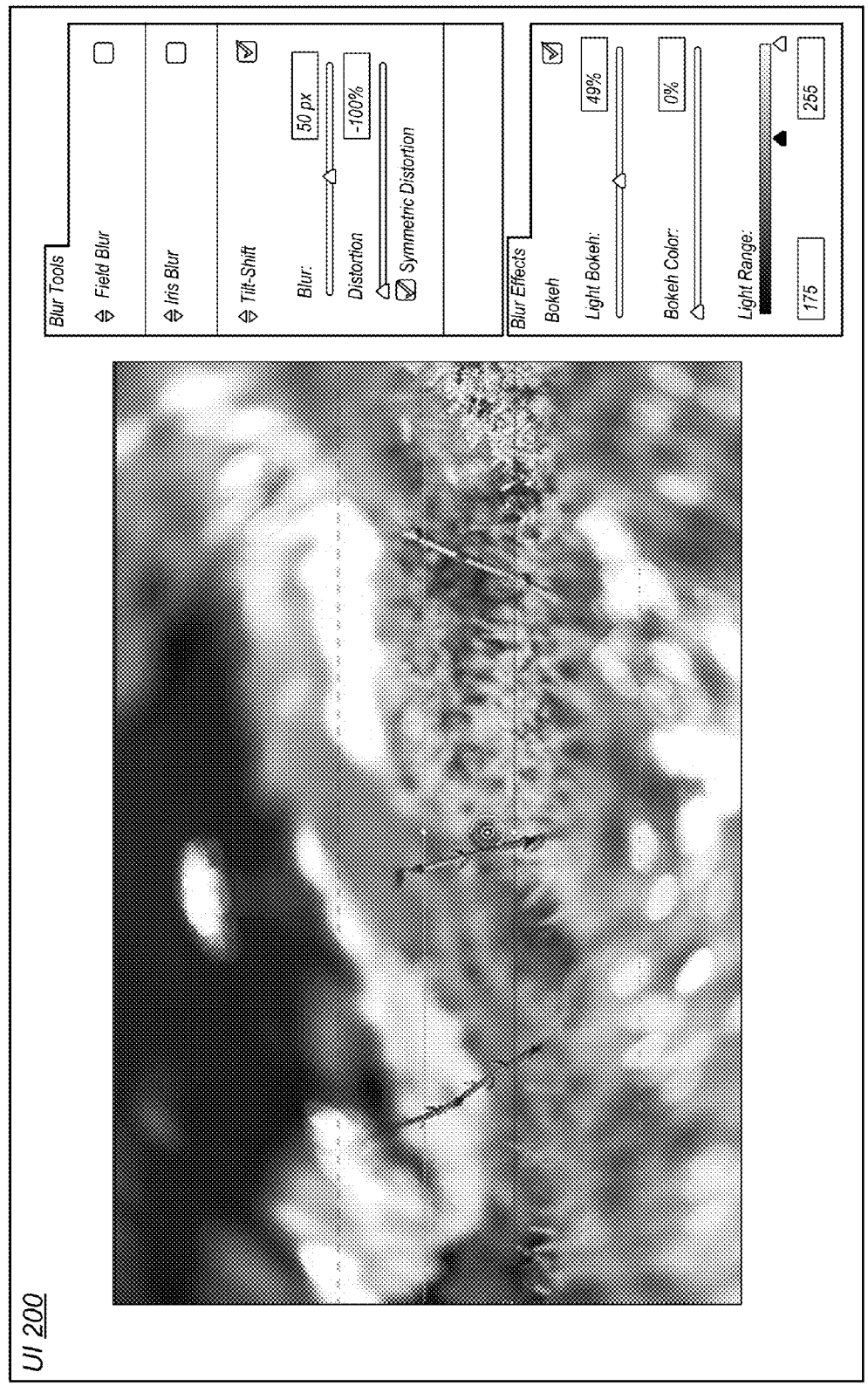
Figure 11G:
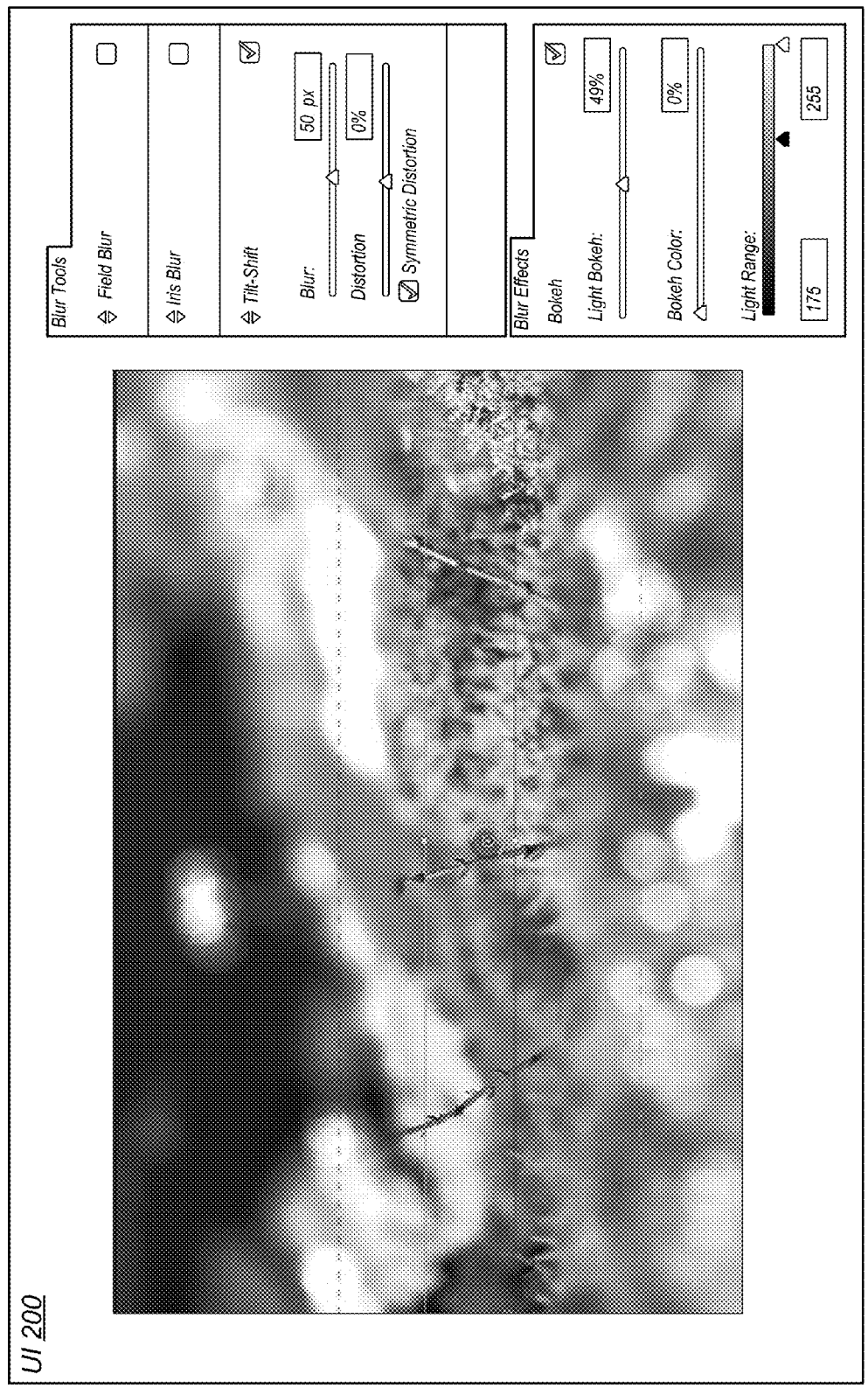
Figure 11H:
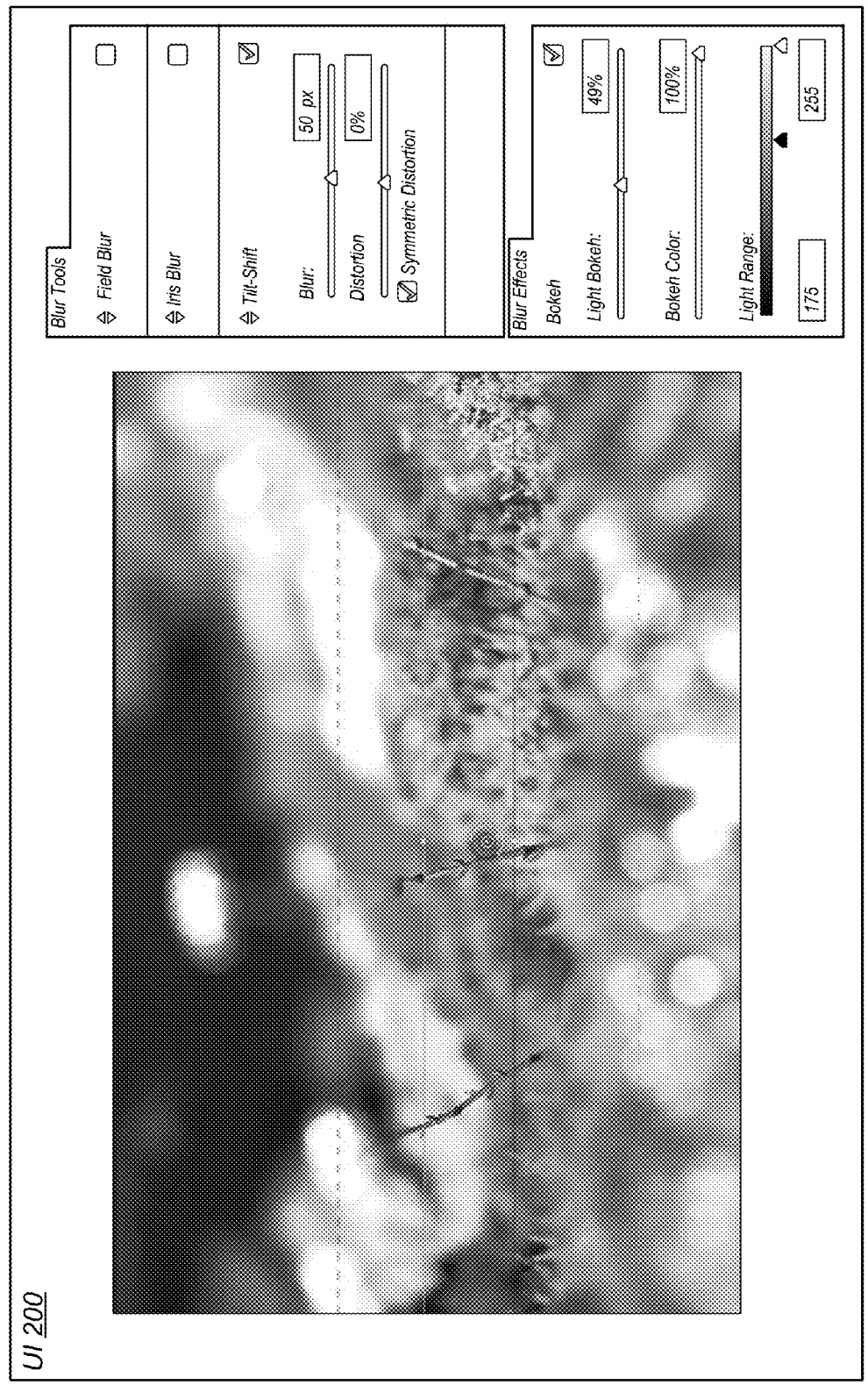

As shown in FIG. 22, the tilt-shift blur controls 226 may also include symmetric distortion controls. For example, a check box may be provided to activate symmetric distortion, and a slider bar may be provided to set the symmetric distortion. In at least some embodiments, symmetric distortion may default to zero (0), but may be adjusted to any point in the range −100% (maximum negative distortion) to 100% (maximum positive distortion). FIGS. 11E through 11H illustrate applying symmetric and non-symmetric distortion to the tilt-shift blur pattern in an example image, according to at least some embodiments. The bokeh effect is also selected and bokeh parameters are differently adjusted in some of these Figures. FIG. 11D illustrates non-symmetric, positive distortion; symmetric distortion is not selected in controls 228, and the distortion value is set to maximum positive distortion (100%). Note that the "sparkles" at the light points are elliptical, with the major axes of the ellipses pointing towards the tilt-shift pin. FIG. 11E illustrates non-symmetric, negative distortion; symmetric distortion is not selected in controls 228, and the distortion value is set to maximum negative distortion (−100%). Note that the "sparkles" at the light points are elliptical, with the major axes of the ellipses orthogonal to the tilt-shift pin. FIG. 11F illustrates symmetric, negative distortion; symmetric distortion is selected in controls 228, and the distortion value is set to maximum negative distortion (−100%). FIGS. 11G and 11H both illustrate zero distortion; symmetric distortion is selected in controls 228 with the distortion value set to zero (0). However, note that bokeh color is set to zero (0%) in FIG. 11G, and to 100% in FIG. 11H. While difficult to see the effect of colorfulness added to the image via the bokeh color setting in the grayscale rendering of the images, note that at least some of the sparkles in FIG. 11H are brighter than respective sparkles in FIG. 11G.

Continuously Adjustable Bleed of Selected Region Blurring

Typically when a selection is blurred, the resultant blur is influenced by the regions outside of the selection (e.g., the background). This phenomenon is called color bleeding, or simply bleeding. This behavior is at times unwanted, for example when blurring a foreground object against the background, and may be especially exaggerated when both the selection and the background are composed of different colors.

Conventional blurs such as a Gaussian blur may allow selective blurring within a selected region. Outside the selection, the image remains unblurred; it is only blurred within the selected region. However, the blur is obtained by mixing values both inside and outside of the selection. This bleeding of image colors from outside the selection may produce undesired results. As an example, consider a selection containing a yellow flower that exists against a green background. In conventional blurs, blurring of the selected flower may mix in the background green, and the flower will hence turn greenish. A more common selection scenario is inverse selection; the background is selected as the region to blur and the flower is to be left unblurred. In this case, in conventional blurs, the flower color may bleed into the background green upon blurring. Too much bleeding looks artificial. If the intent is to simulate the kinds of depth-of-field blurring obtained with physical lenses and sensors, then no bleeding should occur between objects at well-separated distances from the sensor. In practice, a user may wish to keep a slight amount of bleeding in order to set the flower into the background in the same way that slight shadows help set an object in a scene. However, conventional blur tools do not provide controls for the amount of bleeding.

Some conventional blur tools may provide techniques to prevent bleeding between distant objects, for example as specified by an input depth mask. This technique may provide physically sensible blurs, but does not provide the user the desired level of creative control.

At least some embodiments of the blur module may implement a technique to aesthetically control the bleeding of blur introduced by blurring selections, referred to herein as a selection bleed technique. Embodiments of the selection bleed technique may enable continuous adjustment of the amount of bleeding of image blurs between a selected image region and its complement (the unselected region, e.g. the background). Embodiments of the selection bleed technique may allow selections to go from no-bleed to full-bleed via a percentage indicated by one or more user interface elements, for example a slider. Controlling the bleeding of blur may, for example, be important to users that want to use blurring for automotive photography or similar types of photography, where sharp foreground is desired against a blurred background. More generally, the selection bleed technique can be used to prevent any color effects entering from neighboring regions, while blurring the region of interest.

Embodiments of the selection bleed technique may provide user control over the amount of blur-bleeding which occurs between selected and non-selected image regions by enabling a continuous choice via the user interface (e.g., via a slider bar). The user may select from 0% to 100% or any percentage in between (0.2%, 4.8%, 50%, and so on). Embodiments of the selection bleed technique may, for example, be used with one or more of the blur patterns provided by embodiments of a blur module as described herein.

Figure 18:
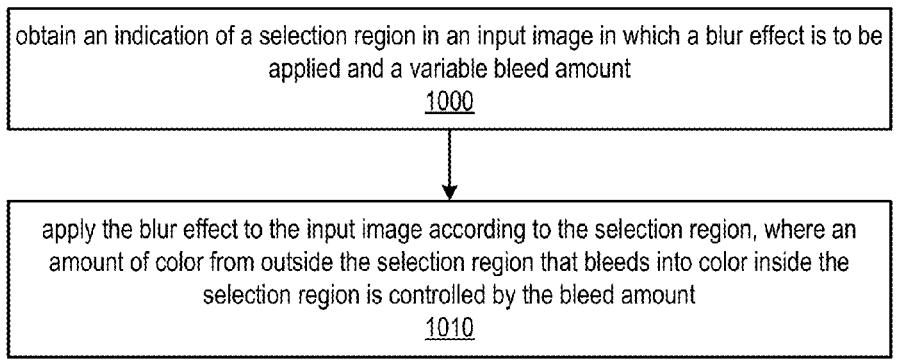
FIG. 18 is a high-level flowchart of a selection bleed technique, according to at least some embodiments.

FIG. 18 is a high-level flowchart of a selection bleed technique, according to at least some embodiments. This method may, for example, be used to generate a blur effect in a portion of an input image as indicated by a selected region. As indicated at 1000, an indication of a selection region in the input image in which the blur effect is to be applied and a variable bleed amount may be obtained, for example via a user interface as shown in FIG. 8. As indicated at 1010, the blur effect may be applied to the input image according to the selection region. An amount of color from outside the selection region that bleeds into color inside the selection region is controlled by the bleed amount. In at least some embodiments, the bleed amount is variable between 0% and 100%; an amount of 0% results in no bleeding of color from outside the selection region into color inside the selection region, an amount of 100% results in full bleeding of color from outside the selection region into color inside the selection region, and an amount between 0% and 100% results in an intermediate amount of bleeding of color from outside the selection region into color inside the selection region. In at least some embodiments, distance from the border of the selection region to which bleeding occurs is determined according to the blur radius at the respective pixels in the input image. The following describes the selection bleed technique as illustrated in FIG. 18 in more detail.

Selection Bleed Technique Implementation Details

The following provides implementation details for a selection bleed technique, according to at least some embodiments.

Let 'image' be the source image that is to be blurred. Let 'fb' be the selection bleed fraction that varies in the range between 0.0 and 1.0. And let 'selection' be the selection mask that also has values that range between 0.0 and 1.0. The selection bleed technique forms a selection blend mask (a blend of the selection mask with a uniformly fully selected mask):

$$\text{selection\_blend} = fb + (1-fb)*\text{selection} \tag{1}$$

which is the same as the selection mask when fb=0.0 and has a constant value of unity when fb=1.0.

Defining the blended image to be the product of the image with the selection blend mask:

$$\text{blended\_image} = \text{image} * \text{selection\_blend}, \tag{2}$$

the blurred, blended image can be produced by analogy with an alpha pre-multiplication method. In the current notation, alpha is equivalent to the selection mask. The alpha-pre-multiplied image would be (image*selection). Blurring this image and undoing the multiplication by dividing by 'selection' at the very end, a blur may be produced which does not bleed outside of the selection because the selection mask has values of 0.0 in those regions. In order to produce a continuous generalization of this binary approach, at least some embodiments may use selection_blend instead of 'selection' to multiply the image, hence equation (2) above.

In at least some embodiments, rather than simply dividing by selection_blend after performing the blur of the blended_image, an additional blend is added with the source image in order to obtain pleasing results:

$$\text{blurred\_blended\_image} = (1-\text{selection\_blend})*\text{image} + \text{selection\_blend}*\{\text{Blur}[\text{blended\_image}]/\text{selection\_blend}\} \tag{3}$$

which is equivalent to $$\text{blurred\_blended\_image} = (1-\text{selection\_blend})*\text{image} + \text{Blur}[\text{blended\_image}] \tag{4}$$

For the special case in which no bleeding is desired, the bleed parameter (fb) is set to zero (fb=0), which results in:

$$\text{selection\_blend} = \text{selection}$$

$$\text{blended\_image} = \text{image}*\text{selection}$$

$$\text{blurred\_blended\_image} = (1-\text{selection})*\text{image} + \text{Blur}[\text{image}*\text{selection}]$$

Note that inside the selected region, where 'selection' is unity, this is just the blur of the image that takes no contributions from outside of the selection, since it is the product (image*selection) that gets blurred.

On the other hand, for full bleeding, the bleed parameter (fb) is set to unity to obtain fb=1:

selection_blend=1 blended_image=image blurred_blended_image=blur[image]

In other words, this reduces to just blending the entire image, ignoring any selections.

To illustrate an intermediate amount of bleeding, take the example where fb=50% (fb=0.5):

selection_blend=(1+selection)/2 blended_image=image*(1+selection)/2 blurred_blended_image=0.5*(1−selection_blend)*image+Blur[image*0.5*(1+selection_blend)]

Selection Bleed and Blur Normalization

The following provides further discussion of the selection bleed technique, according to at least some embodiments.

Embodiments of a blur module may provide one or more types of spatially varying blur patterns—e.g., field blur, iris blur and/or tilt-shift blur. Each of these blur patterns may use a same or similar underlying blurring algorithm which, in at least some embodiments, applies a spatially varying elliptical-kernel blur according to the values in the radius field (blur mask). A choice when applying a blur or any other such filter operation of non-unit spatial extent is the determination of boundary conditions at the image edges. In at least some embodiments, the blur module handles these boundary conditions by employing an extra normalization plane that ensures that contributions to the blur from pixels near the image edges are appropriately weighted. In addition, in at least some embodiments, the blur module can be used with a selection mask that controls, in a continuous fashion, which pixels are blurred. In many conventional blur tools, such as conventional Gaussian blur tools, the pixels within the selected region are blurred with image value contributions from regions outside of the selection boundaries. The result is that colors from outside the selection will "bleed" into the selected blurred region. In contrast to this behavior, embodiments of the blur module may provides the user a choice, not only of whether or not to allow this selection bleeding but, moreover, a continuous control over how much selection bleeding should occur (see, e.g., FIGS. 5A through 5E). Embodiments of the blur module, by using the selection bleed technique described herein, may provide more freedom than conventional blur tools by enabling a continuous control over the amount of bleeding.

This section outlines the logic behind these two blur modulations. Let the image that is to be blurred (the source image) be designated as $I_0$. And let the spatially varying blur operation be denoted as B so that the basic result of blurring the input image is represented as $B I_0$. Note that an RGB color image contains three color planes. A grayscale image would contain a single plane and a CMYK image would contain four planes.

Consider first the case in which the selection encompasses the whole image; an alternative way of thinking of this is to say that there is no selection made; the whole image is used by default. In this case the blur module's blur B is produced by blurring both the image, $I_0$, as well as an additional normalization plane, N, which is the same size as the image. The normalization plane is all white; it has image values which are of unit value (for image intensity values scaled to range from 0 to 1). The resultant blurred image, $I_{blurred}$, is a ratio of the blur of the image planes to the blur of the unit normalization plane:

$$I_{blurred} = \frac{BI_0}{BN} \quad (5)$$

For most of the image regions, the blur of an all-white image is again an all-white image; the denominator is unity and has no effect. However, near the image edges, where nearness is determined by the blur radii, there are contributions from outside the image boundary which must be taken into account. There are two options that could be used. The first option is to replicate the image edges when padding the image so that the values outside of the image are basically the edge values. If that is done for the normalization plane as well, then the result is equivalent to blurring an edge-replicated image. This is the standard behavior of many conventional blur tools such as a conventional Gaussian blur tool, and leads to excessive contributions from the edge pixels. The second option is to fill the regions outside of the image boundary with values of zero. For this situation, there is no contribution from pixels outside of the boundary, neither from the numerator nor from the denominator in the above formula (5). The result is equivalent to applying a blur in which the contributions come only from pixels within the image boundary; the numerator containing the blur of the normalization plane ensures that the contributions are properly weighted. At least some embodiments of the blur module may use the second option. Note that this option is induced by the use of edge replication to fill in intensity values for the horizontal integral image (as opposed to the actual image itself) in the exterior padded regions which extend outside of the image boundary; image values represented by differences of integral image values are then zero in this exterior region. The effect of these two options can be seen in FIGS. 4A through 4E.

Figure 4A:
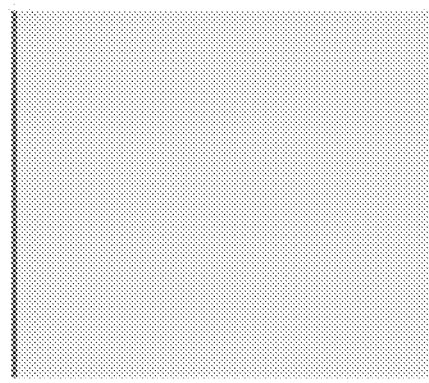
FIGS. 4A through 4E illustrate a normalization effect, according to at least some embodiments.
Figure 4B:
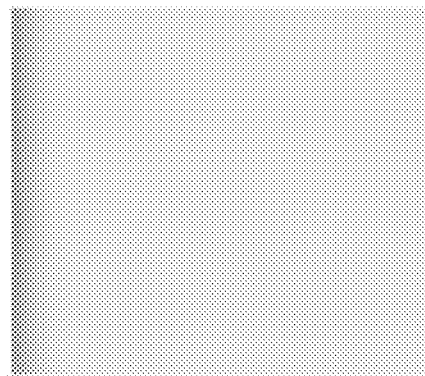
Figure 4D:
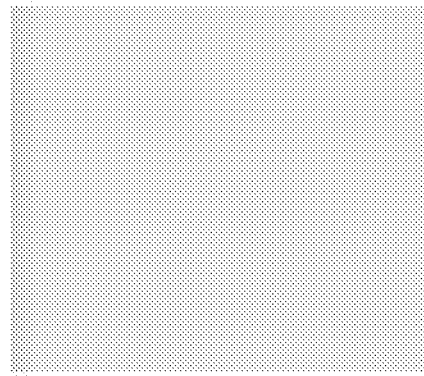
Figure 4C:
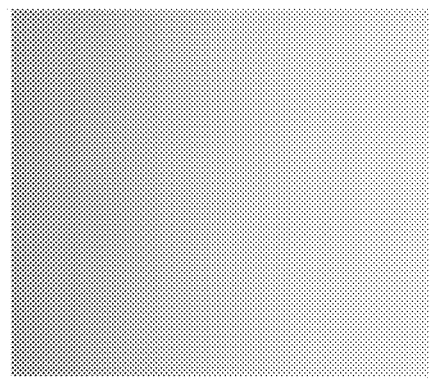
Figure 4E:
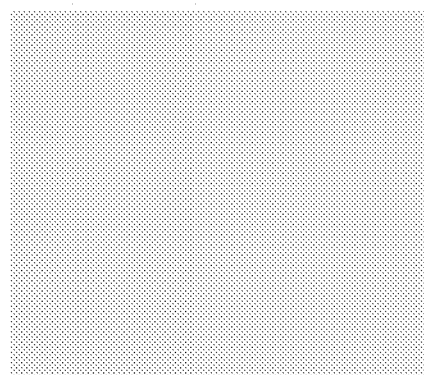

FIGS. 4A through 4E illustrate a normalization effect, according to at least some embodiments. When a conventional Gaussian blur tool is applied to this simple test image (FIG. 4A) the sliver of darker pixels (red, in a color image from which this grayscale image was produced) at the left edge has an excessive effect as shown in 3B and 3C. In FIG. 4B, a conventional Gaussian blur, radius=10 pixels, was applied. In FIG. 4C, a conventional Gaussian blur, radius=100 pixels, was applied. In contrast, FIGS. 4D and 4E show the result of applying the blur module's field blur tool, which reduces the contribution of the edge pixels. This is the result of the use of the additional normalization plane and the effective zeroing out of contributions outside of the image boundary. In FIG. 4D, the field blur, radius=10 pixels, was applied. In FIG. 4E, the field blur, radius=100 pixels, was applied.

Returning to the general case in which a selection contained within the image is also present, the selection mask may be denoted by S, and the bleed fraction may be designated as β. To control the amount of bleeding, a new image is formed by multiplying the original image by a blend of the selection mask with unity:

$$I_{bleed-modulated} = [\beta + (1-\beta)S]I_0$$

For the full 100% bleed situation (as with conventional Gaussian blur), β is 1 and the bleed-modulated image is the same as the original source image. For the situation of no bleed, β is 0 and the original image is multiplied by the selection mask. This selection blend multiplication gives continuous control over the degree of bleeding from the blur operations. This same factor is multiplied by the normalization plane to give:

$$N_{bleed\text{-}modulated} = [\beta + (1-\beta)S]N$$

and the final bleed-modulated blurred image is produced as:

$$I_{blurred} = (1 - [\beta + (1-\beta)S]) + \frac{BI_{0bleed\text{-}modulated}}{BN_{bleed\text{-}modulated}}$$

or, equivalently:

$$I_{blurred} = (1-\beta)(1-S) + \frac{BI_{0bleed\text{-}modulated}}{BN_{bleed\text{-}modulated}}$$

For the full bleed limit, β=1, which reduces to:

$$I_{blurred} = \frac{BI_0}{BN}$$

which is the same as ignoring the selection (the above-mentioned case in which the selection encompasses the entire image); and for the no-bleed limit, β=0, this becomes:

$$I_{blurred} = (1-S)I_0 + \frac{BSI_0}{BSN}$$

In the latter case, the blurring only has contributions from within the selection. The results for values of S that lie intermediate between 0.0 and 1.0 could be varied, but the empirically derived formula works well.

Figure 5A:
FIGS. 5A through 5E illustrate the selection bleed technique, according to at least some embodiments.
Figure 5B:
Figure 5C:
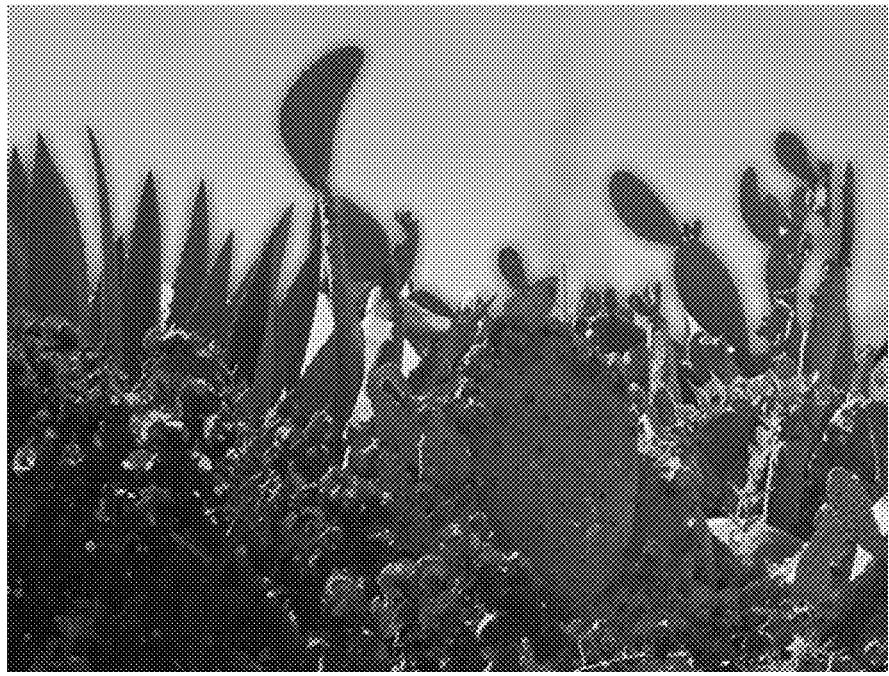
Figure 5D:
Figure 5E:

FIGS. 5A through 5E and FIGS. 6A through 6D illustrate controlling the selection bleeding in embodiments of the blur module that implement the selection bleed technique. FIGS. 5A through 5E illustrate the selection bleed technique, according to at least some embodiments. FIGS. 5A and 5B show the original image and the original image with a selection of the sky, respectively. FIG. 5C depicts a field blur applied with full bleeding specified; a conventional Gaussian blur tool would produce a similar result. The bleeding of the cactus colors into the selected sky is evident. In FIG. 5C, the field blur tool has been applied with a blur radius of 25 pixels and full strength (100%) selection bleeding. In contrast to FIG. 5C, FIG. 5D shows the same image with the selection bleed amount reduced to 0%. There is now no bleeding of green into the selected blue regions. In FIG. 5D, the field blur tool has been applied with a blur radius of 25 pixels and 0% selection bleeding (no bleeding). In FIG. 5E, the field blur tool has been applied with a blur radius of 25 pixels and 20% selection bleeding. The slight bleeding adds a slight softness at the edge of the selection.

Figure 6B:
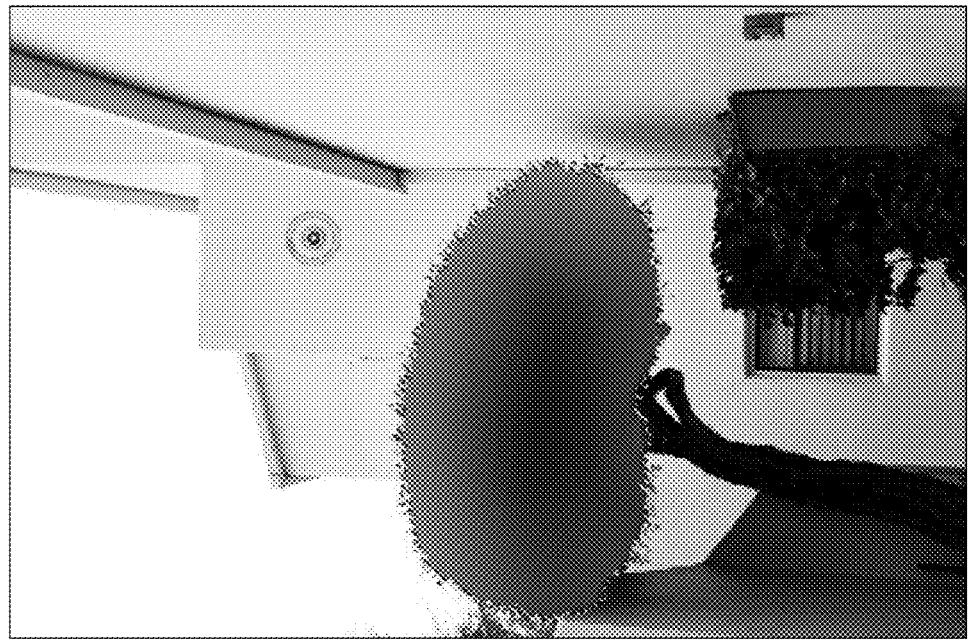
FIGS. 6A through 6D illustrate another image with varying amounts of selection bleed specified for the field blur, according to at least some embodiments.
Figure 6A:
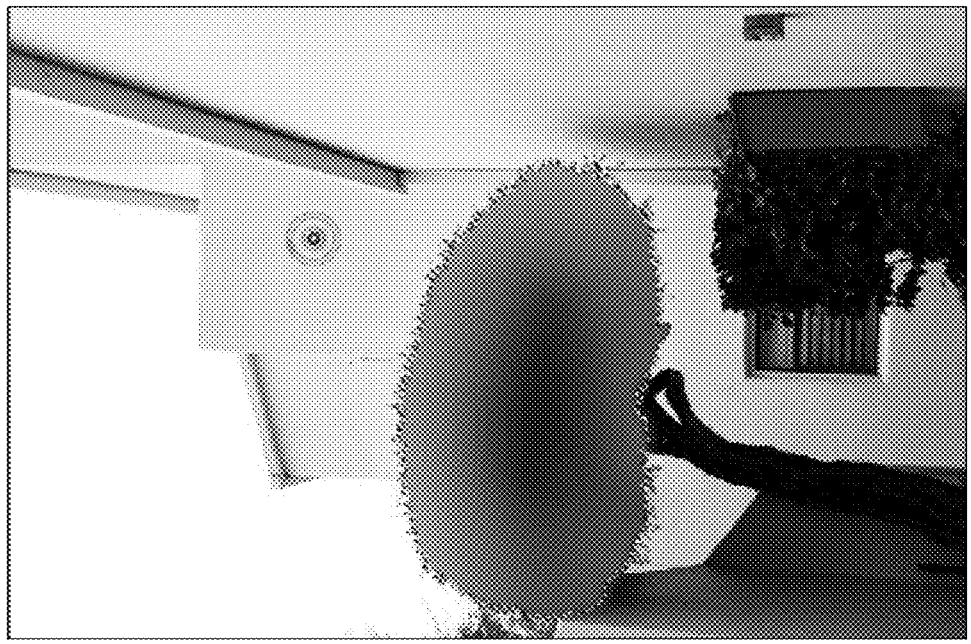
Figure 6D:
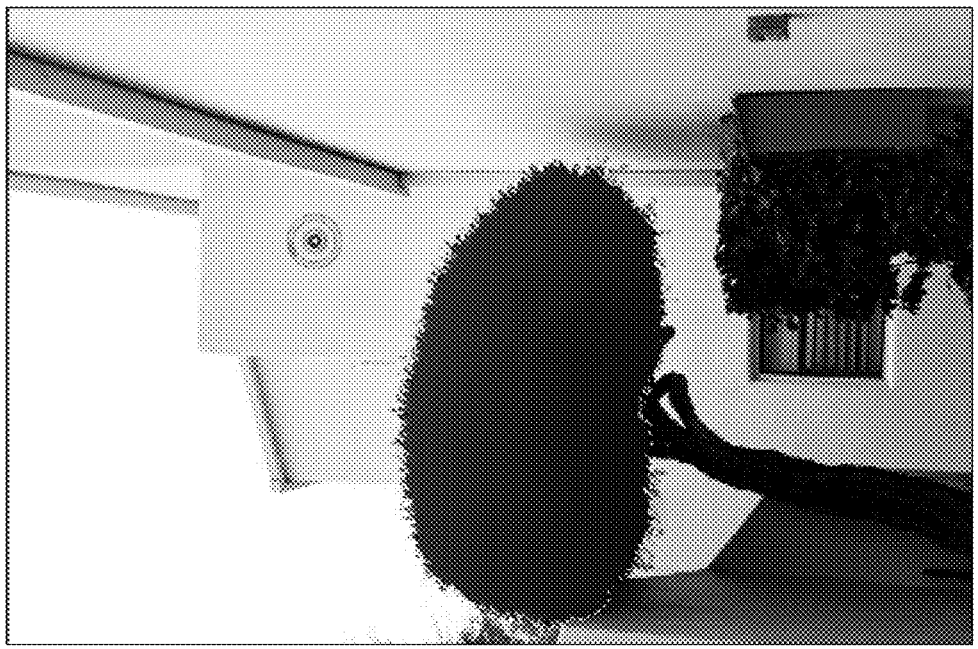
Figure 6C:
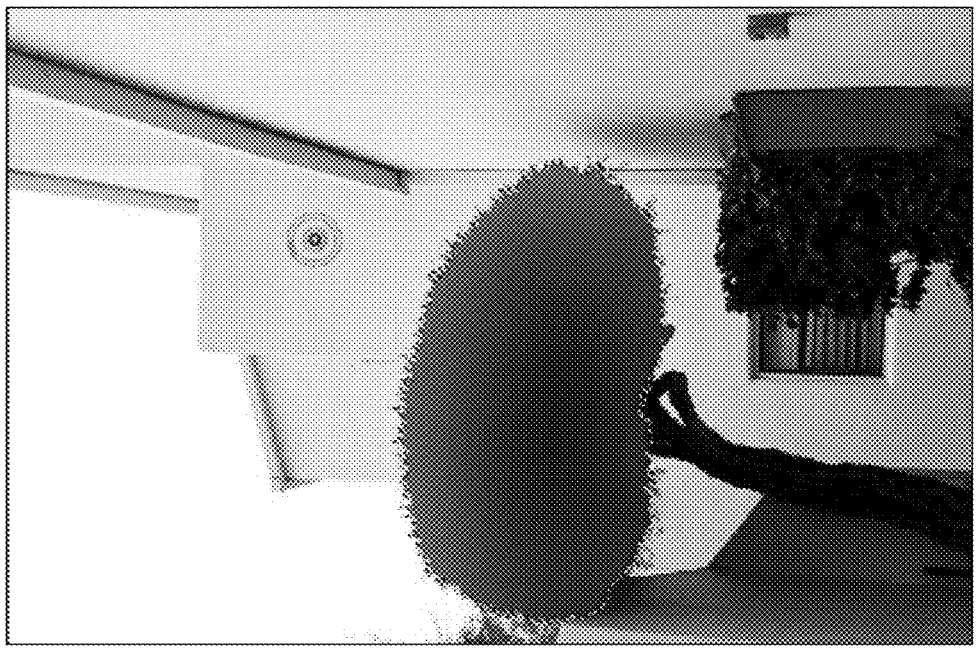

FIGS. 6A through 6D illustrate another image with varying amounts of selection bleed specified for the field blur, according to at least some embodiments. FIG. 6A shows 100% selection bleed, and shows the selection and field blur pins. FIG. 6B shows 50% selection bleed, FIG. 6C 25% selection bleed, and FIG. 6D shows 0% selection bleed. Note that the difference between 0% (FIG. 6D) and 25% (FIG. 6C) selection bleed is subtle when viewed side by side (as opposed to when superposed on top of each other). A difference image (not shown) between FIGS. 6D and 6C, which may be generated using a difference blend mode, would reveal the areas of bleeding more clearly: This difference image could serve in its own right to add a creative element, for example by combining the difference image with the 25% bleed image of FIG. 6C.

Bokeh Techniques

Embodiments of a method and apparatus for creating bokeh effects in digital images are described. Embodiments of a bokeh technique are described that may provide double threshold image bokeh boosting with optional bokeh colorfulness adjustments.

Bokeh is a characteristic of the aperture shape of the lens, and bokeh effects may appear in images, for example, when shooting dark scenes with bright light sources (usually at a distance). Embodiments of the bokeh technique as described herein may achieve this creative effect by simulating bokeh in the resultant blurred image. This bokeh technique may be used in embodiments of the blur module as described herein, either alone or in addition to one or more of the blur patterns (e.g., field blur, iris blur and tilt-shift blur).

Conventional techniques only allow for a single threshold to specify which pixel values should be considered as sparkles (light sources). Embodiments of the bokeh technique may provide the flexibility to choose from a range of values by using two thresholds (an upper and lower threshold that specify a light range). Conventional techniques may also have a hard threshold that can give unnatural effects. Embodiments of the bokeh technique may implement a soft threshold (e.g., using a weighting function) to determine the light range from the upper and lower thresholds. In addition to this creative effect, at least some embodiments of the bokeh technique may also allow a notion of colorfulness of the bokeh, which provides a continuous variation from a realistic bokeh (what can be expected from a real camera) to a more artistic colorful bokeh.

In embodiments of the bokeh technique, specular highlights in images (e.g., digital or digitized photographs, digital or digitized video frames, or even synthesized images) may be boosted, not simply with the conventional method of preferentially boosting high intensity pixel intensities as determined by a user-specified threshold intensity amount, but instead with a more flexible approach based upon two intensity threshold inputs. At least some embodiments of the bokeh technique may also include methods and user interface elements that implement a bokeh colorfulness control technique that enables the continuous selection of colorfulness values for boosted bokeh regions.

Embodiments of the bokeh technique may thus provide more flexible, creative methods of modifying an image, enabling the user to create boosted lens bokehs for any tonal region of an image. Along with the bokeh colorfulness control, the bokeh technique thus provides non-physical creative possibilities that are not provided in conventional techniques.

The optical process of blurring an image formed on a camera sensor involves spreading light intensities from scene point sources onto non-localized regions of the sensor. For a camera lens whose plane is parallel to the sensor plane, the spreading may be produced as a stamping of the lens aperture shape onto surrounding pixel regions, modulated by various optical effects such as light diffraction, reflections, geometrical factors, etc. Typically, this stamping produces a blurry image, which at a casual glance does not display the aperture shape unless there are small, very bright regions of the image set against darker background regions of the image. For physical camera/sensor systems the high dynamic range of real physical scenes presents many such examples, such as a bright lamp at night or the glint of the sun off of a metallic object.

A scene may be captured which is totally or partially in focus. Specular highlights captured from such scenes, when blurred, may produce the lens aperture bokeh stamped shapes. While there is no consistent term for such shapes in the art, these shapes may be referred to herein as sparkles. If the sparkle source (a specular highlight) is not blurred and thus appears in-focus on the sensor plane, the sparkles may be produced after the image is captured (post-processing) if the image is captured as a high dynamic range (HDR) image.

However, for non-HDR images, these sparkles may be produced by simulating an HDR image from a non-HDR source image. This can be thought of as a problem of inverse tone mapping. Tone mapping is the process of mapping (taking a function of) the HDR image intensity values to produce non-HDR values. Inverse tone mapping is then the process of simulating the lost HDR intensities form the non-HDR intensities. For example, with an 8-bit image, the possible image intensities range in value from 0 to 255. When a sensor is inundated with light intensities that would map outside of the maximum intensity value of 255, those inundated values are typically clipped to the maximum value of 255; thus, information is lost. However, simulated inverse tone mapping may be applied to make an informed guess as to what the high intensity values were.

Conventional techniques that apply bokeh boosting make this guess by simply boosting the brightest intensity values in the image. Different conventional techniques use different methods of tailoring the function that applies the boost; however, the conventional techniques depend upon the presence of a single threshold intensity value. The cutoff may be hard or soft, but basically intensity values greater than the threshold amount get boosted and values less than the threshold do not (or may get boosted to a lesser extent).

Embodiments of the bokeh technique described herein release the connection with physical bokeh boosting and enable boosting of image intensities for any tonal region of the image as specified by two separate threshold values. In general, using the two threshold values, intensity values within a light range determined by the two threshold values (greater than the lower threshold and less than the upper threshold) are boosted, and values outside the light range are not boosted. For example, given a pixel value range of 0 to 255, conventional methods may allow a single threshold to be set, for example to 200 or 252, which results in intensity values greater than 200 or 252 being boosted. Unlike conventional techniques, embodiments of the bokeh technique described herein allow a lower and upper threshold to be specified, for example a lower threshold value of 0 and an upper threshold value of 100, or a lower threshold value of 190 and an upper threshold value of 210, and so on, which results in intensity values being boosted between the two threshold. Thus, the two threshold values may allow the user to specify boosting of image intensities for any tonal region or range of the image.

In at least some embodiments, a soft threshold technique may be applied to determine the light range for the bokeh effect according to the two specified threshold values. Using the soft threshold technique, a particular functional shape of the intensity boost function may be determined by the two thresholds; however, instead of a hard limit at the two thresholds, smooth or soft threshold edges are determined according to the two specified thresholds, for example by applying a weighting function. Using the soft threshold technique, most, but not all, of the energy in the function fits between the two thresholds. See, e.g., FIGS. 7A through 7C.

In addition, at least some embodiments enable control of the colorfulness of the bokeh sparkles thus generated via a user-specified colorfulness value, for example within a range of 0% (natural color) to 100% (fully boosted colorfulness).

Figure 19:
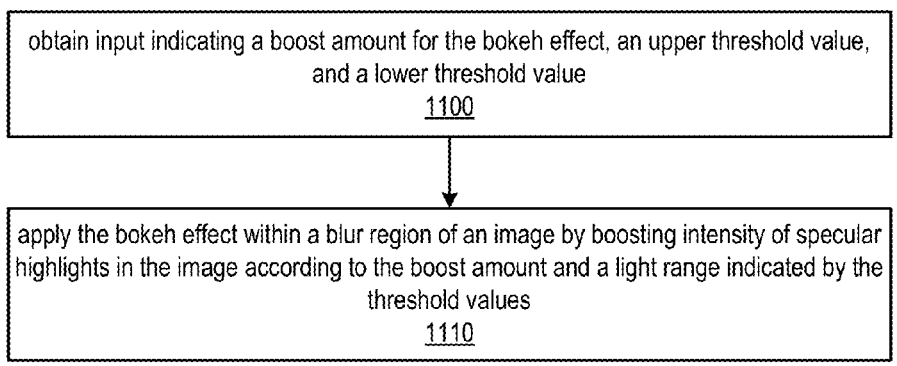
FIG. 19 is a high-level flowchart of a bokeh technique, according to at least some embodiments.

FIG. 19 is a high-level flowchart of a bokeh technique, according to at least some embodiments. This technique may, for example, be used to generate a bokeh effect in a blur region of an input image. As indicated at 1100, input indicating a boost amount for the bokeh effect, an upper threshold value, and a lower threshold value, may be obtained. The upper and lower threshold values indicate a light range for the bokeh effect. In at least some embodiments, the upper threshold value and the lower threshold value are each variable within a range from a minimum intensity value to a maximum intensity value. As indicated at 1110, the bokeh effect is applied within the blur region of the image by boosting intensity of specular highlights in the image according to the boost amount and the light range. The specular highlights within the image to which the bokeh effect is applied are determined according to the light range.

In at least some embodiments, the bokeh input further specifies a colorfulness value that controls color saturation of boosted pixels. Colorfulness may be added to the bokeh effect applied to the specular highlights according to the specified colorfulness value. In at least some embodiments, adding colorfulness is performed applying the boosting independently to each color channel of the boosted pixels in the specular hightlights according to the colorfulness value.

In at least some embodiments, a soft threshold is determined for the light range according to a weighting function applied to the upper and lower threshold values. The soft threshold for the light range results in most but not all energy of the boosting of the intensity falling between the upper and lower threshold values.

Bokeh Technique Implementation Details

This section provides details of the bokeh technique, according to at least some embodiments. The section describes example algorithms that may be used in the bokeh technique, according to at least some embodiments, and are not intended to be limiting.

Let s be the source image pixel intensity value for some pixel. The boosted source intensity value, referred to herein as boosted_s, may be determined predominantly from input values including, but not limited to:

boost_factor (boost amount), which controls the maximum boost for image intensities (and thus how bright the sparkles will be);

boost_threshold_low and boost_threshold_high, which determine the tonal region (or light range) of the image which will get boosted; and colorfulness, which controls the color saturation of pixels which do get boosted.

An example algorithm to determine boosted_s according to the above input values follows. Note that the following algorithm is given by way of example, and is not intended to be limiting. Comments are shown by double slashes ("//"):

$$lightness = (1.0 - colorfulness) * luminance + colorfulness * s;$$

$$phi1 = (I1 < lightness)?power(k12*(lightness - I1), beta1) : 0.0;$$

$$phi2 = (lightness < I2)?power(\_k12*(\_I2 - lightness), \_beta2) : 0.0;$$

// normalize to ensure that the maximum value of bump is 1.0 bump=normalization*$phi1$*$phi2$;

boosted_s=s*(1+boost_factor*bump);

In at least some embodiments, normalization and other constants may be determined by:

beta_max=3; // controls skew of thresholded tonal ranges
kappa=2; // controls tightness *of* thresholded tonal ranges $I1$=min(boost_threshold_low,boost_threshold_high);

$I2$=max(boost_threshold_low,boost_threshold_high);

k12=($I1$!=$I2$)?1.0/abs($I2$−$I1$): 0.0;

beta1=beta_max*exp(−kappa*(1.0−$I2$));

beta2=beta_max*exp(−kappa*$I1$);

normalization=power(beta1+beta2,beta1+beta2)/
   (power(beta1,beta1)*power(beta2,beta2));

Note that the above algorithm is given by way of example, and is not intended to be limiting. In at least some embodiments, this normalization may be chosen so that the maximum value of the above bump function is 1.0. Note that the lightness amount may be controlled by the bokeh colorfulness parameter.

Figure 7A:
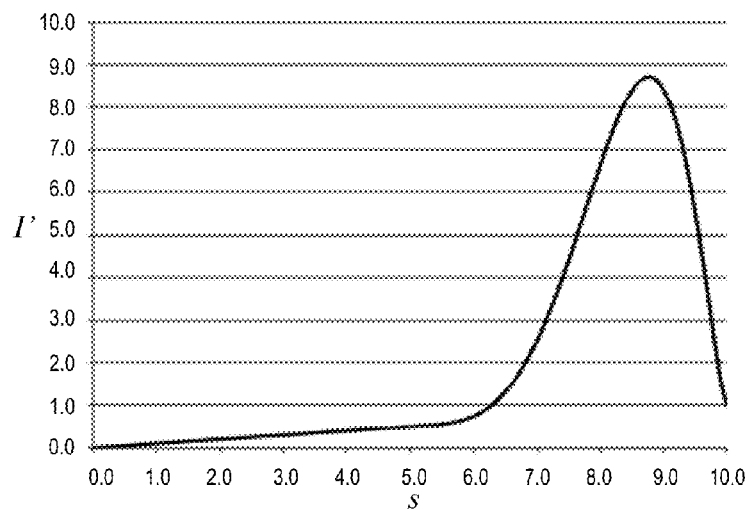
FIGS. 7A through 7C show graphs that illustrate boosting, according to at least some embodiments.
Figure 7B:
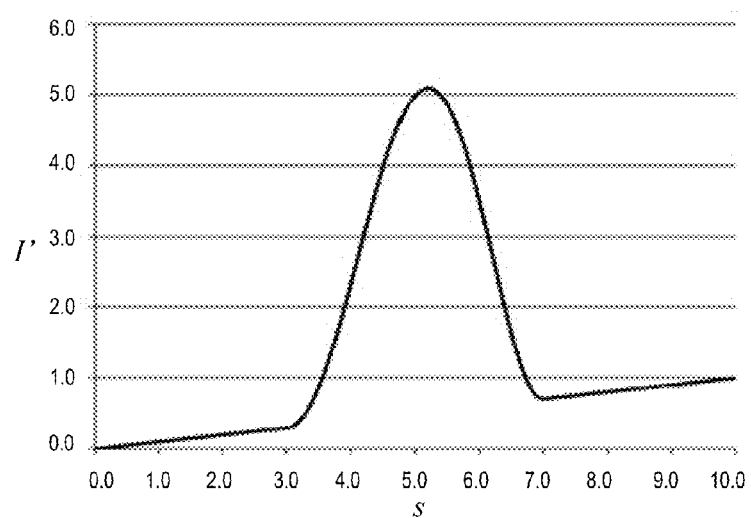
Figure 7C:
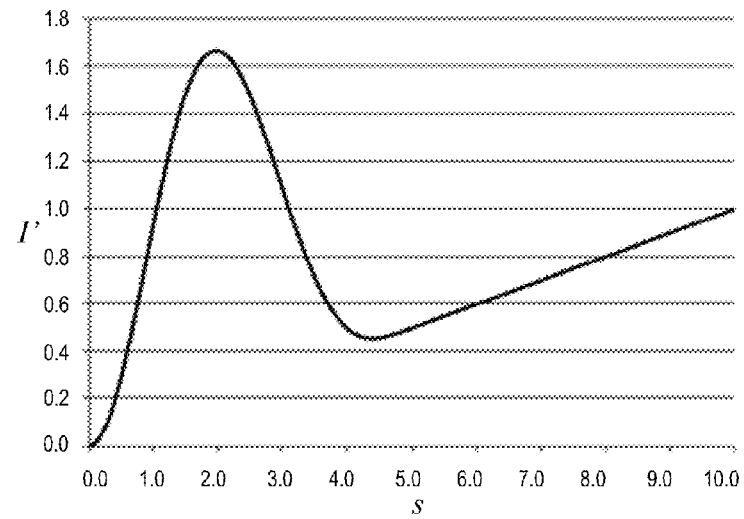

FIGS. 7A through 7C show example graphs that illustrate boosting, according to at least some embodiments. The graphs each show boosted source intensity as a function of original source intensity. In the graphs, I'=boosted_s (boosted source intensity) and is plotted on the vertical axis; s (original source intensity) is plotted on the horizontal axis. As indicated above, I1=min (boost_threshold_low, boost_threshold_high), and I2=max (boost_threshold_low, boost_threshold_high). In the graph of FIG. 7A, I1=0.5, and I2=1.0. In the graph of FIG. 7B, I1=0.3, and I2=0.7. In the graph of FIG. 7C, I1=0.0, and I2=0.5.

User Interface

Embodiments of the blur module render physically-realistic, spatially-varying blurs in digital images while at the same time giving users the flexibility to produce creative blur effects not provided in conventional blurring techniques via an interface to the blur module. At least some embodiments of the blur module may provide three different types of blur patterns, referred to herein as field blur, iris blur and tilt-shift. Each different type of blur pattern can be combined with one or more of the other blur patterns non-destructively to create various blur effects. At least some embodiments may also provide a bokeh effect that may be combined with or more of the blur patterns. Each blur pattern has a corresponding on-canvas user interface element or elements (e.g., a widget and/or one or more sliders, check boxes, text entry boxes, and/or other user interface elements) that can be manipulated for a live preview. User interface elements are also provided for selectively applying and controlling the bokeh effect.

In at least some embodiments, an intuitive on-canvas (i.e. displayed on the target image) widget is provided via the user interface for each type of blur pattern. In at least some embodiments, each widget may include or provide one or more control elements that can be used to control various parameters such as position, amount of blur, amount of feather, etc. Using embodiments, a user can generate multiple instances of a given blur pattern (i.e., multiple widgets). In addition, one or more instances of a given blur pattern may be combined with one or more instances of a different blur pattern, and the other blur patterns may be combined with these instances as well. Thus, field blur, iris blur and/or tilt-shift widgets may be combined and manipulated, for example by the respective widgets, in a single image as the user desires to achieve a wide variety of combined blur patterns. In addition, in at least some embodiments, a bokeh effect is provided that may be combined with or more of the other blur patterns.

FIG. 8 illustrates an example user interface to a blur module, according to at least some embodiments. The user interface (UI) 200 is given by way of example, and is not intended to be limiting. UI 200 may include at least a target image, or canvas, 202 in which the target image is displayed. The UI 200 may also include a blur controls 220 area that includes at least field blur controls 222, iris blur controls 224, tilt-shift blur controls 226, and bokeh effect controls 228. Each of field blur controls 222, iris blur controls 224, tilt-shift blur controls 226, and bokeh effect controls 228 may include a checkbox or other UI element that enables the user to turn on or off the respective blur pattern. Each of field blur controls 222, iris blur controls 224, tilt-shift blur controls 226, and bokeh effect controls 228 may also include one or more UI elements that allows the user to show or hide the respective controls. Each of field blur controls 222, iris blur controls 224, tilt-shift blur controls 226, and bokeh effect controls 228 may also include one or more UI elements (e.g., slider bars, text entry boxes, check boxes, pop-up menus, etc.) that allow the user to control one or more parameters of the respective blur pattern.

UI elements (e.g., widgets and pins) may also be added to, displayed on, and manipulated in the canvas 202. For example, one or more pins 212 (in this example an iris blur pin 212A, a tilt-shift blur pin 212B, and two field blur pins 212C and 212D) may be added to and manipulated on the canvas 202 for at least some of the blur patterns, for example the field blur pattern. In addition, the user may select a pin 212 (or a location to add another pin); selecting or adding a pin 212 may cause a widget for a respective or current blur pattern to be displayed for the pin 212. The widget may include handles or other controls that the user may grab and manipulate via a cursor control device (e.g., a mouse, or a stylus or finger on touch-enabled devices) to modify parameters of the respective blur pattern. In at least some embodiments, the widget for each type of blur pattern (field blur, iris blur, and tilt-shift blur) may include a focus control ring 210 that may be used to control the blur amount. For example, rotating a handle on the focus control ring 210 may increase or decrease the blur amount setting of the respective blur pattern. Not that manipulating the widget may result in changes in the user interface elements for the respective blur pattern in blur controls 220 area. Similarly, manipulating the user control elements in blur controls 220 area may result in changes to a respective widget.

In addition to a focus control ring 210, parameters of some blur patterns may be indicated by other user interface elements in the respective widget. For example, an iris blur widget may include an iris blur ellipse 214 that indicates an outer boundary of the iris blur pattern. In at least some embodiments, the user may grab and adjust the iris blur ellipse 214 via the cursor control device (for example, at one of the ellipse control points) to expand, shrink, and/or stretch the ellipse 214, to change the shape of the ellipse (e.g., to a more rectangular (non-elliptical) shape), and/or to rotate the ellipse. Alternatively, other techniques may be provided to cause the ellipse 214 to expand, contract, change shape, rotate, and/or stretch. In addition, an iris blur widget may include one or more feather controls that may be manipulated by the user to control the inner boundary of the iris blur. The iris blur is "feathered" between the inner boundary indicated by these feather controls and the ellipse 214. The region inside the inner boundary is not blurred; the region outside the ellipse 214 is blurred according to the blur amount, and the region in between varies smoothly from not blurred at the inner boundary to blurred at the outer boundary. As another example, two or more bars 216 may be displayed as part of the tilt-shift blur widget to indicate ranges of the tilt-shift blur pattern. The bars 216 may be moved relative to each other and/or relative to the respective pin for the tilt-shift blur instance, rotated, and so on via the mouse or other control device. In at least some embodiments, no (zero) blur may be applied within the inner bars, a maximum blur may be applied outside the outer bars, and the blur pattern may be feathered between the inner bars and outer bars, from zero at the inner bars to maximum at the outer bars.

In at least some embodiments, UI 200 may include one or more UI elements for selecting regions (selections) for the selection bleed technique as described herein. In at least some embodiments, UI 200 may include a bleed control UI element (e.g., a bleed control slider bar and text box as shown in FIG. 8) that allows the user to control the amount of bleed for a selection within the range of 0% (no bleed) and 100% (full bleed).

UI 200 may include one or more other UI elements that are not shown, for example UI elements to commit the current blur settings to the image, save a current canvas, save current settings of the UI controls and UI elements, undo previous actions, repeat previous actions, open new images, select other tools, and so on.

In at least some embodiments, the various UI elements in FIG. 8 may be applied to an image to generate one or more instances of each of the one or more blur patterns, and to apply bokeh as desired to the image. The current settings of the UI may be saved, and may then be applied to one or more other images via the UI 200. Alternatively, a current image may be closed (potentially saving the changes to the image), and another image may be opened in the canvas 202 with the current blur settings applied to the newly opened image.

FIGS. 20, 21, and 22 provide more details of the field blur UI, the iris blur UI, and the tilt-shift blur UI, respectively.

FIGS. 9A-9C, 11A-11H, 12A-12B, 13A-13B, 14A-14C, 15A-15D, and 16A-16D illustrate applying the various blur patterns, including field blur, iris blur, tilt-shift blur, and bokeh, to example images using the example UI 200 illustrated in FIG. 8, according to at least some embodiments. Each of these Figures shows a UI region similar to the blur controls 220 area of FIG. 8, as well as various widgets for the respective blur patterns. However, note that the UIs shown in these Figures are not intended to be limiting. Note that the UI may include other UI elements not shown in these Figures, for example a bleed control UI element (e.g., a bleed control slider bar and text box similar to that shown in FIG. 8) that allows the user to control the amount of bleed for a selection within the range of 0% (no bleed) and 100% (full bleed).

FIGS. 9A-9C illustrate applying iris blur to an example image, according to at least some embodiments. FIG. 9A shows the image, with the widget 210 active at a first pin 212 and the iris blur ellipse 214 displayed on the canvas 202. Note that the bokeh effect is also selected. Current settings for the iris blur controls 222 and bokeh controls 228 are shown in the blur controls 220 area. The blur amount for the iris blur pattern is set to 60 pixels. Light bokeh is set to 25%, bokeh color to 0%, and the light ranges is 191-255. The four small circles within the ellipse 214 may be UI elements (e.g., feather control elements) that may also be manipulated by the user to control the iris blur pattern. FIGS. 9B and 9C show a mask of the iris blur pattern at the pins, with the widget 210 at a first pin in the FIG. 9B, and at a second pin in FIG. 9C.

FIGS. 11A-11H illustrate applying tilt-shift blur to an example image, according to at least some embodiments. FIG. 11A shows the image, with the widget 210 active at a pin 212 and the tilt-shift bars 216 displayed on the canvas 202. Note that the bokeh effect is also selected. Current settings for the tilt-shift controls 224 and bokeh controls 228 are shown in the blur controls 220 area. Note that bokeh settings are at 0%.

FIG. 11B shows a mask for the tilt-shift blur of FIG. 11A. FIG. 11C shows a mask with multiple (two, in this example) instances of the tilt-shift blur. Each instance is indicated by a pin. In this example, the more vertical of the two tilt-shifts is currently selected, with the widget 210 displayed at the respective pin, and the respective tilt-shift bars 216 displayed. The tilt-shift controls 224 indicate the settings for the select tilt-shift instance.

FIG. 11D shows the image, with the widget 210 active at a pin 212 and the respective tilt-shift bars 216 displayed on the canvas 202. Note that the bokeh effect is also selected. Current settings for the tilt-shift controls 224 and bokeh controls 228 are shown in the blur controls 220 area. In this example, light bokeh is set to 67%, and symmetric distortion is selected in controls 228 with the distortion value set to maximum positive distortion (100%). Note that the "sparkles" at the light points resulting from application of the bokeh effect are elliptical, with the major axes of the ellipses pointing towards the tilt-shift pin.

FIG. 11E shows the image, with the widget 210 active at a pin 212 and the respective tilt-shift bars 216 displayed on the canvas 202. Note that the bokeh effect is also selected. Current settings for the tilt-shift controls 224 and bokeh controls 228 are shown in the blur controls 220 area. In this example, light bokeh is set to 60%, and symmetric distortion is selected in controls 228 with the distortion value set to maximum negative distortion (−100%). Note that the "sparkles" at the light points are elliptical, with the major axes of the ellipses orthogonal to the tilt-shift pin.

FIG. 11F shows the image, with the widget 210 active at a pin 212 and the respective tilt-shift bars 216 displayed on the canvas 202. Note that the bokeh effect is also selected. Current settings for the tilt-shift controls 224 and bokeh controls 228 are shown in the blur controls 220 area. In this example, light bokeh is set to 60%, and symmetric distortion is selected in controls 228 with the distortion value set to no distortion (0%).

FIG. 11G shows the image, with the widget 210 active at a pin 212 and the respective tilt-shift bars 216 displayed on the canvas 202. Note that the bokeh effect is also selected. Current settings for the tilt-shift controls 224 and bokeh controls 228 are shown in the blur controls 220 area. In this example, light bokeh is set to 55%, bokeh color is set to 2%, and symmetric distortion is selected in controls 228 with the distortion value set to no distortion (0%). Setting bokeh color above 0% adds "colorfulness" to the bokeh effect.

FIG. 11H shows the image, with the widget 210 active at a pin 212 and the respective tilt-shift bars 216 displayed on the canvas 202. Note that the bokeh effect is also selected. Current settings for the tilt-shift controls 224 and bokeh controls 228 are shown in the blur controls 220 area. In this example, light bokeh is set to 55%, bokeh color is set to 58%, and symmetric distortion is selected in controls 228 with the distortion value set to no distortion (0%). The "colorfulness" of the bokeh effect is more pronounced in this image than in the image of FIG. 11G.

FIGS. 12A and 12B illustrate applying field blur to an example image, according to at least some embodiments.

FIG. 12A shows the image, with the widget 210 active at a first pin 212 on the canvas 202. Note that the bokeh effect is also selected, with the light bokeh value set to 62%. Current settings for the field blur controls 222 and bokeh controls 228 are shown in the blur controls 220 area. FIG. 12B shows a mask of the field blur pattern according to the current settings of the pins. Note that each pin can be selected to adjust the field blur parameter(s) at the pin. In addition, pins may be moved, added, or deleted.

Figure 13A:
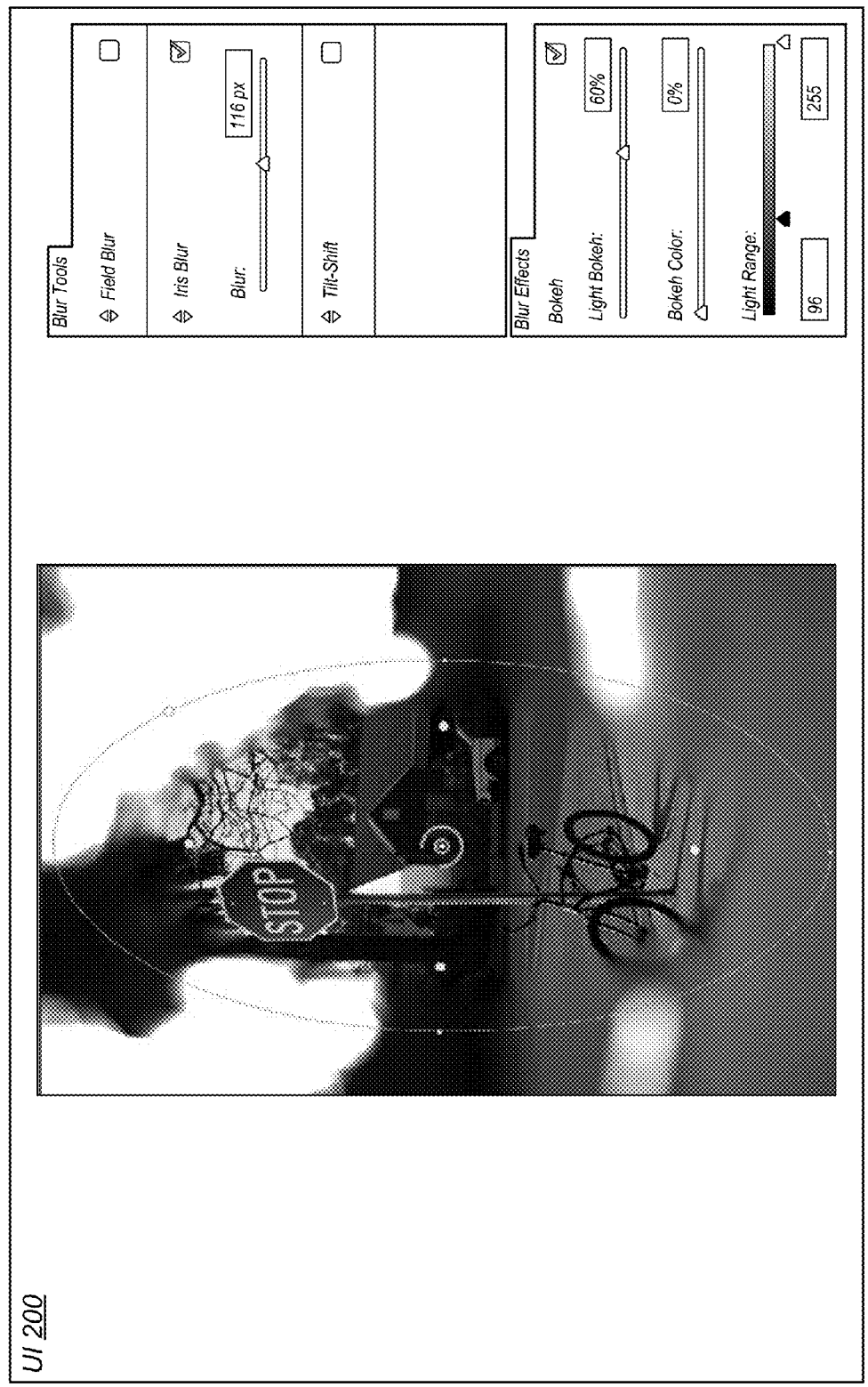
FIGS. 13A and 13B illustrate manipulating the light range of an iris blur in an example image, according to at least some embodiments.
Figure 13B:
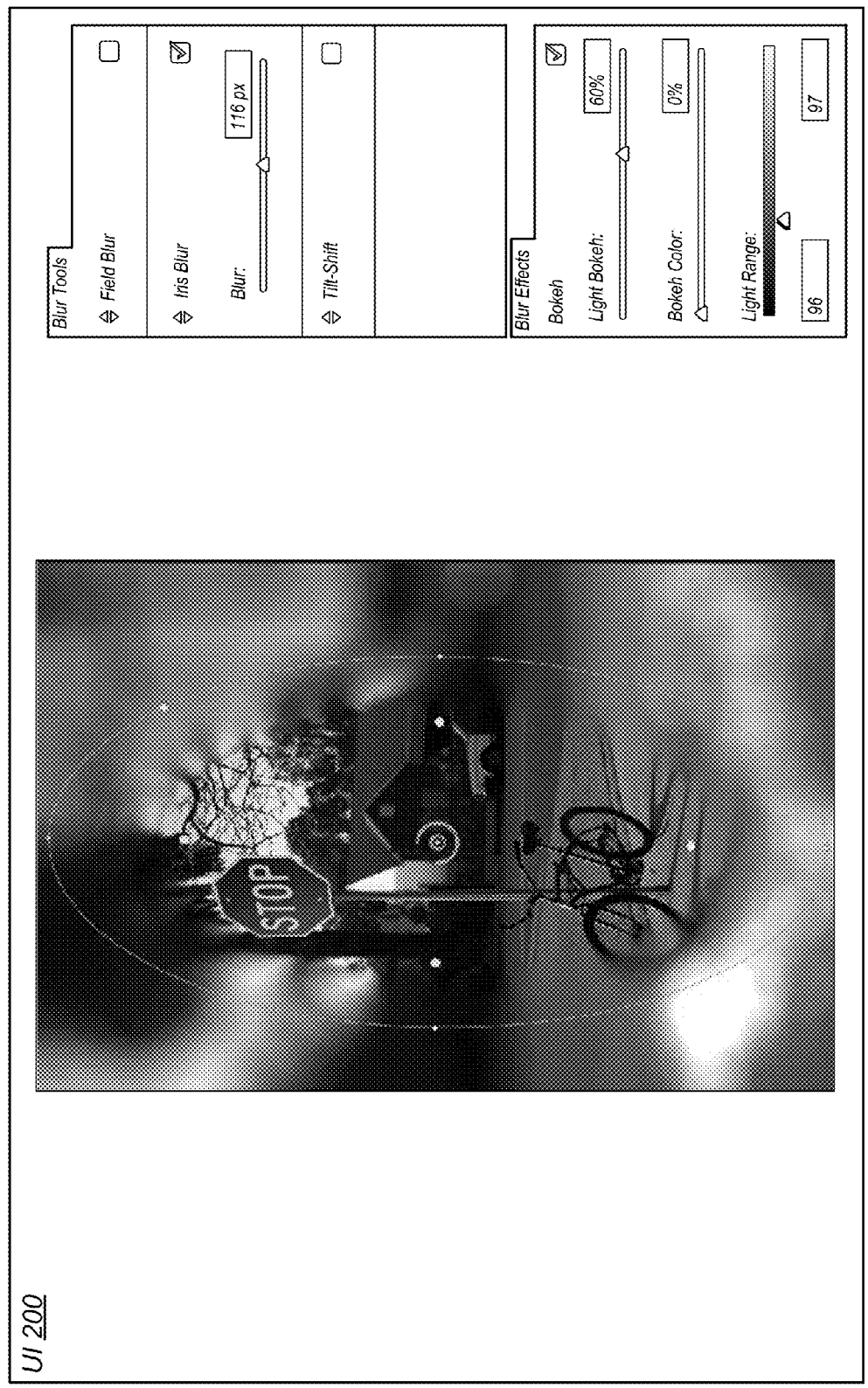

FIGS. 13A and 13B illustrate manipulating the light range of an iris blur in an example image, according to at least some embodiments. FIGS. 13A and 12B show the image, with the widget 210 active at a pin 212 and the iris blur ellipse 214 displayed on the canvas 202. Note that the bokeh effect is also selected. Current settings for the iris blur controls 222 and bokeh controls 228 are shown in the blur controls 220 area. In FIG. 13A, light bokeh is set to 60%, and the light range is set to a wide range (96-255). In FIG. 13B, light bokeh is set to 60%, and the light range is set to a narrow range (96-97).

FIGS. 14A-14C illustrate applying multiple blur patterns to an image, according to at least some embodiments. In these Figures, only the mask is shown. FIG. 14A shows the field blur selected and applied, with four pins indicating the field blur. The field blur may be manipulated, for example via a widget, at each field blur pin. FIG. 14B illustrates adding an iris blur pattern to the image of FIG. 14A. The iris blur may be manipulated, for example via a widget at the iris blur pin. FIG. 14C illustrates adding a tilt-shift blur pattern to the image of FIG. 14B. The tilt-shift blur may be manipulated, for example via a widget at the tilt-shift blur pin. As can be seen in the masks in FIGS. 14A-14C, the various blur patterns may be combined and manipulated and are appropriately blended to achieve a unique, creative blur mask.

Figure 15A:
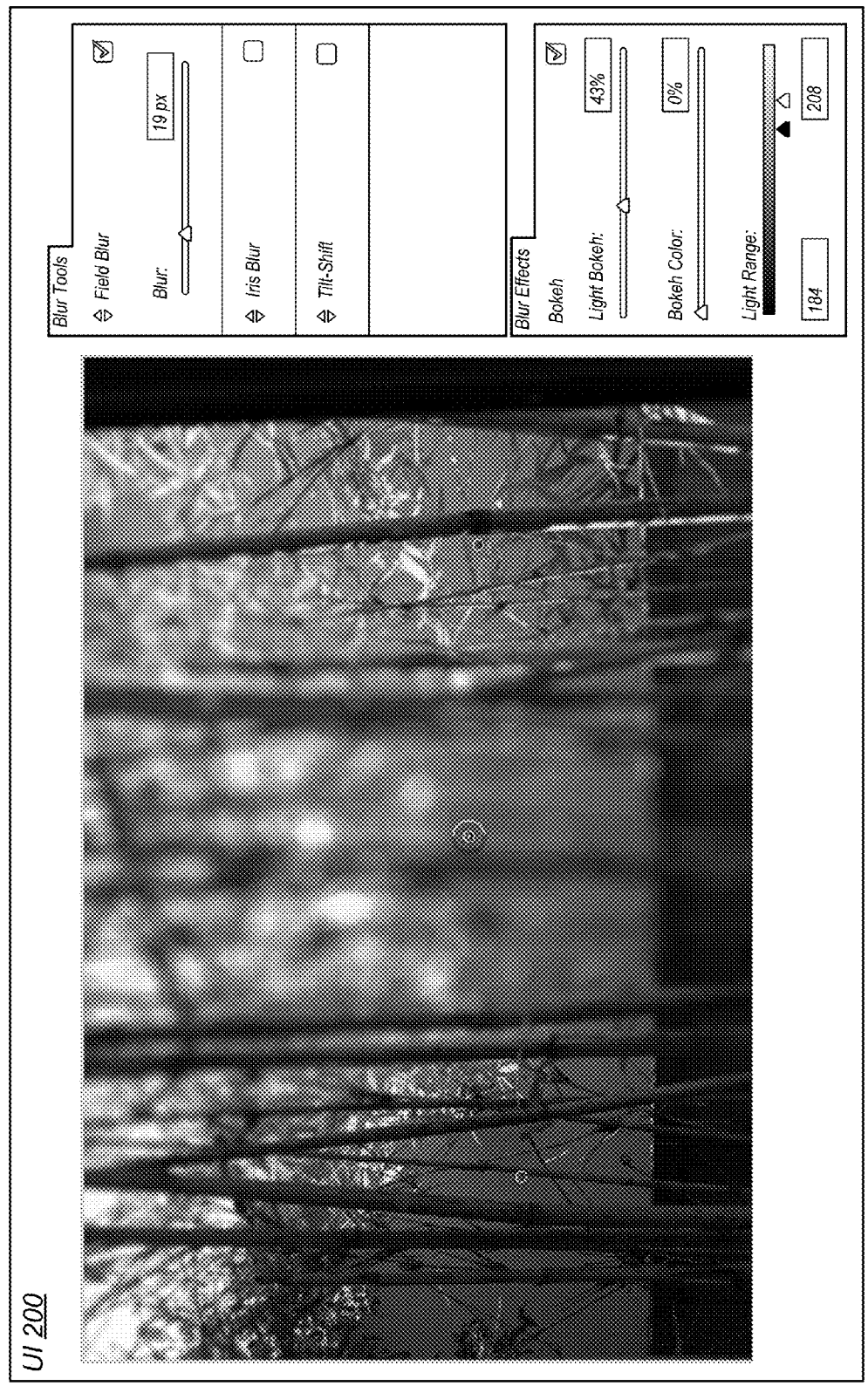
FIGS. 15A through 15D illustrate applying field blur and bokeh to an example image, according to at least some embodiments.
Figure 15B:
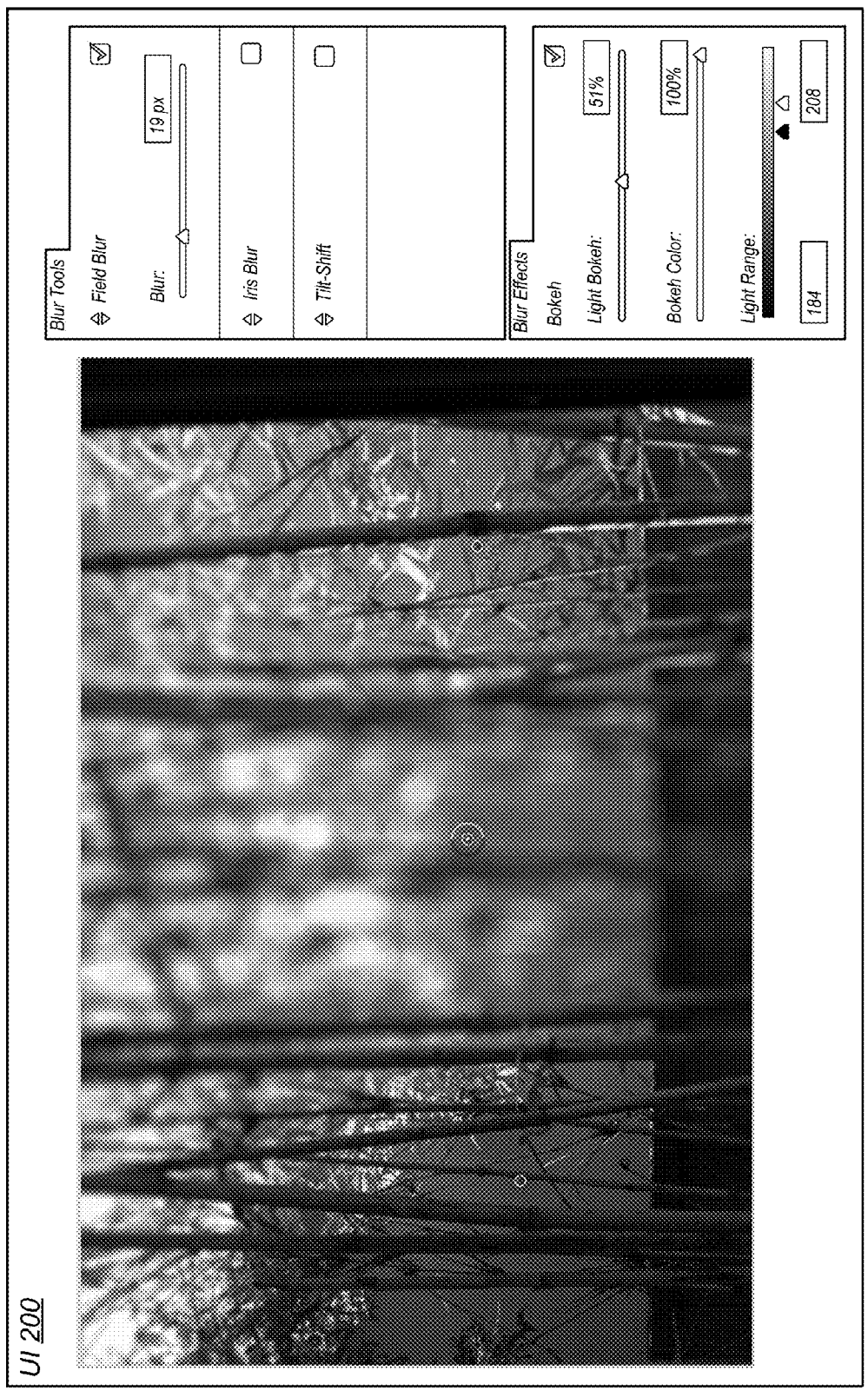

FIGS. 15A-15D illustrate applying field blur and bokeh to an example image, according to at least some embodiments. FIG. 15A shows the image, with the widget 210 active at a center pin 212 of three pins on the canvas 202. Note that the bokeh effect is also selected at the pin, with the light bokeh value set to 43%. Current settings for the field blur controls 222 and bokeh controls 228 are shown in the blur controls 220 area. FIG. 15B shows the image with "colorfulness" added to the field blur pattern. In this example, light bokeh is set to 51, and bokeh color is set to 100% at the selected pin. Note that a relatively narrow light range (184-208) has been set in both FIGS. 15A and 15B.

Figure 15C:
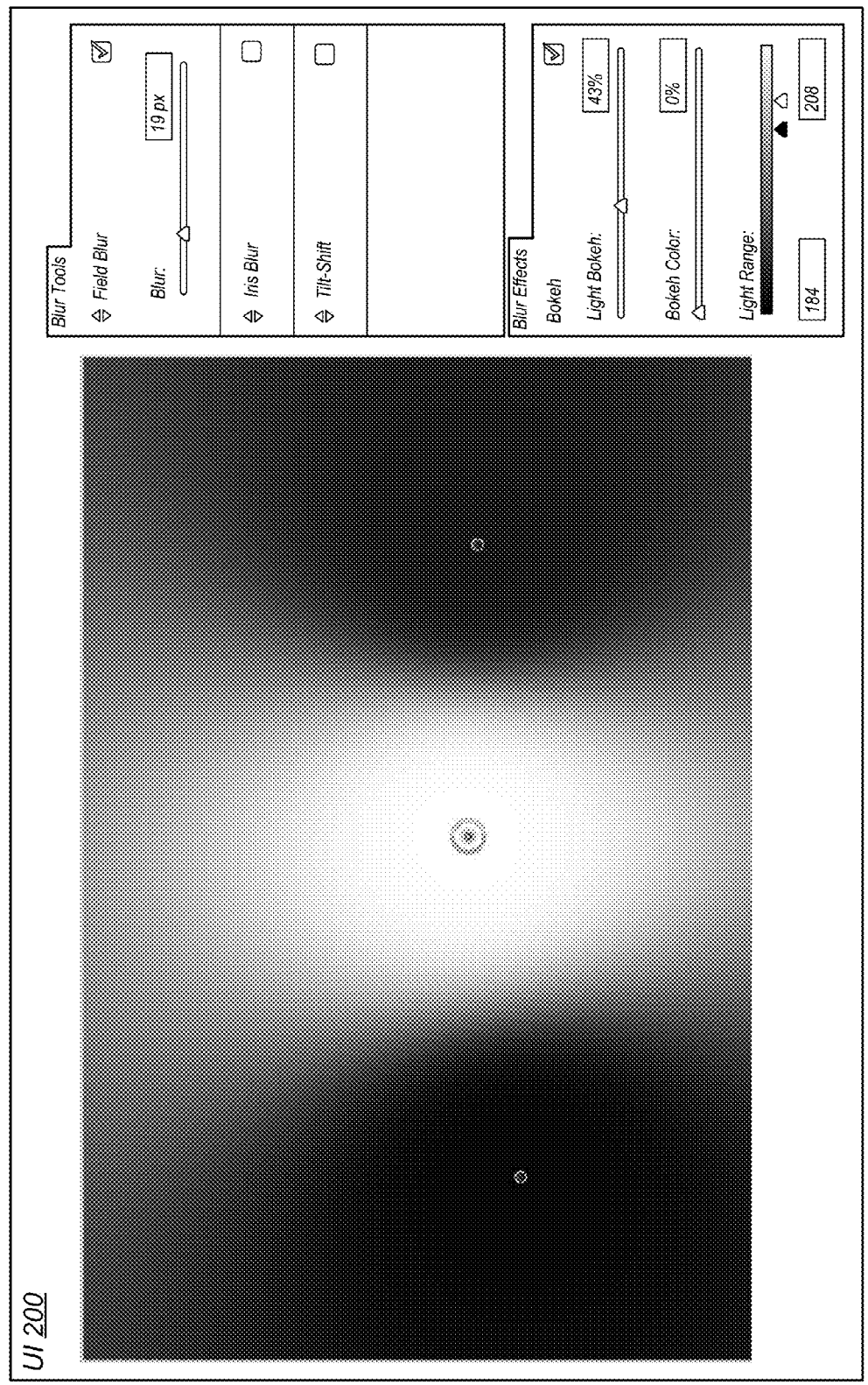

FIG. 15C shows a mask of the field blur pattern according to the current settings of the pins. Note that each pin can be selected to adjust the field blur parameter(s) at the pin. In addition, pins may be moved, added, or deleted.

Figure 15D:
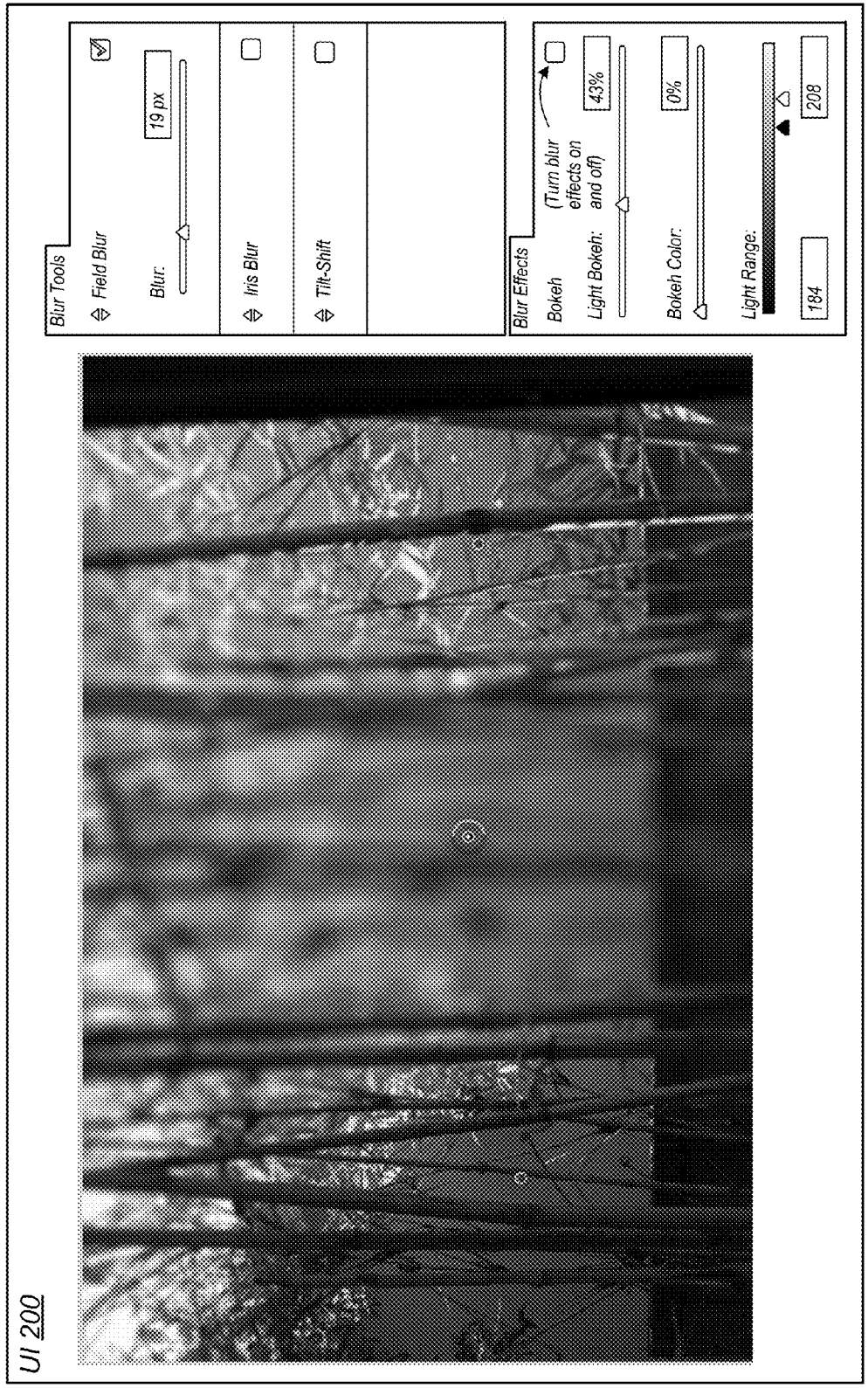

FIG. 15D shows the image of FIGS. 15A and 15B, with field blur on. However, in this example, the bokeh effect has been turned off by deselecting the check box in the bokeh effect controls 228.

FIGS. 16A-16D illustrate applying tilt-shift blur to an example image, according to at least some embodiments. FIG. 16A shows the image, with the widget 210 active at a pin 212 and the tilt-shift bars 216 displayed on the canvas 202. Note that the bokeh effect is also selected, but the light bokeh and bokeh color values are set to 0%. Current settings for the tilt-shift controls 224 and bokeh controls 228 are shown in the blur controls 220 area. FIG. 16B shows a mask for the tilt-shift blur of FIG. 16A.

FIGS. 16C and 16D illustrate applying multiple tilt-shift blurs to an image, according to at least some embodiments. FIG. 16C shows the image, with the widget 210 active at a currently selected pin 212 and the respective tilt-shift bars 216 displayed on the canvas 202. The pin of the second tilt-shift instance can be seen on the right of the image. The two pins can be independently selected to adjust the respective tilt-shift pattern. Note that the bokeh effect is also selected, but the light bokeh and bokeh color values are set to 0%. Current settings for the tilt-shift controls 224 and bokeh controls 228 are shown in the blur controls 220 area. FIG. 16D shows a mask for the tilt-shift blur of FIG. 16C.

Example Implementations

Some embodiments may include means for performing the various blur techniques described herein, including the field blur, iris blur, tilt-shift blur, bokeh effect, and the selection bleed technique. For example, a blur module may receive input identifying, or otherwise obtain, a digital image on which one or more of the blur techniques as described herein is to be performed. The blur module may receive additional input via a user interface (e.g., UI 200 shown in FIG. 8) indicating application of one or more of the blur techniques to the digital image as described herein. Note that any two or more of the blur techniques may be combined. The blur module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the blur techniques as described herein. Other embodiments of the blur module may be at least partially implemented by hardware circuitry and/or firmware stored, for example, in a non-volatile memory.

Figure 23:
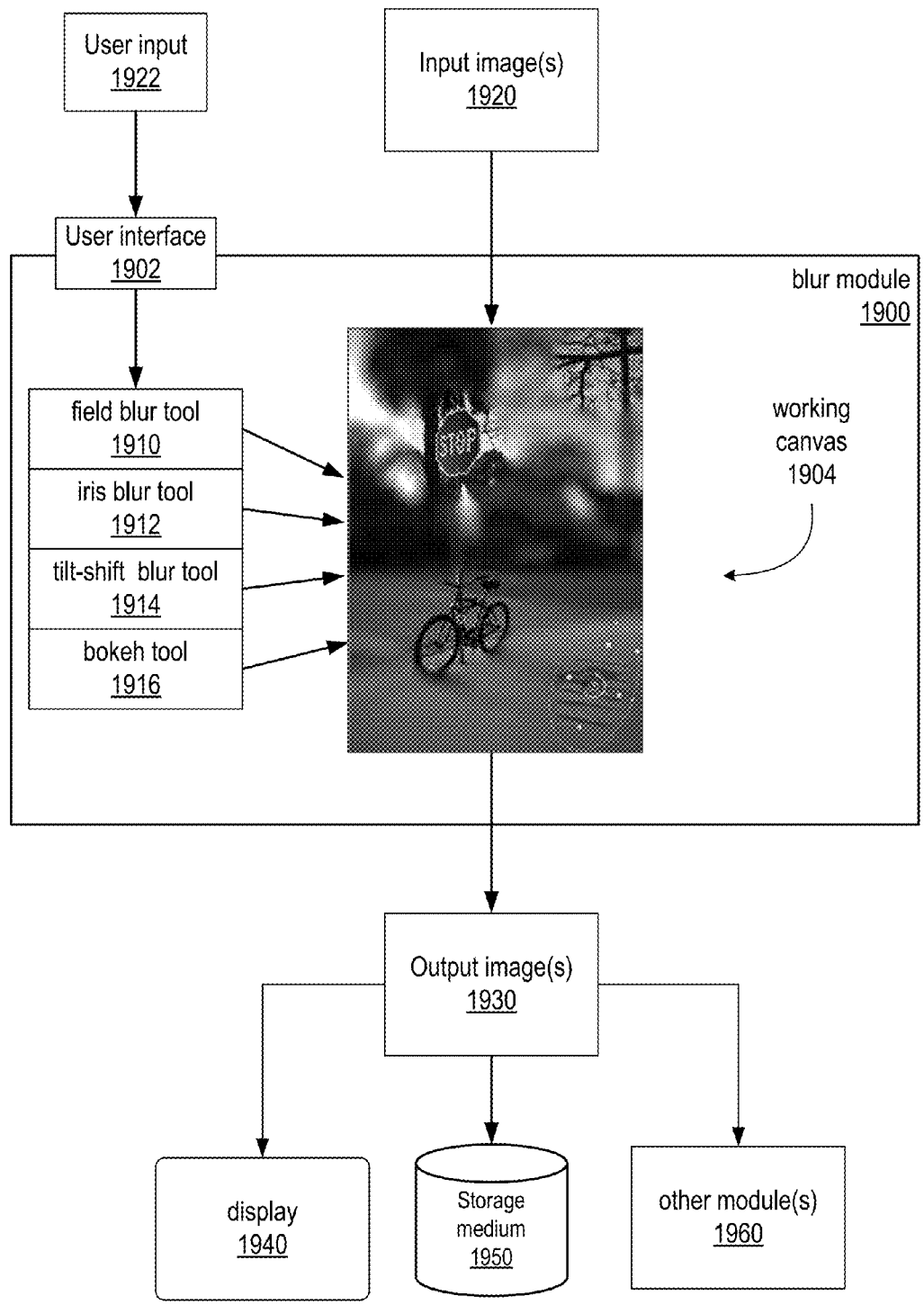
FIG. 23 illustrates a blur module that may implement one or more of the blur techniques, according to at least some embodiments.
Figure 24:
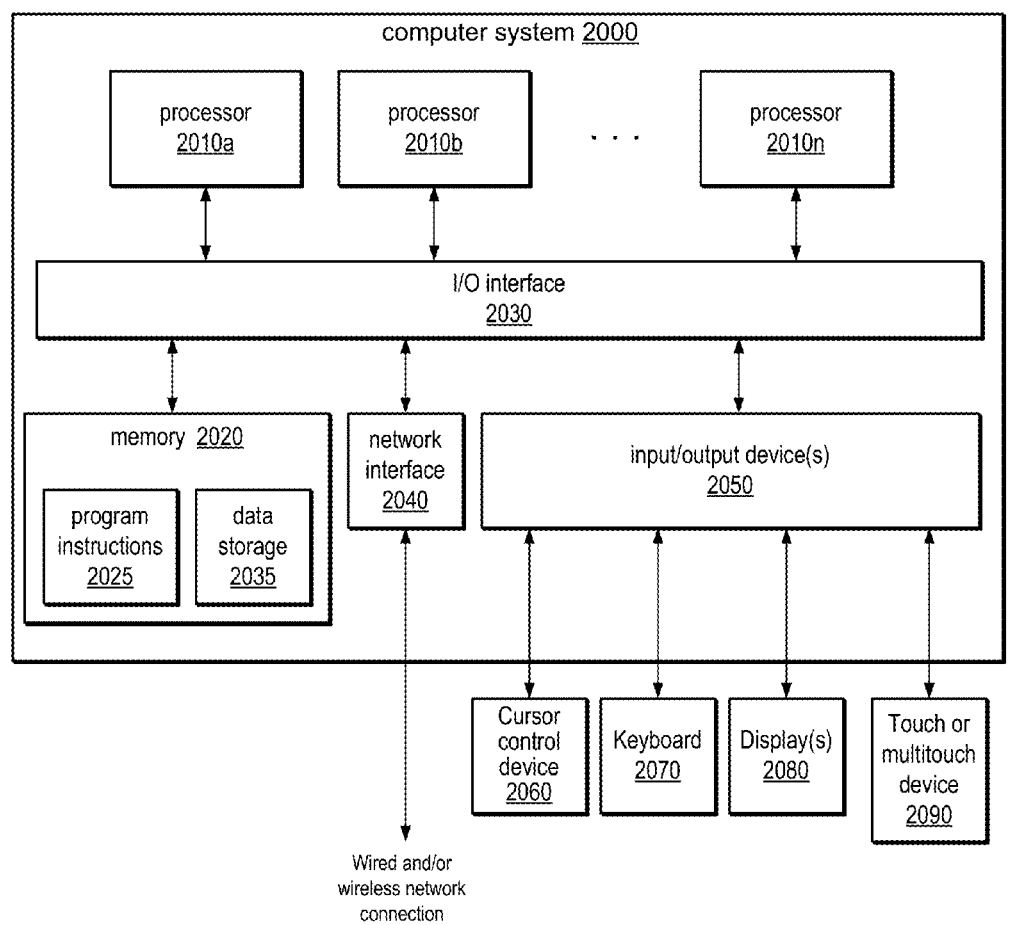
FIG. 24 illustrates an example computer system that may be used in embodiments.

FIG. 23 illustrates a blur module that may implement one or more of the blur techniques and tools illustrated in FIGS. 1 through 22. Module 1900 may, for example, implement one or more of a field blur tool, an iris blur tool, a tilt-shift blur tool, and a bokeh tool. In some embodiments, module 1900 may also implement a selection bleed technique as previously described. FIG. 24 illustrates an example computer system on which embodiments of module 1900 may be implemented. Module 1900 receives as input one or more digital images 1920, and displays the image on a working canvas 1904. The image 1920 may be a digital or digitized photograph, a digital or digitized video frame, or even a synthesized image. Module 1900 may receive user input 1922 via user interface 1902 selecting a blur tool. Module 1900 then edits the working canvas 1904 according to additional user input 1922 received via user interface 1902, using the current blur tool, to add and adjust blur patterns to the working canvas 1904. The user may activate a different blur tool via user interface 1902 and further edit the image to apply additional blur patterns. Module 1900 generates as output one or more modified images 1930. Output image(s) 1930 may, for example, be stored to a storage medium 1940, such as system memory, a disk drive, DVD, CD, etc., displayed to a display device 1940, and/or provided to one or more other modules 1950 for additional digital image processing.

Embodiments of the blur module or one or more of the blur tools and techniques as described herein may be implemented as a plug-in for applications, as library functions, and/or as a stand-alone application. Embodiments of the blur module or one or more of the blur tools and techniques as described herein may be implemented in any image processing application, including but not limited to Adobe® PhotoShop® Adobe® PhotoShop® Elements®, and Adobe® After Effects®. Adobe, PhotoShop, PhotoShop Elements, and Adobe After Effects are either registered trademarks or trademarks of Adobe Systems Incorporated in the United States and/or other countries.

Example System

Embodiments of the blur module and/or one or more of the blur tools and techniques as described herein may be executed on one or more computer systems, which may interact with various other devices. One such computer system is illustrated by FIG. 24. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, pad or tablet device, smart phone, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In at least some embodiments, a touch- or multitouch-enabled device 2090 may be included, and may be used to perform at least some of the UI functions as described above for the various blur techniques. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a blur module and/or one or more of the blur tools and techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor(s) 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor(s) 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor(s) 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 24, memory 2020 may include program instructions 2025, configured to implement embodiments of a blur module and/or one or more of the blur tools and techniques as described herein as described herein, and data storage 2035, comprising various data accessible by program instructions 2025. In one embodiment, program instructions 2025 may include software elements of embodiments of a the blur module and/or one or more of the blur tools and techniques as described herein as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of a the blur module and/or one or more of the blur tools and techniques as described herein as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
generating, by one or more computing devices, a blur effect in a portion of an input image, wherein said generating the blur effect in the portion of the input image comprises:
obtaining an indication of a selection region in the input image in which the blur effect is to be applied and a variable bleed amount; and
applying the blur effect to the input image according to the selection region, such that an amount of color from outside the selection region that bleeds into color inside the selection region is controlled by the variable bleed amount and the blur effect is specified by a blur mask that indicates a blur radius at each pixel of the input image, the blur radius varying between a zero blur radius and a maximum blur radius.

2. The method as recited in claim 1, wherein the bleed amount is variable between 0% and 100%, wherein an amount of 0% results in no bleeding of color from outside the selection region into color inside the selection region, an amount of 100% results in full bleeding of color from outside the selection region into color inside the selection region, and an amount between 0% and 100% results in an intermediate amount of bleeding of color from outside the selection region into color inside the selection region.

3. The method as recited in claim 1, wherein distance from the border of the selection region to which bleeding occurs is determined according to the blur radius at the respective pixels in the input image.

4. The method as recited in claim 1, wherein the selection region is indicated by a selection mask, and wherein said applying the blur effect to the input image according to the selection region comprises:
generating a bleed-modulated image from the input image according to the bleed amount;
generating a bleed-modulated normalization plane from a normalization plane for the input image according to the bleed amount, wherein the normalization plane comprises image intensities of unit value; and
generating a blurred image according to a blur of the bleed-modulated image and a blur of the bleed-modulated normalization plane.

5. The method as recited in claim 4, wherein said generating a bleed-modulated image is performed according to, $$I_{Obleed\text{-}modulated} = [\beta + (1-\beta)S]I_O,$$

and wherein said generating a bleed-modulated normalization plane is performed according to, $$N_{bleed\text{-}modulated} = [\beta + (1-\beta)S]N,$$

where $I_O$ is the input image, $\beta$ is the bleed amount, S is the selection mask, $I_{O\ bleed\text{-}modulated}$ is the bleed-modulated image, N is the normalization plane, and $N_{bleed\text{-}modulated}$ is the bleed-modulated normalization plane.

6. The method as recited in claim 4, wherein said generating a blurred image is performed according to, $$I_{blurred} = (1-\beta)(1-S) + \frac{BI_{Obleed\text{-}modulated}}{BN_{bleed\text{-}modulated}},$$

where $\beta$ is the bleed amount, S is the selection mask, $I_{O\ bleed\text{-}modulated}$ is the bleed-modulated image, $N_{bleed\text{-}modulated}$ is the bleed-modulated normalization plane, B is the blur effect, and $I_{blurred}$ is the blurred image.

7. A system, comprising:
one or more processors; and
a memory comprising program instructions executable by at least one of the one or more processors to generate a blur effect in a portion of an input image by:
obtainim an indication of a selection region, indicated by a selection mask, in the input image in which the blur effect is to be applied and a variable bleed amount; and
applying the blur effect to the input image according to the selection region such that an amount of color from outside the selection region that bleeds into color inside the selection region is controlled by the variable bleed amount, the applying including:
generating a bleed-modulated image from the input image according to the variable bleed amount;
generating a bleed-modulated normalization plane from, a normalization plane for the input image according to the variable bleed amount, the normalization plane including image intensities of unit value; and
generating a blurred image according to a blur of the bleed-modulated image and a blur of the bleed-modulated normalization plane.

8. The system as recited in claim 7, wherein the bleed amount is variable between 0% and 100%, wherein an amount of 0% results in no bleeding of color from outside the selection region into color inside the selection region, an amount of 100% results in full bleeding of color from outside the selection region into color inside the selection region, and an amount between 0% and 100% results in an intermediate amount of bleeding of color from outside the selection region into color inside the selection region.

9. The system as recited in claim 7, wherein the blur effect is specified by a blur mask that indicates a blur radius at each pixel of the input image, wherein the blur radius varies between zero blur radius and a maximum blur radius.

10. The system as recited in claim 9, wherein distance from the border of the selection region to which bleeding occurs is determined according to the blur radius at the respective pixels in the input image.

11. The system as recited in claim 7, wherein, to generate a bleed-modulated image, the program instructions are executable by at least one of the one or more processors to perform, $$I_{Obleed\text{-}modulated} = [\beta + (1-\beta)S]I_O,$$

and wherein, to generate a bleed-modulated normalization plane, the program instructions are executable by at least one of the one or more processors to perform, $$N_{bleed\text{-}modulated} = [\beta + (1-\beta)S]N,$$

where $I_O$ is the input image, $\beta$ is the bleed amount, S is the selection mask, $I_{O\ bleed\text{-}modulated}$ is the bleed-modulated image, N is the normalization plane, and $N_{bleed\text{-}modulated}$ is the bleed-modulated normalization plane.

12. The system as recited in claim 7, wherein, to generate a blurred image, the program instructions are executable by at least one of the one or more processors to perform, $$I_{blurred} = (1-\beta)(1-S) + \frac{BI_{Obleed\text{-}modulated}}{BN_{bleed\text{-}modulated}},$$

where $\beta$ is the bleed amount, S is the selection mask, $I_{O\ bleed\text{-}modulated}$ is the bleed-modulated image, $N_{bleed\text{-}modulated}$ is the bleed-modulated normalization plane, B is the blur effect, and $I_{blurred}$ is the blurred image.

13. A non-transitory computer-readable storage medium storing program instructions, wherein the program instructions are computer-executable to implement:
generating a blur effect in a portion of an input image, wherein, in said generating the blur effect in the portion of the input image, the program instructions are computer-executable to implement:
obtaining an indication of a selection region in the input image in which the blur effect is to be applied and a variable bleed amount; and
applying the blur effect to the input image according to the selection region such that an amount of color from outside the selection region that bleeds into color inside the selection region is controlled by the variable bleed amount and the blur effect is specified by a blur mask that indicates a blur radius at each pixel of the input image, the blur radius varying between zero blur radius and a maximum blur radius.

14. The non-transitory computer-readable storage medium as recited in claim 13, wherein the bleed amount is variable between 0% and 100%, wherein an amount of 0% results in no bleeding of color from outside the selection region into color inside the selection region, an amount of 100% results in full bleeding of color from outside the selection region into color inside the selection region, and an amount between 0% and 100% results in an intermediate amount of bleeding of color from outside the selection region into color inside the selection region.

15. The non-transitory computer-readable storage medium as recited in claim 13, wherein distance from the border of the selection region to which bleeding occurs is determined according to the blur radius at the respective pixels in the input image.

16. The non-transitory computer-readable storage medium as recited in claim 13, wherein the selection region is indicated by a selection mask, and wherein, in said applying the blur effect to the input image according to the selection region, the program instructions are computer-executable to implement:
generating a bleed-modulated image from the input image according to the bleed amount;
generating a bleed-modulated normalization plane from a normalization plane for the input image according to the bleed amount, wherein the normalization plane comprises image intensities of unit value; and generating a blurred image according to a blur of the bleed-modulated image and a blur of the bleed-modulated normalization plane.

17. The non-transitory computer-readable storage medium as recited in claim 16, wherein, in said generating a bleed-modulated image, the program instructions are computer-executable to implement, $$I_{0bleed\text{-}modulated} = [\beta + (1-\beta)S]I_0,$$

wherein, in said generating a bleed-modulated normalization plane, the program instructions are computer-executable to implement, $$N_{bleed\text{-}modulated} = [\beta + (1-\beta)S]N,$$

and wherein, in said generating a blurred image, the program instructions are computer-executable to implement, $$I_{blurred} = (1-\beta)(1-S) + \frac{BI_{0bleed\text{-}modulated}}{BN_{bleed\text{-}modulated}},$$

where $I_0$ is the input image, $\beta$ is the bleed amount, $S$ is the selection mask, $I_{0\ bleed\text{-}modulated}$ is the bleed-modulated image, $N$ is the normalization plane, $N_{bleed\text{-}modulated}$ is the bleed-modulated normalization plane, $B$ is the blur effect, and $I_{blurred}$ is the blurred image.

* * * * *

UNITED STATES PATENT AND TRADEMARK OFFICE
CERTIFICATE OF CORRECTION

| | | |
|---|---|---|
| PATENT NO. | : 8,693,776 B2 | Page 1 of 1 |
| APPLICATION NO. | : 13/560778 | |
| DATED | : April 8, 2014 | |
| INVENTOR(S) | : Intwala et al. | |

It is certified that error appears in the above-identified patent and that said Letters Patent is hereby corrected as shown below:

In the Claims:

Column 35, Line 27, delete "obtainim" insert -- obtaining --, therefor.

Signed and Sealed this
Eighth Day of July, 2014

Michelle K. Lee
*Deputy Director of the United States Patent and Trademark Office*